(12) United States Patent
Rushing et al.

(10) Patent No.: US 10,942,113 B2
(45) Date of Patent: Mar. 9, 2021

(54) METHODS, SYSTEMS, AND COMPONENTS THEREOF RELATING TO USING MULTI-SPECTRAL IMAGING FOR IMPROVED CULTIVATION OF CANNABIS AND OTHER CROPS

(71) Applicant: Emerald Metrics, Portland, OR (US)

(72) Inventors: Chris Rushing, Lake Oswego, OR (US); Robert McCorkle, Colton, OR (US); Brendan Joyce, Lake Park, FL (US)

(73) Assignee: Emerald Metrics, Portland, OR (US)

( * ) Notice: Subject to any disclaimer, the term of this patent is extended or adjusted under 35 U.S.C. 154(b) by 49 days.

(21) Appl. No.: 16/295,756

(22) Filed: Mar. 7, 2019

(65) Prior Publication Data
US 2019/0277749 A1 Sep. 12, 2019

Related U.S. Application Data

(60) Provisional application No. 62/649,583, filed on Mar. 29, 2018, provisional application No. 62/639,990, (Continued)

(51) Int. Cl.
*G01N 21/27* (2006.01)
*G01N 21/84* (2006.01)
(Continued)

(52) U.S. Cl.
CPC ........... *G01N 21/274* (2013.01); *A01G 22/00* (2018.02); *G01J 3/0297* (2013.01);
(Continued)

(58) Field of Classification Search
CPC .......... A01G 22/00; G01J 3/0264; G01J 3/28; G01J 3/0297; G01J 2003/283;
(Continued)

(56) References Cited

U.S. PATENT DOCUMENTS 6,366,681 B1 4/2002 Hutchins
6,529,615 B2 * 3/2003 Hendrickson ......... G01J 3/2803
382/110

(Continued)

OTHER PUBLICATIONS

May 14, 2019, International Search Report and Written Opinion of the International Searching Authority in PCT/US2019/021174 (which contains substantially similar subject matter).

*Primary Examiner* — Brenda C Bernardi
(74) *Attorney, Agent, or Firm* — Mei & Mark LLP

(57) ABSTRACT

A method for assessing at least one condition of a plant material is provided. The method may include providing a spectral image, normalizing the spectral image to generate a normalized spectral image, processing the normalized spectral image to generate at least one processed spectral image, providing a palette file, and generating a displayable false color image from the at least one processed spectral image and the palette file. The method may include capturing a multi-spectral image of the plant material with a multi-spectral imager. The plant material may be a portion of a cannabis plant and the condition may be one of, or relating to, health. A non-transitory computer readable storage medium storing a computer program for performing the method is also provided.

20 Claims, 26 Drawing Sheets
(18 of 26 Drawing Sheet(s) Filed in Color)

Related U.S. Application Data filed on Mar. 7, 2018, provisional application No. 62/714,492, filed on Aug. 3, 2018, provisional application No. 62/649,580, filed on Mar. 29, 2018.

(51) Int. Cl.
| | | |
|---|---|---|
| *G01J 3/02* | (2006.01) | |
| *G01N 21/3563* | (2014.01) | |
| *G06T 7/00* | (2017.01) | |
| *A01G 22/00* | (2018.01) | |
| *G01J 3/28* | (2006.01) | |

(52) U.S. Cl.
CPC ......... *G01N 21/3563* (2013.01); *G01N 21/84* (2013.01); *G06T 7/0004* (2013.01); *G01J 2003/2826* (2013.01); *G01N 2021/8466* (2013.01); *G06T 2207/30188* (2013.01)

(58) Field of Classification Search
CPC ............ G01J 2003/2826; G01N 21/27; G01N 21/3563; G01N 21/84; G01N 21/274; G01N 2021/8466; G01N 21/3554; G01N 2201/0221; G01N 21/359; G06T 7/0004; G06T 2207/30188; G06T 2207/10048; G06T 2207/10024

See application file for complete search history.

(56) References Cited

U.S. PATENT DOCUMENTS

| | | | |
|---|---|---|---|
| 8,993,349 B2 | 3/2015 | Bruchez | |
| 10,078,890 B1 | 9/2018 | Tagestad | |
| 2001/0016053 A1 | 8/2001 | Dickson | |
| 2009/0260281 A1* | 10/2009 | Conrad | .................. A01C 1/025 47/14 |
| 2014/0152990 A1 | 6/2014 | Ehbets | |
| 2017/0071188 A1 | 3/2017 | Rees | |
| 2018/0197287 A1* | 7/2018 | Macias | .................. A01G 22/00 |

* cited by examiner

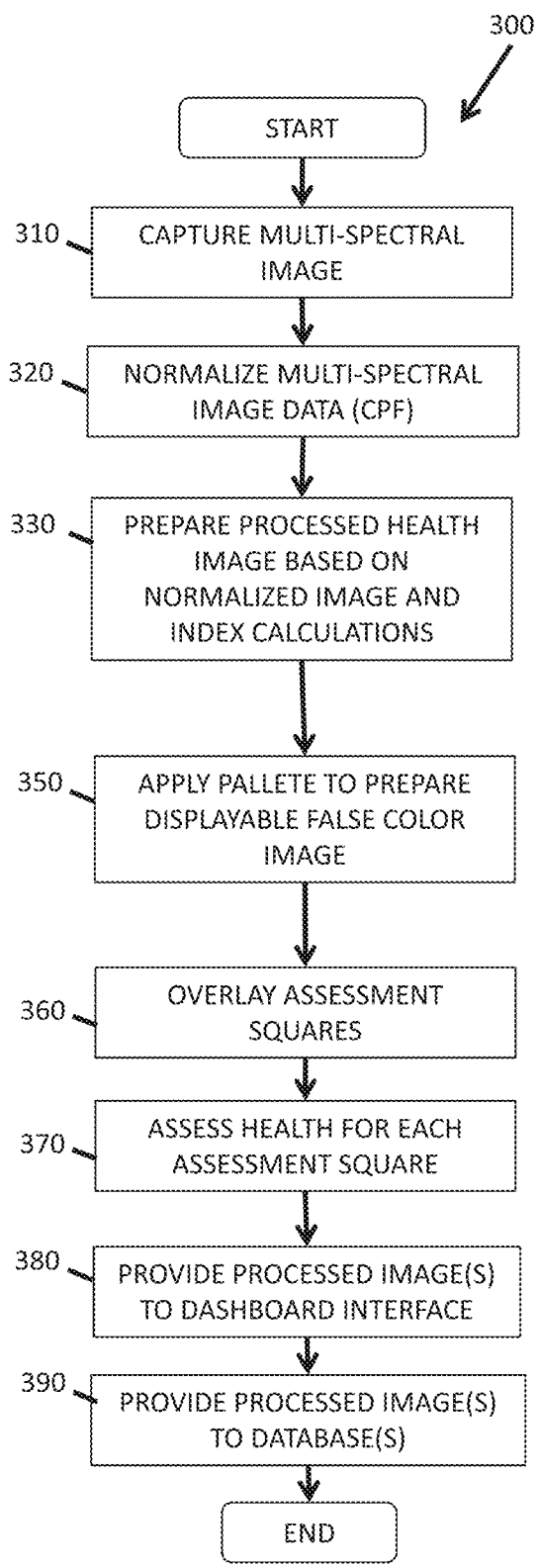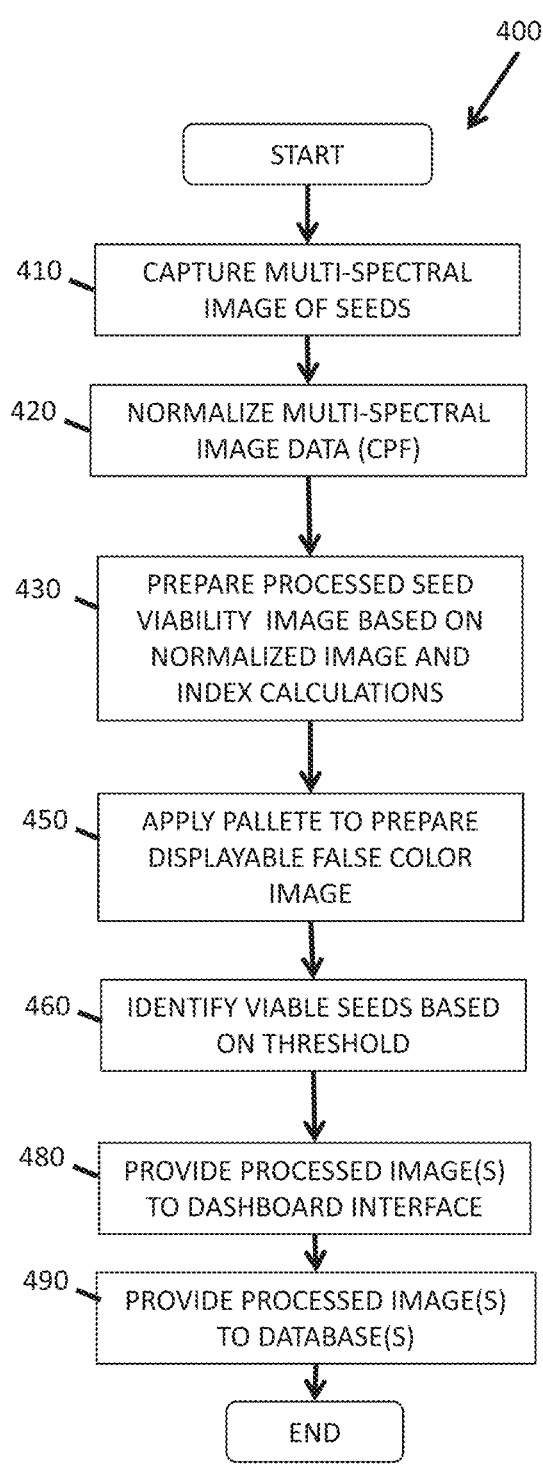
FIG. 2A
FIG. 2B

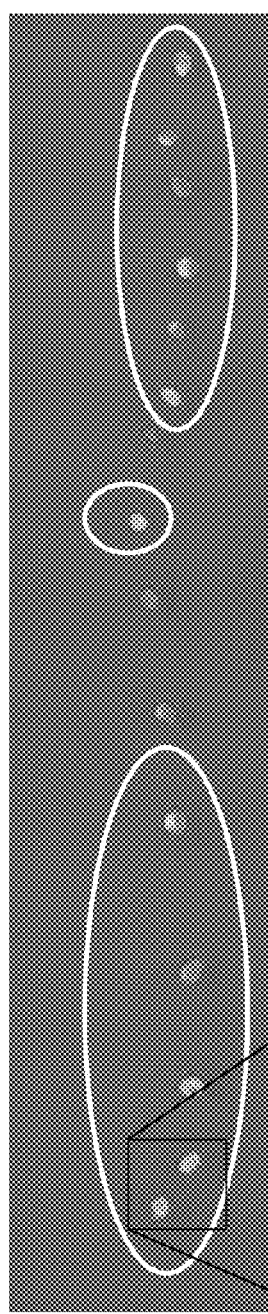
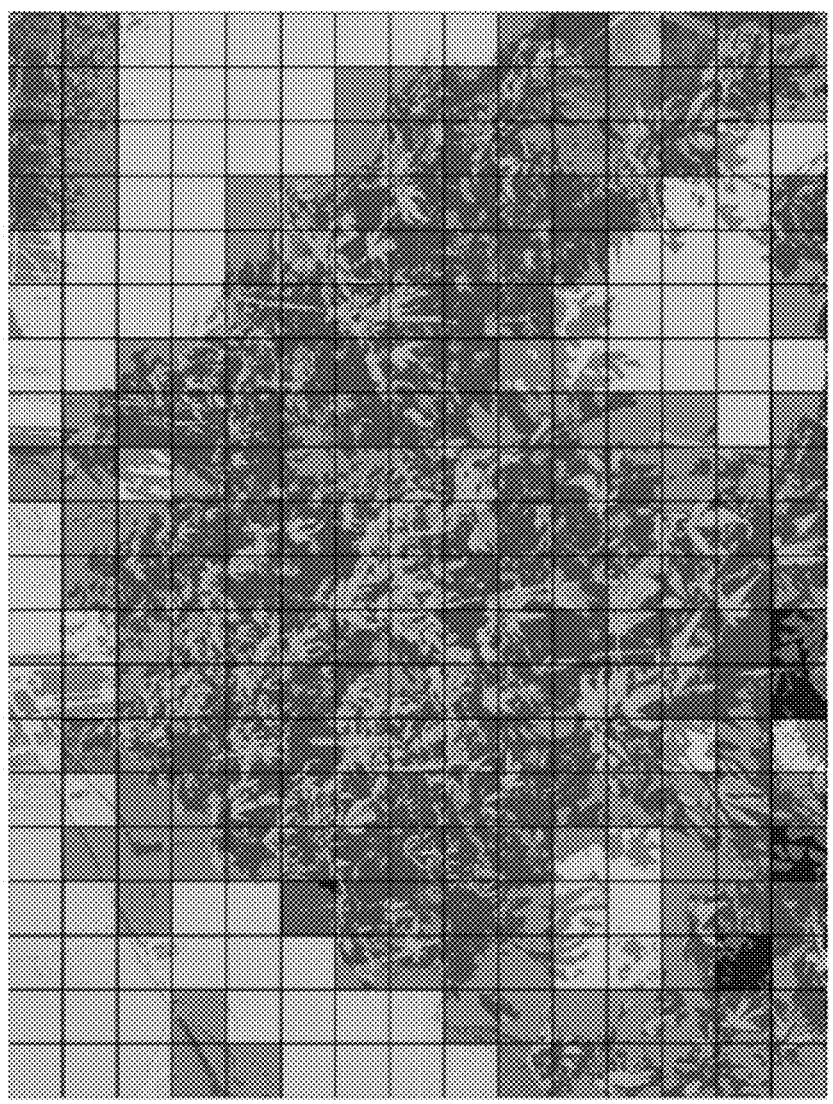
FIG. 2J
FIG. 2K

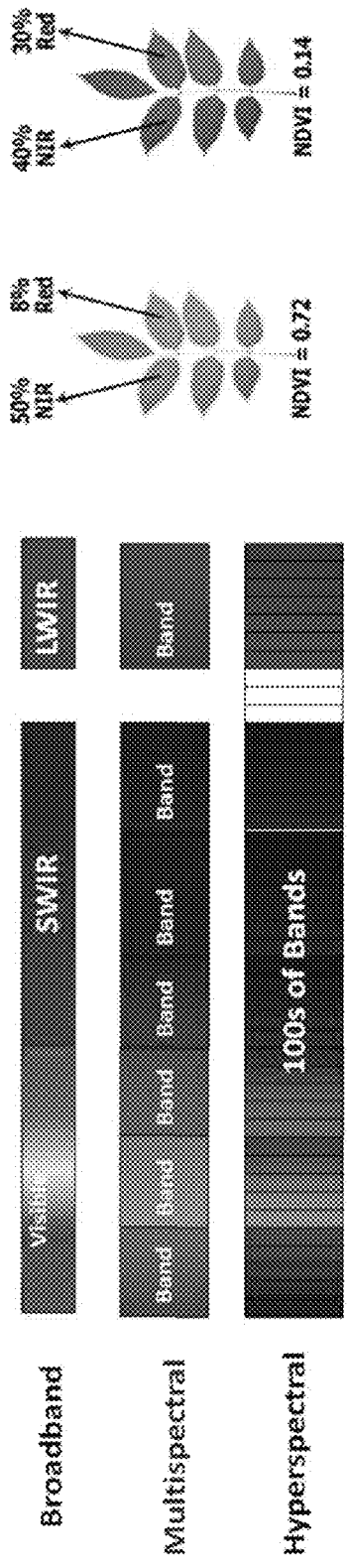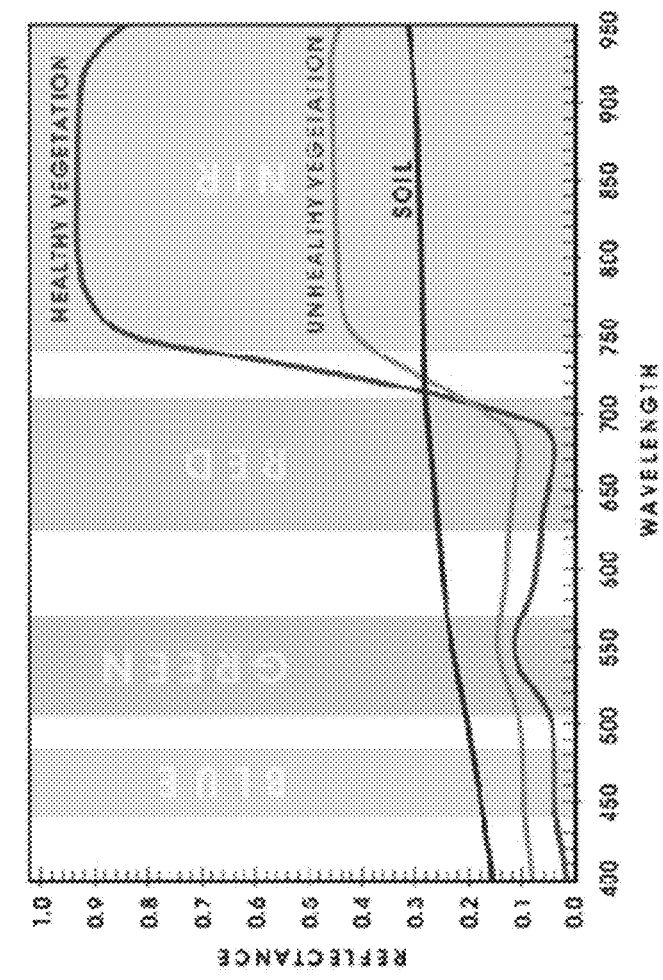
FIG. 10A (PRIOR ART)
FIG. 10B (PRIOR ART)
FIG. 10C (PRIOR ART)
FIG. 10D (PRIOR ART)

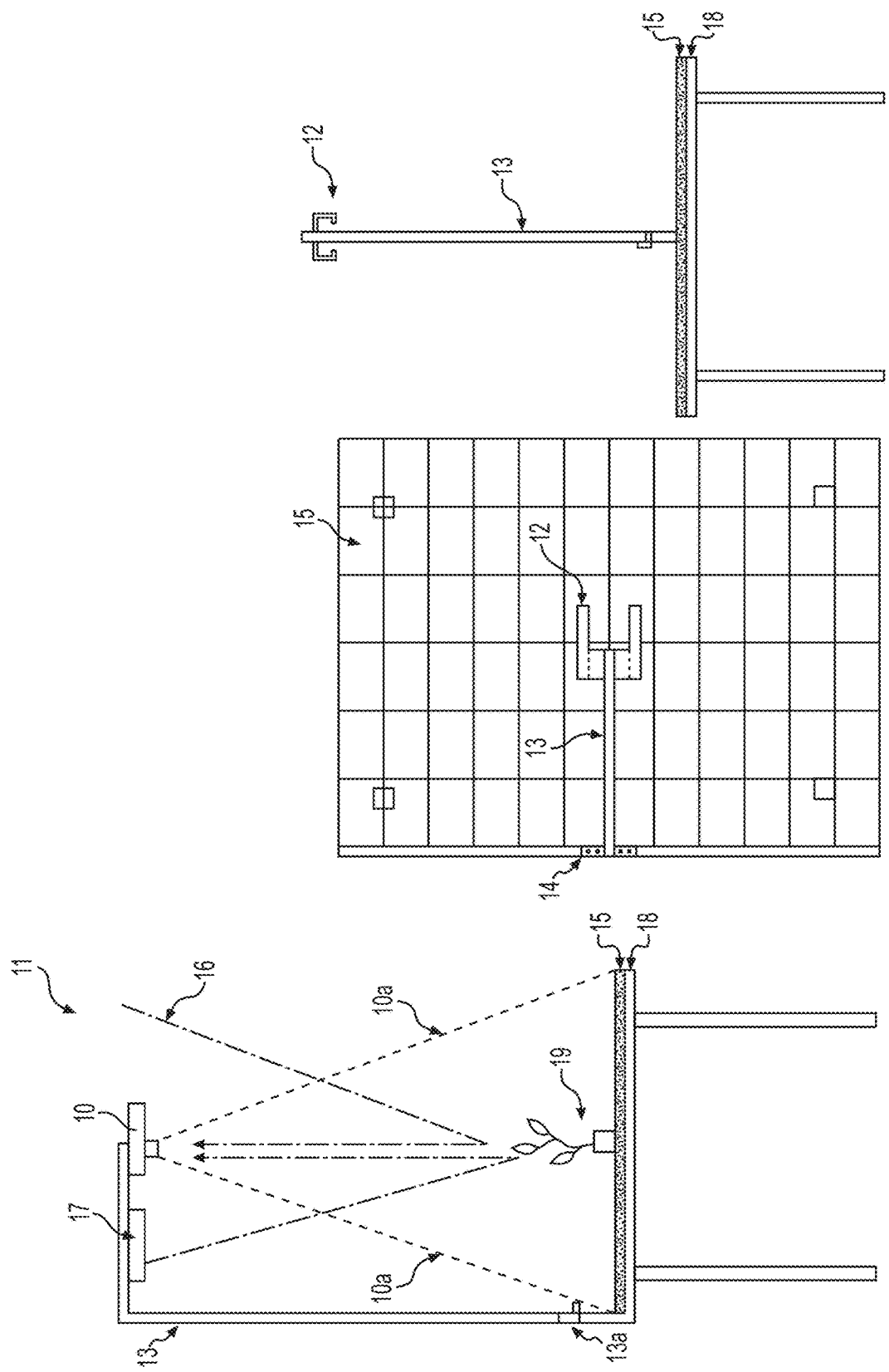

METHODS, SYSTEMS, AND COMPONENTS THEREOF RELATING TO USING MULTI-SPECTRAL IMAGING FOR IMPROVED CULTIVATION OF CANNABIS AND OTHER CROPS

This application claims priority to U.S. Provisional Patent Application Ser. No. 62/639,990, filed on Mar. 7, 2018; U.S. Provisional Patent Application Ser. No. 62/649,580, filed on Mar. 29, 2018; U.S. Provisional Patent Application Ser. No. 62/649,583, filed on Mar. 29, 2018; and U.S. Provisional Patent Application Ser. No. 62/714,492, filed on Aug. 3, 2018, the disclosures of which are herein incorporated by reference in their entireties.

TECHNICAL FIELD

This application relates to methods and systems for utilizing spectral imaging in agriculture. More specifically, this application relates to methods and systems to improve cultivation of cannabis and related crops to by rapidly and reliably assessing plant health and other aspects relevant to crop cultivation, quality, safety, and product processing via processing of spectral images and other data.

BACKGROUND

As used herein, the term cannabis broadly refers to *Cannabis sativa* (and sub-species) plants and portions thereof; it includes both hemp—which is typically characterized as producing flowers with no or negligible levels of THC (for example less than 0.2% or 0.3%), and marijuana, which is typically characterized as as having greater than negligible amounts of THC. However, as would be understood by a person of ordinary skill in the art, the techniques and teachings disclosed herein may be applicable to other crops, including, but not limited to, hops and other plants in or related to the Cannabaceae family.

In the burgeoning cannabis cultivation industry, crop health, quality, disease, pest infestation, and the like is typically assessed with the naked eye and by plant-to-plant, leaf-to-leaf manual inspection. Such assessments are labor and time intensive, typically require highly skilled labor, and are prone to error. For example, damage from root rot, insects, mildew, mold, and/or a wide variety of other maladies may be present in what appear to be healthy plants to the naked eye. By the time such maladies are discovered, the affected plants, or portions thereof, may be irreparably damaged or destroyed—and the malady may have spread.

Such conventional monitoring techniques have served cultivators of small quantities of cannabis plants, but there is much room for improvement. For large-scale cannabis cultivation operations, however, such conventional assessment techniques are extremely costly and impractical: Manual labor cannot efficiently, effectively, and reliably assess plant health and identify related anomalies; and it cannot provide adequate product predictability with respect to both quality and/or yield.

Even when conventional assessments occur at regular, frequent intervals and are further supported by environmental sensors monitoring characteristics of the cultivation environment, deficiencies in plant health and related maladies are often missed or discovered too late to take effective remedial action. As a result, product yields may be reduced and/or product quality may suffer. In more dire cases, a health-related malady—such as pest infestation, mildew contamination, or the like—may not be discovered until product yield or quality has been substantially reduced, an entire crop has been destroyed, and/or the malady has spread to compromise other crops in the same grow facility. In larger cultivation operations, such maladies may spread from crop to crop causing devastating losses.

Certified laboratory testing is also used to detect the presence of certain diseases and unhealthy contaminants in cannabis products and crops, but such laboratory testing is expensive—especially when performed at frequent regular intervals and/or on a large number of plants. Further, such testing may be limited in scope regarding what maladies may be detected; and, depending on a cannabis cultivator's location, may be partially or entirely unavailable. Many certified labs do not test for many common diseases—especially absent a local regulatory requirement or state mandate to do so. Further, a cannabis grower in a state without a certified laboratory may be unable to test her samples without transporting cannabis across state lines and thereby running afoul of both state and federal law. Moreover, even error-free laboratory testing may fail to detect maladies affecting a particular crop if, for example, the tested sample was selected from an unaffected portion of the crop. And, in cases where laboratory testing reveals maladies in a final harvested product, it may be too late to take remedial action and the destruction of the entire corresponding crop may be required—even if the majority of the crop was unaffected. Accordingly, certified labs have been unable to provide the cost-effectiveness, depth, volume, or frequency of testing needed to fully support the cannabis industry, especially in its currently existing state-by-state structure. This has resulted in crop loss, operational inefficiencies, product quality reductions, business disputes, potential liability, and harmful contaminants reaching the end consumer.

Thus, a need exists for techniques whereby a cannabis cultivator can continuously monitor and review plant health and related issues throughout the lifecycle of the crop to and provide a safe, high quality, and high yield product to the end consumer (and/or intermediary businesses) in a cost-effective manner—including in cases where suitable laboratory testing is unavailable. Such a need may extend beyond general plant health assessments to include disease detection, pest detection, nutrient deficiency or over-saturation detection, and chemical detection—including, but not limited to, pesticides, fertilizers, and various undesirable contaminants. There is also a need to supply documentation to comply with current or future regulatory requirements that seek to ensure an absence of harmful chemicals, spores, microbes, and the like in products provided to the end consumer (and/or intermediary businesses). Further, there is a need to generate documentary evidence of various aspects of product quality and other cultivation data to facilitate cannabis product sales, to create an audit trail, to reduce potential legal liability if a downstream product causes alleged harm to a consumer, and the like.

Clones are the typical starting point and, thus, the building block for most cannabis crops. However, growers and clone operations may face a near 30% loss in plants or return rate, respectively. Growing clones internally can be a daunting prospect even for an experienced cultivator, as cloning requires distinct agricultural skills and knowledge to effectively transition clones to healthy and productive mature plants. Beyond the high failure rate, accepting clones from a third party risks introducing disease and pests to an otherwise uninfected facility.

Currently, cannabis cultivators assess the quality, viability, and sex of clone plants (or seedlings) through limited visual inspection during the growth cycle. As with assessing plant health, such methods are labor-intensive, expensive, inefficient, and error prone—and are especially impractical for larger scale cloning operations. There is no known method of assessing the viability of germinating seeds.

Clones (or seedlings) that appear to be healthy to the naked eye are regularly transplanted from nursery boxes (or similar containers) for the next stage of their growth, which is typically referred to as a vegetative growth stage. However, many of such clones (or seedlings) have compromised health or viability, or may otherwise suffer from unseen health-related maladies. Such compromised clones (or seedlings) may have more complications during the cultivation process: When they ultimately mature, the resulting cannabis crop may be of reduced quality or yield. Accordingly, bringing lower-quality clones (or seedlings) to maturity—as opposed to destroying them and nurturing higher-quality clones (or seedlings) in their place—may represent a reduction in efficiency and a waste of resources. Similarly, plant nursery resources are wasted on unviable or less viable seeds that may fail to germinate or may germinate poorly and/or slowly.

It is also known in the art that male (and sometimes hermaphroditic) cannabis plants may be undesirable for cultivation due to their lack of (or reduced) flower production and their tendency to foment unwanted seed production in neighboring female plants. Currently, cannabis plants are manually sexed by experts as early as practicable, which may typically be roughly 28 days after the beginning of the nursery stage—approximately one week into the immature portion of the vegetative growth stage. In many cultivation operations, male plants are destroyed and removed as soon as they are detected. Accordingly, resources expended on male cannabis plants prior to their culling may represent waste and inefficiency.

Thus, a need exists for techniques for rapidly and efficiently assessing clones (or seedlings) with respect to quality, viability, heath, and/or sex. Further, there exists a need to have such assessment be reliably documented and/or clearly expressed to enable the efficient removal of lower-quality clones (or seedlings) or male plants. Additionally, there is a need to rapidly, efficiently, and effectively assess seeds regarding their viability and/or germination characteristics.

Cannabis flowers are typically dried prior to packaging, use, and/or distribution in a process known as curing. If cannabis flowers are insufficiently cured prior to packaging, extra moisture may foment mold growth or the like, cause health risks, create potential liability, hurt a grower's reputation, shorten shelf-life, potentially cause regulatory problems, and/or result in other problems. Given these potential issues, many cultivators err on the side of over-curing their harvested flowers. However, over-dried cannabis flowers are generally considered to be a low quality product that provides an undesirable consumer experience. In many cultivation operations, harvested cannabis flowers are typically cured by hanging them on a rack for a specific amount of time in view of the environmental conditions, in addition to assessing completeness of curing via manual inspection. However, under such techniques, it is difficult to reliably cure cannabis flowers to optimal moisture content. Thus, there exists a need for techniques to quickly, efficiently, and reliably assess the completeness of curing.

It is known that agricultural inputs that result in optimal growth, flowering, yield, and quantity differ among the vast multitude of cannabis strains, largely due to the substantially varied climates that respective strains were bred to thrive in. Accordingly, conventional precision agricultural techniques are not readily applicable to cannabis cultivation. Thus, there is a need for software that, for a particular cannabis strain, receives data pertaining to multiple crop cycles and iteratively develops a precision agriculture model that instructs, with increasing accuracy, optimal agricultural inputs to maximize product yield and/or quality.

Conventional methods for determining and managing costs associated with cannabis cultivation leave a grower vulnerable to ballooning costs, as well as unexpected reductions in predicted revenues. Although financial management of cannabis cultivation operations have been achieved through existing methods, these methods are typically reactionary or post-harvest and fail to provide a methodology to, for example, determine if crop insurance should be executed in a timely and logical manner. Existing products in the market fail to track daily, weekly, and/or monthly recurring and non-recurring costs; fail to integrate data on plant health and update estimated yields; and ultimately fail to provide reliable financial predictability for a cultivation operation. They cannot adequately, effectively, and efficiently manage financial aspects of cultivation operations big and small. Thus, a need exists for software that permits a cultivator to continuously monitor and review the cost of the grow operation throughout the lifecycle of the crop; to provide the ability to expend, conserve, or target cost where it is needed to complete the crop cycle or close the cycle; and/or to suggest triggering provisions of crop insurance in a timely manner.

SUMMARY

The present disclosure provides a description of algorithmic methods, systems, and components thereof to address the perceived needs described above in, but not limited to, the field of cannabis cultivation.

It is an object of the disclosure to provide a cultivation monitoring system and corresponding methods that efficiently and effectively monitor and/or assess plant health; seed, sprout, or clone viability; disease presence; pest presence; contaminant presence; nutrient distribution; moisture content; and/or plant sex. Such disclosed systems and methods may derive assessments from spectral images, environmental sensor data, pattern recognition algorithms, and/or spectral code screening. Such disclosed systems and methods further may include site-specific image calibration techniques and instrumentalities for both processing spectral data and displaying it in an advantageous form.

The disclosed systems and methods may utilize artificial intelligence and machine learning (collectively, "AI") for improved and new pattern recognition of plant-related anomalies based on analysis of, for example, normalized and/or processed spectral images. Such disclosed systems and methods may further utilize artificial intelligence and machine learning to iteratively develop precision agriculture models, which may be described as Strain Analytics™, for various respective cannabis strains based on cultivation data pertaining to each crop of a particular strain.

Such disclosed systems and methods may further provide cultivators feedback in the form of alerts, reports, actionable intelligence, and/or processed imagery that may permit earlier and more effective mitigation of agricultural maladies; improve crop quality and yield; provide documentation and validation of crop quality, crop safety, and/or mitigating actions taken; and/or predict and improve financial performance of the grow.

It is also an object of this disclosure to provide a system and methods to reliably derive multi-spectral code sets that may be readily screened for within multi-spectral images.

A method for assessing at least one condition of a plant material is provided. The method may include providing a spectral image, normalizing the spectral image to generate a normalized spectral image, processing the normalized spectral image to generate at least one processed spectral image, providing a palette file, and generating a displayable false color image from the at least one processed spectral image and the palette file.

The step of providing a spectral image may include capturing a multi-spectral image of the plant material with a multi-spectral imager.

The method may further include a step of providing a calibration file. The step of providing the calibration file may include using the multi-spectral imager to capture reflectance values of a calibration target under lighting conditions similar to that of the spectral image, providing color processing values, and generating the calibration file based on the captured reflectance values and the color processing values. The step of normalizing the spectral image may include normalizing the spectral image with the calibration file.

The plant material may be a portion of a cannabis plant. The step of providing color processing values may include selecting color processing values based on at least one of a strain of the cannabis plant and a life cycle stage of the cannabis plant.

The step of processing the normalized spectral image may include generating a first processed spectral image based on at least one of NDVI, SAVI, GNDVI, NDVI, and NIR. The step of processing the normalized spectral image may further include generating a second processed spectral image based on RGB.

The step of providing the palette file may include providing a palette file with a grey-red-yellow-green palette rubric. The step of providing a palette file may further include providing the palette file that assigns a grey color to pixels of the first processed spectral image with a value at or below 0.000.

The at least one condition of plant material may include a health measurement as a first condition. The first processed spectral image reflects the health measurement. The step of providing a palette file may further include providing a palette file that assigns a green color to very healthy plant material, assigns a yellow color to midline healthy plant material, assigns a red color to unhealthy plant material; and assigns a grey color to inert material.

The method may further include overlaying a plurality of assessment squares on the displayable false color image, calculating an assessment value for each of the plurality of assessment squares, and coloring each of the plurality of assessment square based at least in part on its assessment value.

The method may further include providing a heath threshold percentage. The at least one condition of the plant material may include a health measurement as a first condition. The first processed spectral image may reflect the health measurement. The step of coloring each of the plurality of assessment square may include overlaying a first color on each assessment square that is not predominately inert and has an assessment value greater than the health threshold percentage, and overlaying a second color on each assessment square that is not predominately inert and has an assessment value below than the health threshold percentage. The step may further include overlaying a third color on each assessment square that is predominately inert.

The step of providing a heath threshold percentage may include receiving user input to determine the health threshold.

The method may further include providing a background surface with a grid. The step of capturing the multi-spectral image may include capturing at least a portion of the grid in the multi-spectral image. The step of overlaying the plurality of assessment squares on the displayable false color image may include overlaying the plurality of assessment squares in alignment with the grid.

The method may further include screening the normalized spectral image for a first multi-spectral code set.

The method may further include evaluating at least one of the at least one processed spectral image and the normalized spectral image to recognize patterns indicative of plant health related anomalies.

The plant material may be cannabis flowers and the at least one condition may be curing completeness. The step of processing the normalized spectral image to generate at least one processed spectral image may include generating a first processed spectral image based on at least one of NDWI and GNDVI.

The plant material may be seeds and the at the at least one condition may be seed viability. The step of processing the normalized spectral image to generate at least one processed spectral image further may include generating a first processed spectral image based on at least one of NDVI, SAVI, GNDVI, NDWI, and NIR.

In another embodiment, a non-transitory computer readable storage medium storing a computer program is provided. When executed by a computer, the computer program may perform steps of method embodiments listed above.

It is to be understood that the descriptions herein are exemplary and explanatory only, and are not restrictive of the invention.

BRIEF DESCRIPTION OF THE DRAWINGS

The patent or application file contains at least one drawing executed in color. Copies of this patent or patent application publication with color drawing(s) will be provided by the Office upon request and payment of the necessary fee.

The accompanying drawings, which are incorporated into and constitute a part of this specification, illustrate several embodiments and aspects of the methods, systems, and system components described herein and, together with the description, serve to explain the principles of the invention.

FIG. 2A is a flowchart illustrating a method of operation for assessing plant health, in accordance with exemplary embodiments.

FIG. 2B is a flowchart illustrating a method for assessing seed viability, in accordance with exemplary embodiments.

FIG. 2J is a processed false color image of cannabis seeds, with zoomed in detail, that illustrates measures of seed viability, in accordance with exemplary embodiments.

FIG. 2K is processed false color image of cannabis plants that illustrates assessment squares indicative of plant health, in accordance with exemplary embodiments.

FIGS. 10A-10E are prior art diagrams that illustrate known aspects of spectral imaging technology.

FIGS. 11A-11C are views of a clone imaging apparatus, in accordance with exemplary embodiments.

FIGS. 13F and 13G are examples illustrating a customized palette file and a customized set of color processing values, respectively, for a cannabis strain referred to as Superdave, in accordance with exemplary embodiments.

FIGS. 13H and 13I are examples illustrating a customized palette file and a customized set of color processing values, respectively, for a cannabis strain referred to as Blue Magoo, in accordance with exemplary embodiments.

FIG. 14 is a processed false color image of a cannabis plant that illustrates detected Glyphosate based on a screening for corresponding multi-spectral code set, in accordance with exemplary embodiments.

DETAILED DESCRIPTION

Cultivation Monitoring System

Figure 1A:
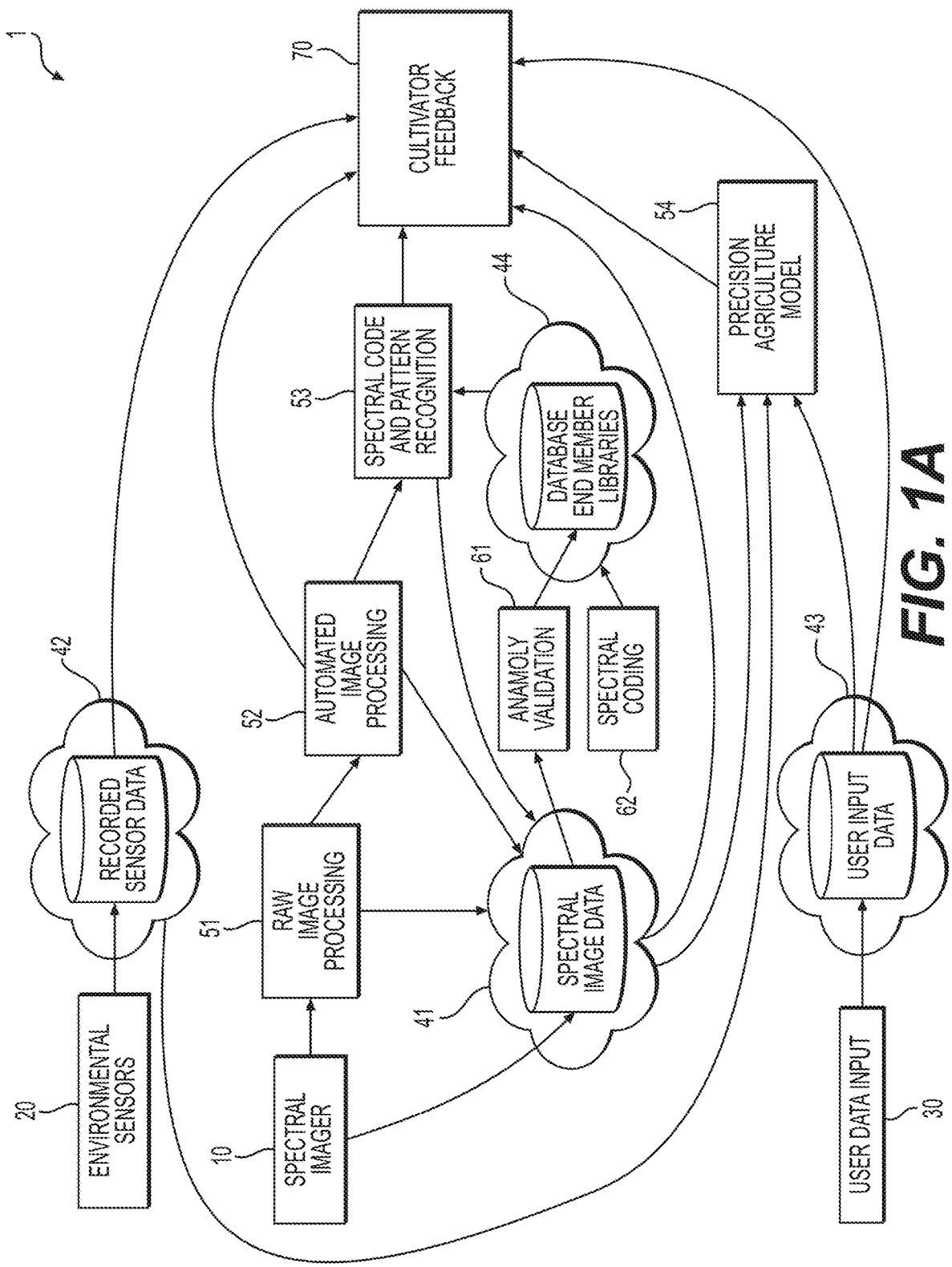
FIG. 1A is a process diagram for a cultivation monitoring system, in accordance with exemplary embodiments.

In a non-limiting example, a cultivation monitoring system is provided. In preferred embodiments, a cultivation monitoring system may include a local installation in a cultivation facility and a server-side operation. It is contemplated that a single server-side operation may support multiple local installations.

The local installation may incorporate or otherwise receive data from environmental sensors, such as those configured to assess and digitally report levels of light, temperature, humidity, carbon dioxide, water distribution, and the like. Further, the local installation may include or otherwise utilize various spectral imaging devices, including one or more fixed multi-spectral imagers and hyper-spectral imagers.

Additionally, the local installation may include a local computer system accessible by users affiliated with the cultivation facility, either locally or via remote login; and by remote operators affiliated with the server-side operation. The local computer system may be configured to receive, store, and process data from the environmental sensors and spectral imaging devices. It may also be configured to receive, store, and process manually entered data input by users regarding, for example, cultivation inputs, such as types, amounts, and sources of nutrients, pesticides, and moisture provided; the type and source of plant being grown; growth and yield data; the perceived quality of certain crops or components thereof at various stages; and other relevant cultivation data. Further, the local computer system may be configured to provide data to the server-side operation, and receive data therefrom.

The local computer system may be any type of computing device suitable for performing the functions and algorithms disclosed herein such a desktop computer, laptop computer, notebook computer, tablet computer, smartphone, etc. It may also be integrated into or with a spectral imaging device of the local installation. The local computer system may receive input from and provide output to the user via input and output interfaces, respectively, that are connected to or otherwise in communication with the local computer system. The input and output interfaces may be of any type suitable for performing the functions disclosed herein. In some instances, the interfaces may be included as application components within the computing device. In other instances, the interfaces may be external to the computing device, and may comprise, for example, a smart phone, tablet computer, or PC running an application or accessing a webpage, in communication with the local computer system and/or the server-side operation.

It is contemplated that each local computer system may be connected to a server-side operation via a network. The network may be any type of network suitable for performing the functions as disclosed herein as will be apparent to persons having skill in the relevant art, such as a local area network, a wide area network, the Internet, etc.

In some embodiments, the server-side operation may rely upon (or substantially or entirely exist within) a cloud computing system, such as Amazon Web Services, for both data storage and processing. However, this disclosure is not so limited: The server-side operation may comprise may be any type of computing device(s) and server(s) suitable for performing the functions and algorithms disclosed herein. Indeed, in some alternative embodiments, the server-side operation and the local computer system may even be co-located.

In preferred embodiments, the server-side operation may, for example, receive data from each associated local computer system; process such data; and respond with alerts, actionable intelligence, reports, and processed images. Such responses may be provided to a user, for example, via the local computer system; a dashboard interface on a computer, smart phone, tablet, or the like; a web interface; and/or via email, text message, or the like. In preferred embodiments, data processing that requires substantial processing power, such as the spectral image processing algorithms disclosed herein and embedded AI for improving pattern recognition, may occur in the server-side operation.

The server-side operation may include one or more databases for storing cultivation data received from each local computer system, as well as processed spectral images, reports, and the like. The server-side operation may also include one or more database end member libraries for storing data pertinent to pattern recognition. Each database end member library may be particular to a specific local installation or grouping of local installations (such as multiple local installations that are co-owned or co-operated) or, alternatively, may be derived from the cultivation data from all or many local installations. Further, each database end member library may be specific to aid in the recognition of a particular cultivation issued (e.g., the presence of pests, or the presence of a particular type of pest).

The server-side operation may receive input from and provide output to a system operator(s) via input and output interfaces, respectively, that are connected to or otherwise in communication with the server-side operation system. It is contemplated that an operator may utilize such input and output interfaces to, for example, manage the integration of each new local computer system with the server-side operation; set or alter to scope of cultivation monitoring system services provided to each local installation; customize cultivation monitoring system services; manage access; validate or reject certain processed data to improve pattern recognition and/or other AI processes; update various algorithms; and perform other tasks relevant to server and system administration.

It is contemplated that both the local computer system and the server side operation may include a processing device. Each processing device may be a central processing unit (CPU) or other processor or set of processors suitable for performing the functions disclosed herein as will be apparent to persons having skill in the relevant art. Each processing device may receive and process various forms of data as will be apparent to persons having skill in the relevant art. Each processing device may also be configured to read data and software stored in non-volatile storage and memory; write data and software stored in non-volatile storage and memory; execute program code stored in the memory or non-volatile storage, such as embodiments of the algorithms disclosed herein; communicate to other cultivation monitoring system components via associated receiving and transmitting devices; and otherwise communicate with input and output interfaces. Additional functions performed by each processing device will be apparent to persons having skill in the relevant art and may also be discussed herein. Memory may store data suitable for performing the functions disclosed herein. Some or all of the data and software stored within non-volatile storage may be copied to memory to support the processing functions of each processing device. A transmitting device affiliated with each processing device may be configured to transmit data over the network via one or more suitable network protocols. A receiving device affiliated with each processing device may be configured to transmit data over the network via one or more suitable network protocols. Consistent with this disclosure and the understanding of persons of ordinary skill in the art, such transmitted and received data may include, but is not limited to, queries, login credentials, instructions or commands, software updates, thresholds, sensor data, spectral imager data, and manually entered data.

With reference to FIG. 1A, cultivation monitoring system may receive inputs from spectral imager 10, environmental sensors 20, and/or user data input 30. Data from such sources may be stored in spectral image data database 41, recorded sensor data database 42, and user input data database 43, respectively. Such databases may be part of local installation and/or the server-side operation.

User data input 30 may include, for example, manually or automatically entered data regarding cultivation inputs (such as information on nutrients and moisture provided, light exposure, and strain type), regarding cultivation outputs (such as crop yield and quality), financial data, and/or challenges faced and corrective actions taken during the cultivation process.

Spectral imager 10 may comprise at least one multi-spectral sensor in certain embodiments and at least one hyper-spectral imager in alternative embodiments. Raw image data from spectral imager 10 may be provided for raw image processing 51, wherein the raw spectral data is normalized based on, for example, calibration files that may reflect lighting conditions and/or various other cultivation variables. Such normalized images may be stored in spectral image data database 41. Processing 51 may be accomplished by the local computer system and/or by the server-side operation.

The normalized spectral images may be provided for automated image processing 52, wherein index values and the like may be calculated to arrive at processed spectral images, which may be assessed for, for example, measures of plant health. Such processed spectral images may be stored in spectral image data database 41. Processing 52 may be accomplished by the local computer system and/or by the server-side operation.

In certain circumstances, for example where deficiencies in plant health are indicated, the processed spectral images may be provided for spectral code screening and pattern recognition processing 53. Through such processing, the normalized and/or processed spectral images may be further processed to screen for spectral codes and known data patterns that may, for example, be indicative of specific diseases, pests, contaminants, nutrient problems, and/or the like. AI may perform process 53; accordingly, the accuracy and/or speed of process 53 may continually improve. The resulting processed images may be stored in spectral image data database 41. It is contemplated that processes 52 and 53 may be accomplished by the server-side operation because such data processing and AI may require substantial processing power, but this disclosure is not so limited.

As will be discussed in further detail herein, data stored in spectral image data database 41, recorded sensor data database, and user input data database 43—in addition to data assessments from processes 52 and 53 (arrows not depicted in FIG. 1A)—may be provided to precision agricultural model process 54, which may iteratively derive a precision agricultural model over multiple crop cycles. Such precision agricultural model may provide suggestions and instructions to users in cultivator feedback process 70 at various stages of the cultivation cycle. It is contemplated that process 54 may be accomplished by the server-side operation because it may require substantial processing power and AI use, but this disclosure is not so limited.

Feedback process 70 from may also provide information to users regarding data stored in spectral image data database 41, recorded sensor data database, user input data database 43, and assessments from processes 52 and 53. Feedback process 70 may provide users information via a dashboard interface, alerts, processed images, and/or cultivation reports. In one example, an immediate alert may be issued if collected environmental sensor data falls outside of threshold ranges, perhaps for beyond a threshold amount of time; or where urgent plant health issues or the like are detected.

Anomalies detectable by spectral codes and/or patterns may be provided in appropriate end member libraries 44. In some embodiments, a spectral code derivation process 62 may be utilized to derive spectral codes, including hyperspectral codes and multi-spectral code sets, which may be provided to end member libraries 44. Other anomalies may be characterized and validated via an anomaly validation process 61. Process 61 may use AI to determine patterns likely to reflect specific diseases and other known anomalies. Process 61 may further employ certain manual inputs in order to focus AI processes on particular target images, or portions thereof, (e.g., from spectral image data database 41) that depict a known anomaly. It is contemplated that processes 61 and 62 may be accomplished by the server-side operation, but this disclosure is not so limited.

Figures 1B, 1C:
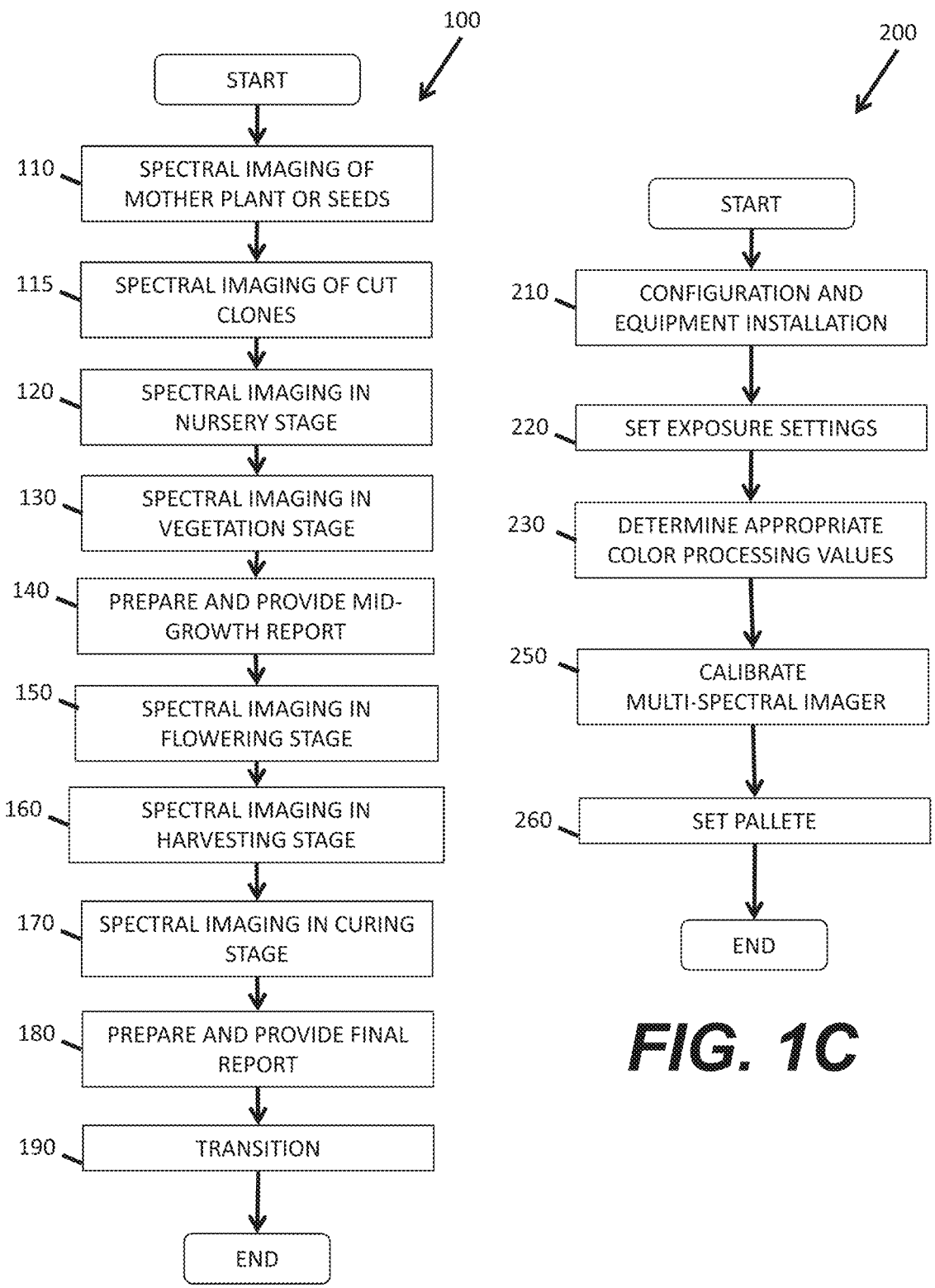
FIG. 1B is a flowchart illustrating a method for using a cultivation monitoring system throughout a cannabis cultivation life cycle, in accordance with exemplary embodiments.
FIG. 1C is a flowchart illustrating a method for setting up a local installation of a cultivation monitoring system, in accordance with exemplary embodiments.

With reference to FIG. 1B, an embodiment of a method 100 for using a cultivation monitoring system throughout a cannabis cultivation life cycle is provided. Although not recited with respect to each step, it is contemplated that the spectral images, processed data, reports, and the like, may be stored in the local computer system and/or databases of the server-side operation. Further, it is contemplated that various aspects of data processing referenced in method 100 may occur in the local computer system and/or in the server-side operation.

As in step 110, one or more spectral images of the plant source may be taken. If the cultivated plants are to be grown from clones, spectral image(s) of the mother plant may be taken. In preferred embodiments, two images may be taken. The acquired spectral data may be processed to generate displayable false color health images of the mother plant, for example, as depicted in FIG. 2L. Additional detail on the spectral data processing to provide health images is disclosed below. Such mother plant health images may be provided to users on a dashboard interface, and may advantageously serve to guide cultivators as to which portions of the mother plant should be used for cutting clones. That is, the cultivation monitoring system may suggest healthy portions of the mother plant may be used to cut clones, thereby increasing the likelihood that the resulting clones will be healthy and viable. In some embodiments, spectral imagery of the mother plant may be further processed to ensure a lack a disease, various chemical contaminants, or other anomalies, as further disclosed herein. The clones may be planted for initial growth. The process may proceed to step 115.

Also, as in step 110, if the cultivated plants are to be grown from seeds, spectral image(s) of the seeds may be taken. In preferred embodiments, two images may be taken and such imagery may be taken approximately 1-2 hours after the seeds have been exposed to water or otherwise readied for germination. The acquired spectral data may be processed to generate seed viability images, for example, as depicted in FIG. 2J. Additional detail on the spectral data processing to provide seed viability images is disclosed below. Such seed viability images may be provided to users on a dashboard, and may advantageously serve to guide cultivators as to which seeds should be planted for sprouting and which seeds should be discarded. That is, the cultivation monitoring system may suggest which seeds are most likely to germinate, thereby increasing the likelihood that there will be resulting sprouts and that such sprouts will be healthy and viable. In some embodiments, spectral imagery of the seeds may be further processed to ensure a lack a disease, various chemical contaminants, or the like. Viable seeds may be planted for sprouting and initial growth. Where the cultivated plants are to be grown from seeds, the process may skip ahead to step 120.

As in step 115, spectral image(s) of the cut clones may be taken, for example, approximately 48 hours after cutting. Typically, cannabis clones are put into trays, Rockwool cubes, starter plugs, or the like promptly after being cut from the plant—and are not planted for nursery stage growth until they at least appear viable. In some embodiments, such image(s) may be taken 36-60 hours or even 30-66 hours after the clones have been cut. In certain embodiments, for example as discussed below, a spectral image may be taken of an entire batch of clones. The acquired spectral data may be processed to generate health image(s) of the clones, which may be provided to users on a dashboard—with or without threshold assessments, and may then advantageously serve to guide cultivators to cull unhealthy clones. That is, the cultivation monitoring system may suggest unhealthy clones to be discarded, thereby increasing the likelihood that the remaining clones—and resulting plants— will be healthy and viable. In some embodiments, spectral imagery of the clones may be further processed to ensure a lack a disease, various chemical contaminants, or the like. The process may proceed to step 120.

As in step 120, one or more spectral images of the clones/sprouts may be taken. In preferred embodiments, the clones/sprouts may be imaged daily during the nursery stage. Typically, the nursery stage of a cannabis plant lasts between one to two weeks. Accordingly, in some embodiments, between 7 and 14 spectral images may be captured in step 120. The acquired spectral data may be processed to generate health images of the clones/sprouts, for example, as shown in FIGS. 2E-2G. Such images may be provided to users on a dashboard with or without threshold assessments, for example, as shown in FIGS. 2H and 2I, respectively—and may then advantageously serve to guide cultivators to cull unhealthy or less viable clones/sprouts based on one, a subset, or all of the health images. In some embodiments, spectral imagery of the clones/sprouts may be further processed to ensure a lack a disease, various chemical contaminants, or the like, as further disclosed herein.

At the end of the nursery stage, and guided by the health images of the clones/sprouts, a cultivator may replant healthy and viable clones/sprouts for vegetative growth, thereby increasing the likelihood that resulting plants will be healthy and productive. In preferred embodiments, step 120 may advantageously be accomplished using an embodiment of clone imaging apparatus 11, disclosed herein, and via clone imaging methodologies disclosed below. Additionally, in some embodiments, spectral imagery of later-stage clones/sprouts may be further processed to determine plant sex using methodologies disclosed herein. In such embodiments, the cultivation monitoring system may provide clone/sprout sex data to the cultivator via the dashboard; the cultivator may cull male clones/sprouts in response. The process may proceed to step 130.

As in step 130, one or more spectral images of the plants may be taken during the vegetative stage. In preferred embodiments, the plants may be imaged daily during vegetative stage growth. Typically, the vegetative stage growth of cannabis plants last between 21 and 35 days. The acquired spectral data may be processed to generate health images and thereby provide plant health assessments. Further, the acquired spectral data may be further processed to assess disease presence, pest presence, chemical contamination, nutrient distribution, and/or the like. In some embodiments, this further processing may only proceed in response to adverse health assessments. In response to a finding of health-related anomaly, the cultivator may be instructed to take remedial action, including, but not limited to treating disease, taking action to eliminate pests, checking and/or altering nutrient and water supplies, and/or removing affected plants or portions thereof from the grow. At the conclusion of step 130, the cultivator may be provided with a mid-growth report as in step 140.

As in step 140, a mid-growth report may be generated to provide a cultivator with assessments and images of the plants at the end of the vegetative stage. Accordingly, such report may guide or instruct the cultivator as to which plants should be culled prior to the flowering stage due to ill health, infections, or the like. In some embodiments, the mid-growth report may include or be derived from all or substantially all of the captured spectral images. Further, the mid-growth report may guide or instruct the cultivator as to which plants may suffer from curable maladies and should be treated before the flowering stage begins. The process may proceed to step 150.

As in step 150, one or more spectral images of the plants may be taken during the flowering stage. In preferred embodiments, the plants may be imaged daily during flowering stage growth. Typically, the flowering stage growth of a cannabis plants lasts approximately 49-63 days. The acquired spectral data may be processed to generate health images and thereby provide plant health assessments. Further, the acquired spectral data may be further processed to assess disease presence, pest presence, chemical contamination, nutrient distribution, and/or the like. In some embodiments, this further processing may only proceed in response to adverse health assessments. In response to a finding of a health-related anomaly, the cultivator may be instructed to take remedial action, including, but not limited to treating disease, taking action to eliminate pests, checking and/or altering nutrient and water supplies, and/or removing affected plants or portions thereof. The process may proceed to step 160.

As in step 160, one or more spectral images of the fully developed flowers may be taken during the harvesting stage—e.g., just prior to cutting the flowers from the plant, just after cutting, and/or after trimming the flowers. In some embodiments, two images may be taken and processed to validate the health and quality of the flowers prior to curing. Images from this stage may be considered particularly important for maintaining records or making certain types of assessments of the final product. The process may proceed to step 170.

As in step 170, one or more spectral images of the harvested flowers may be taken during the curing stage. Typically, a cultivator may attached the harvested flowers onto racks in a controlled environment and allow them to cure for approximately 7-14 days. In preferred embodiments, such spectral images may be taken daily during the curing stage and may be processed to assess moisture content and/or residual photosynthesis. Additional detail on such processing is disclosed in further detailed below. Resulting processed images—with or without assessments—may be provided to the cultivator via the dashboard and may instruct or guide the cultivator to ensure that each harvested set of cannabis flowers is sufficiently cured and/or exits the curing stage before over-curing occurs. Further, in some embodiments, the spectral image(s) for curing (and/or additional images taken during the curing stage) may be processed for further assurance that the cured (or curing) flowers do not suffer from disease, pest, chemical, or other contamination. The cured flowers may be packaged for consumer or downstream business consumption and the process may proceed to step 180.

As in step 180, a final crop report may be generated to provide a cultivator with assessments and images that are representative of the entire crop cycle. In some embodiments, the final crop report may include or be derived from all or substantially all of the captured spectral images. It may further include challenges faced and corrective actions taken. Further, such final report may include additional information regarding the crop, for example, the strain cultivated; the timing, type, and amount of nutrients, light, and water provided; the spacing of plants; the timing of the various cycles; assessments of growth, yield, and quality; cannabinoid levels of the final product; and/or the like. The process may proceed to step 190.

As in step 190, the acquired and processed data and image sets may be transitioned from their respective databases for precision agriculture process 54. Here, the AI may use such data from the crop cycle to iteratively develop and/or refine a Strain Analytics precision agriculture model. Process 100 may be completed.

Figure 12A:
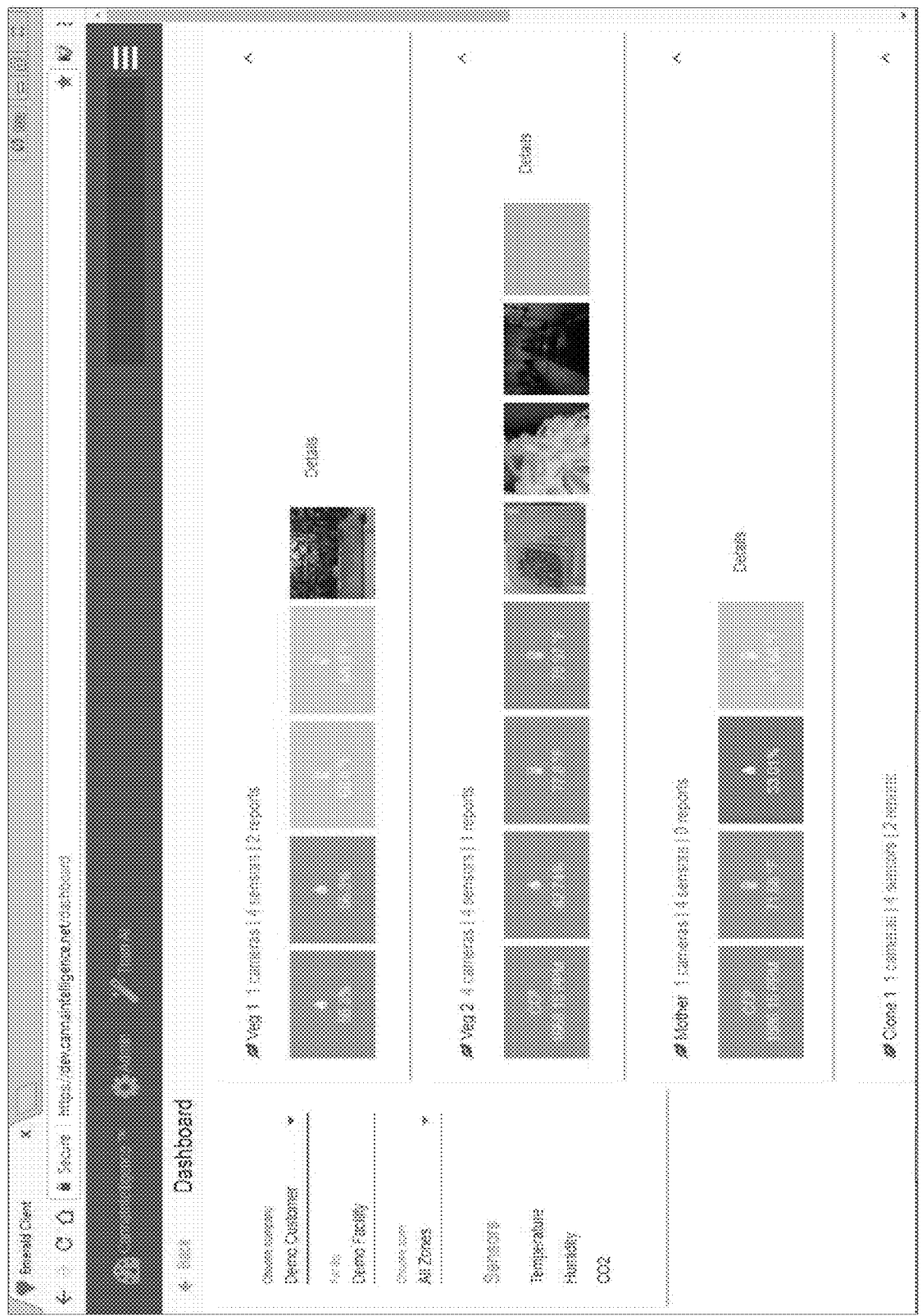
FIG. 12A-12D are screen shots of a dashboard of a cultivation monitoring system, in accordance with exemplary embodiments.
Figure 12B:
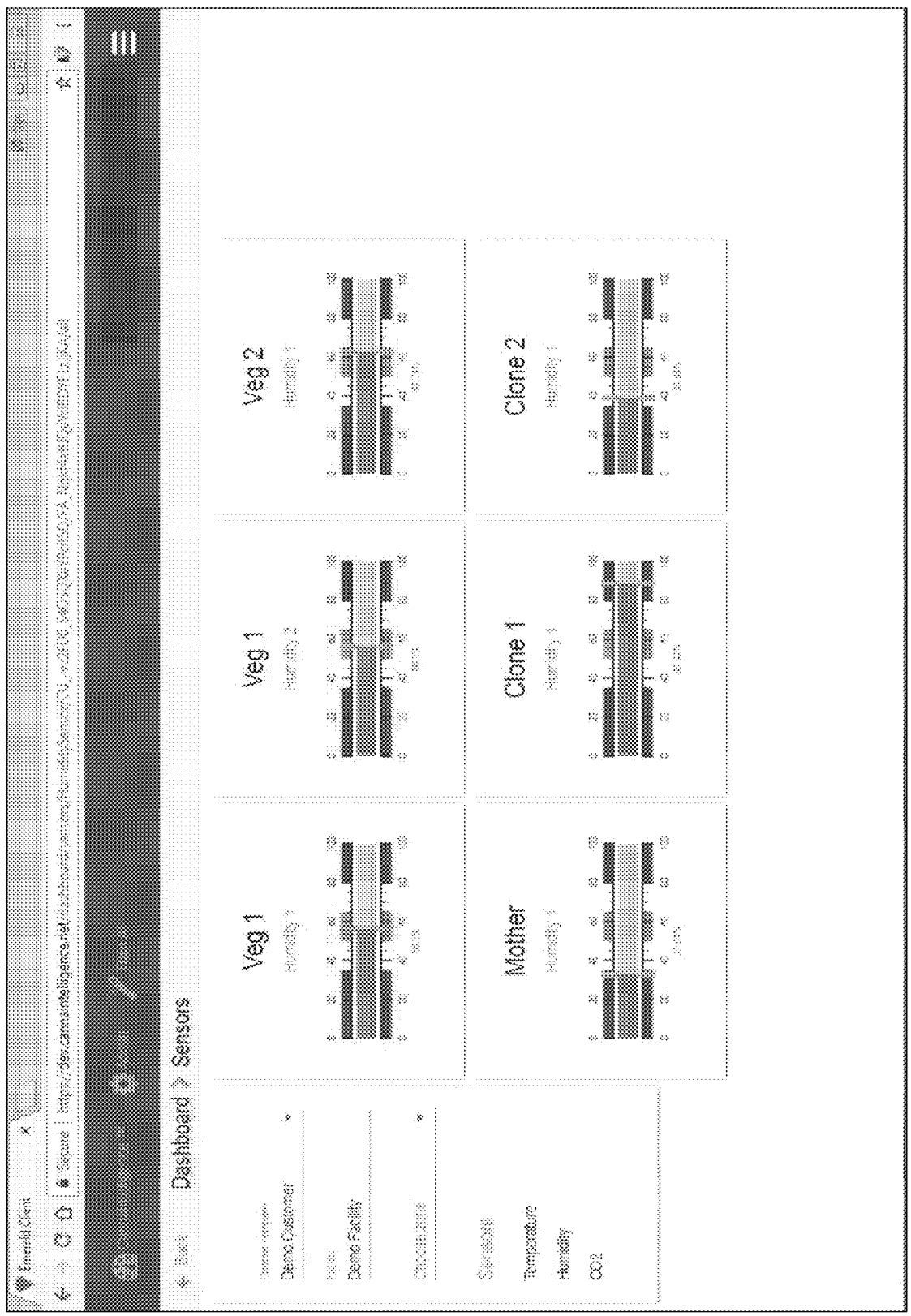
Figure 12C:
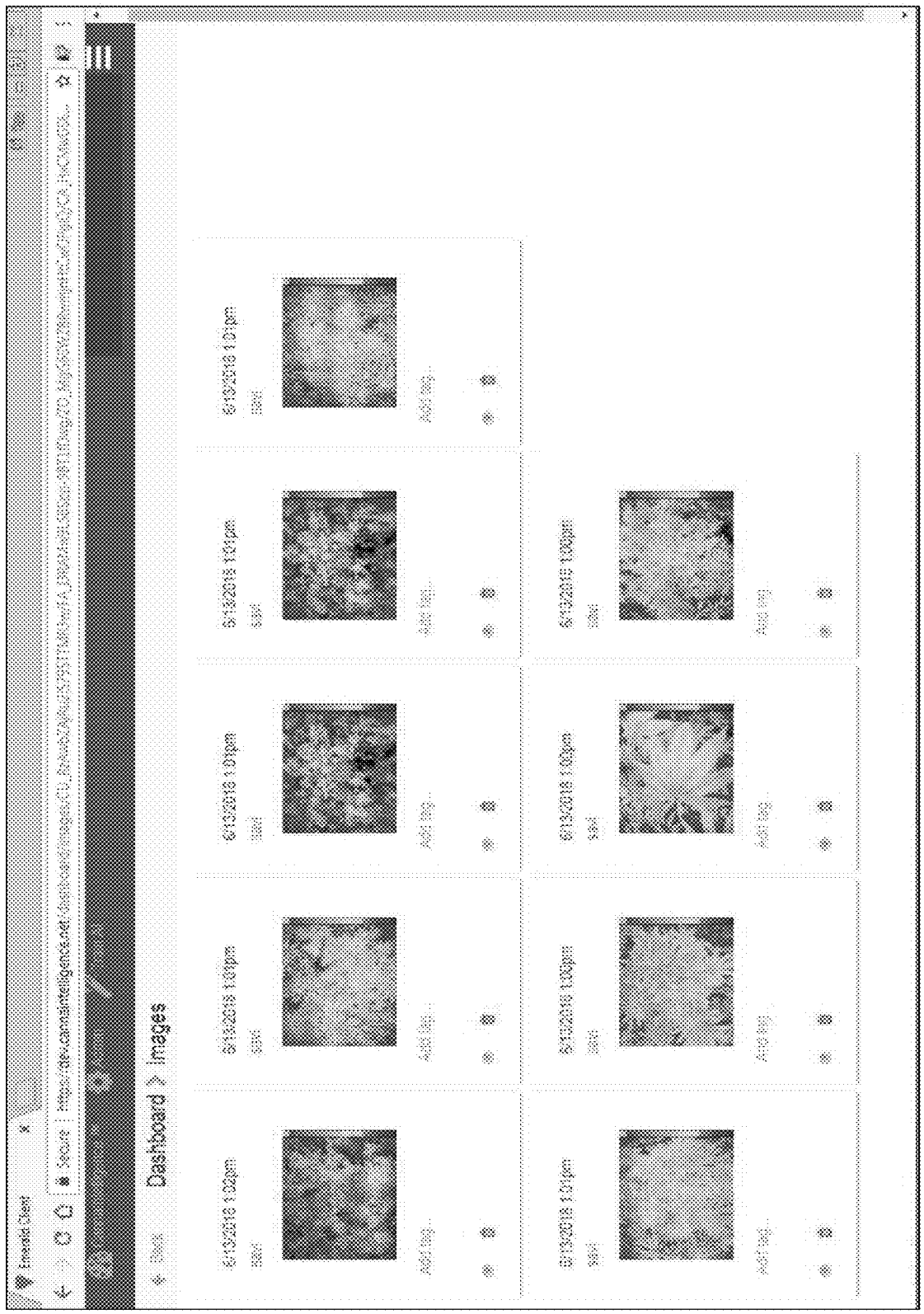
Figure 12D:
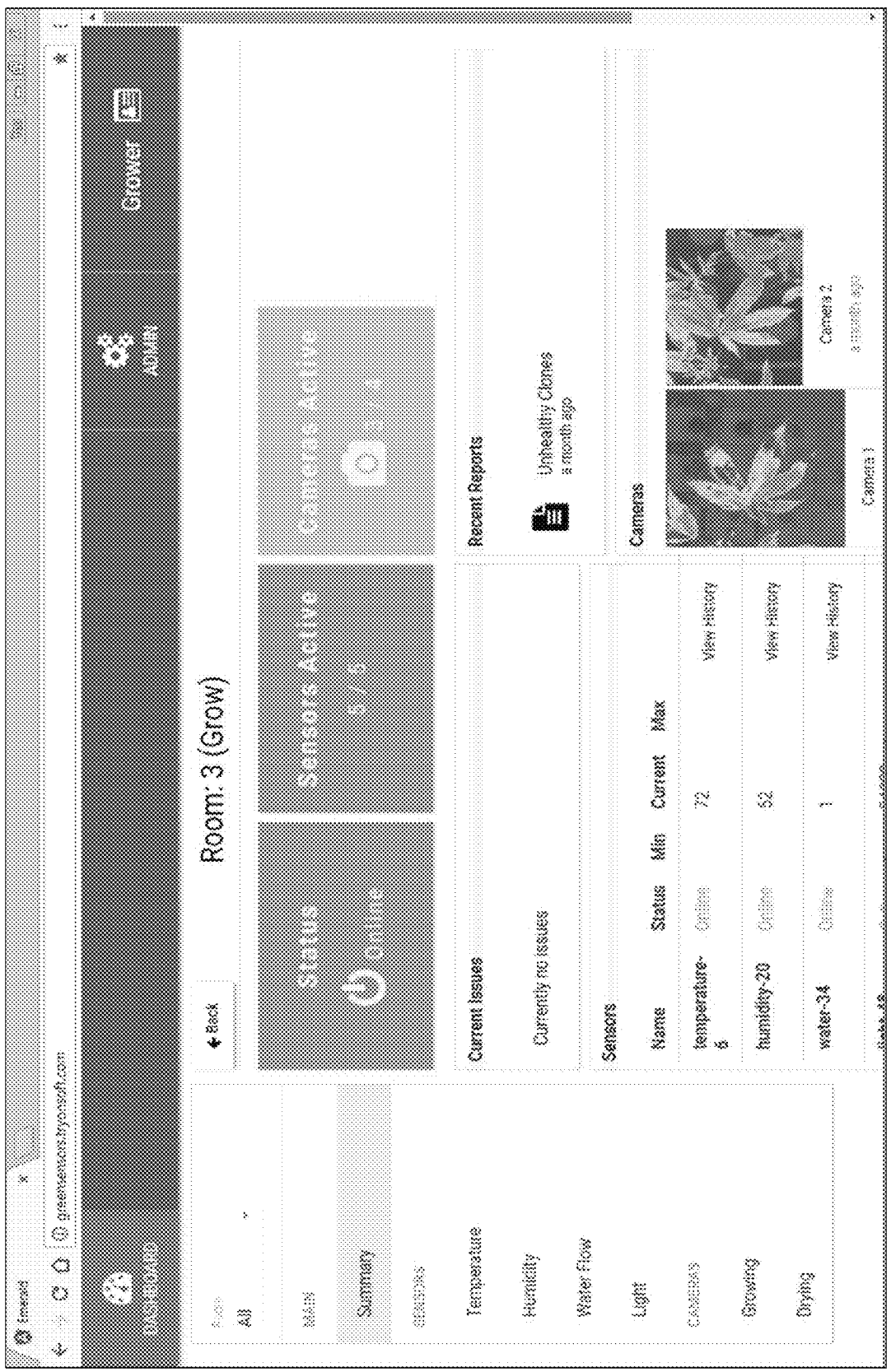

FIGS. 12A-12D depict screenshot images of an exemplary dashboard interface—a software-based visualization tool where imagery and data collected is displayed for the customers. More specifically, as depicted in FIG. 12A, the dashboard may provide a high-level data view of a grow facility, and may segregate such cultivation data by crop grouping (e.g., Veg1, Veg2, Mother, Clone). For each grouping, the dashboard may provide information on available data and data sources—including environmental sensors, imagers, and already-prepared reports; it may also provide environmental sensor readings and thumbnail images of RGB and processed spectral images. Additionally or alternatively, as depicted in FIG. 12D, the dashboard may further provide a system status overview screen. As depicted in FIG. 12B, the dashboard may further provide sensor data in detail, including illustrating optimal ranges and problematic ranges for environmental data (e.g., humidity). As depicted in FIG. 12C, the dashboard may further provide thumbnails of available images. Such thumbnails may be grouped and/or sorted, for example, by source camera, by source crop, temporally, by zoom level, or by another other method that would be appreciated by a cultivator or person of skill in the art. Selecting a thumbnail image in the dashboard may result in the display of a full-size or larger version.

Hyper-Spectral and Multi-Spectral Imaging

As disclosed in, for example, U.S. Pat. No. 10,078,890, issued Sep. 18, 2018, it is known that hyper-spectral imaging techniques may be used to detect anomalies in agriculture. However, the use of such techniques is not easily applicable to cannabis cultivation because, for example, certain spectral data assessment thresholds may not be appropriate for different strains (which may sometimes be referred to within the industry as cultivars); different types of lighting used for cannabis cultivation; and because hyper-spectral imagers— which to date have been required for accurately detecting certain spectral signatures—are prohibitively expensive for widespread use.

A multi-spectral image is one that represents a captured scene in terms of specific bands of electromagnetic radiation that often include frequencies outside of the visible spectrum. Many invisible bands of radiation, especially in the near infrared (NIR) band, provide information that is valuable in the study of vegetation. Multi-spectral images may be viewed as single monochromatic (gray-scale) images of one band at a time or in combinations of three bands in a common composite image. In color photography, color composite images are made up of varying levels of closely spaced true colors (red, green and blue) that faithfully communicate the visible colors in a scene to the red, green, and blue color receptors in our eyes.

Hyper-spectral imaging is related to multi-spectral imaging. Hyper-spectral imaging, however, collects data from virtually continuous and virtually contiguous ranges of wavelengths (e.g., 400-1100 nm with negligible gaps of, for example a 1 nm). By contrast, multi-spectral imaging typically collects data from a subset of targeted wavelengths at chosen, and sometimes disparate locations (e.g., 400-950 nm with gaps of at least 20 nm between bands). Further, hyper-spectral images tend to span over a wider range of wavelengths than multi-spectral images. Another common difference between multi-spectral and hyper-spectral is the number of discrete wavelength bands where energy is measured. Accordingly, hyper-spectral data provides much greater precision than multi-spectral data.

Multi-spectral data and hyper-spectral data generally refer to representations of intensity of electromagnetic radiation received radiation in a plurality of predetermined discrete wavelength bands. With reference to FIG. 10A, broadband refers to a continuous range of wavelengths of electromagnetic radiation; multi-spectral and hyper-spectral data offer radiation measurements for specified bands over some or all of the same continuous range.

In spectral imaging, either multi-spectral or hyper spectral data may be gathered for each pixel. Accordingly, each pixel within a spectral image may include a measure of electromagnetic intensity in each measured band. Intensity is often represented as value between 0-255 for ease of computing, but may also be represented as a percentage, as a value between 0 and 1 and/or the like). A typical multi-spectral image may have between 3 and 20 measured bands. A typical hyper-spectral image may have between 3 and 300 measured bands, with such discrete bands being virtually contiguous along captured portion of the electromagnetic radiation spectrum.

In another aspect, spectral imaging may be utilized to recognize various materials based upon their spectral code, which may be understood to be the variation of reflectance of a particular material at certain wavelength bands. As is known in the art, spectral codes for many materials, including, for example various metals and other elements have been established. To date, use of spectral code technology has been limited to high-precision hyper-spectral imaging devices (and ultra-spectral imaging devices). As disclosed further herein, a spectral code may be used a "fingerprint" of materials whose presence may indicate, for example, the presence or absence of particular diseases, pests, nutrients, moisture, and various contaminants. A spectral code expressed as multi-spectral data may be referred to as multi-spectral code or as a multi-spectral code set; a spectral signature expressed as hyper-spectral data may be referred to as hyper-spectral code.

Certain cultivation monitoring system embodiments may use hyper-spectral images and hyper-spectral code to identify and classify plant-based anomalies. Hyper-spectral imagers may be used to generate hyper-spectral code for agriculture-based anomalies. For this process, a portable hyper-spectral imager may set up in a lab facility in in a configuration similar to the clone imaging apparatus depicted in FIGS. 11A-11C. A malady or other anomaly may be provided, cultivated, or grown as a control. The hyper-spectral imager may be placed over the target to be imaged, zoomed to a pixel level, and a crosshair reticle may be placed over the target to be imaged. As the image is taken, a hyper-spectral code may be produced at the target point. That hyper-spectral code may be collected and documented as indicative of the malady or other anomaly loaded into in the appropriate database end member library 44.

As disclosed in further detail below, certain cultivation monitoring system embodiments may use multi-spectral images and multi-spectral code sets (and/or multi-spectral code) to identify and classify various plant-based maladies and like. However, because each pixel of multi-spectral data includes intensities for fewer wavelength bands than a pixel of hyper-spectral data, a multi-spectral code match with a pixel of a multi-spectral image may provide a less conclusive identification of a target material than a hyper-spectral code match with a pixel of a hyper-spectral image. Nonetheless, due to the high cost of hyper-spectral imaging equipment, multi-spectral coding techniques may be advantageously used in many circumstances, including, for example, the cultivation of cannabis.

In some embodiments, to generate multi-spectral code sets (and/or multi-spectral code), a portable multi-spectral imager may be used in controlled and/or field conditions to image targets indicative of one or more particular disease, nutrients, pesticide, pests, metals, strain, and/or the like. In many cases, however, multi-spectral imaging alone may not be refined enough to determine and classify an anomaly with sufficient reliability. Accordingly, it may be preferred that hyper-spectral code be used as a baseline and/or for confirmation purposes when deriving a multi-spectral code set (or code) for a target material.

One reason for this preference may be because multi-spectral data is much less refined and detailed than hyper-spectral data. Beyond the difference in size of the data set for each spectral pixel, e.g., due deferring number of discrete wavelength bands measured, hyper-spectral images tend to have higher-resolution that multi-spectral images. That is, a single pixel of a hyper-spectral image represents reflectance readings from a smaller physical surface than that of a single pixel of a multi-spectral image. Accordingly, each pixel of captured multi-spectral data may be more likely to collectively portray reflectance values from two or more materials, for example, where such materials intersect within or along the single multi-spectral pixel. In other words, a pixel of multi-spectral may effectively average reflectance values from too much physical surface area, and thereby introduce accuracy errors when, for example, deriving multi-spectral code sets. The use of hyper-spectral code when deriving multi-spectral code sets may assuage such issues.

Additionally, the use of hyper-spectral code when deriving multi-spectral code sets may improve accuracy in identifying similar diseases, anomalies, and/or other targets. For example, powdery mildew and black mildew may appear almost indistinguishable in multi-spectral data, and indeed, their respective multi-spectral code sets may overlap. However, the hyper-spectral code corresponding each respective disease may be used to determine and/or confirm that minor distinctions in multi-spectral data samples are not background noise. Additionally, such hyper-spectral codes may be used to include measures of likelihood within multi-spectral code sets that, for example, may indicate probabilities that a multi-spectrally imaged plant is infected with powdery mildew versus black mildew.

Figure 9A:
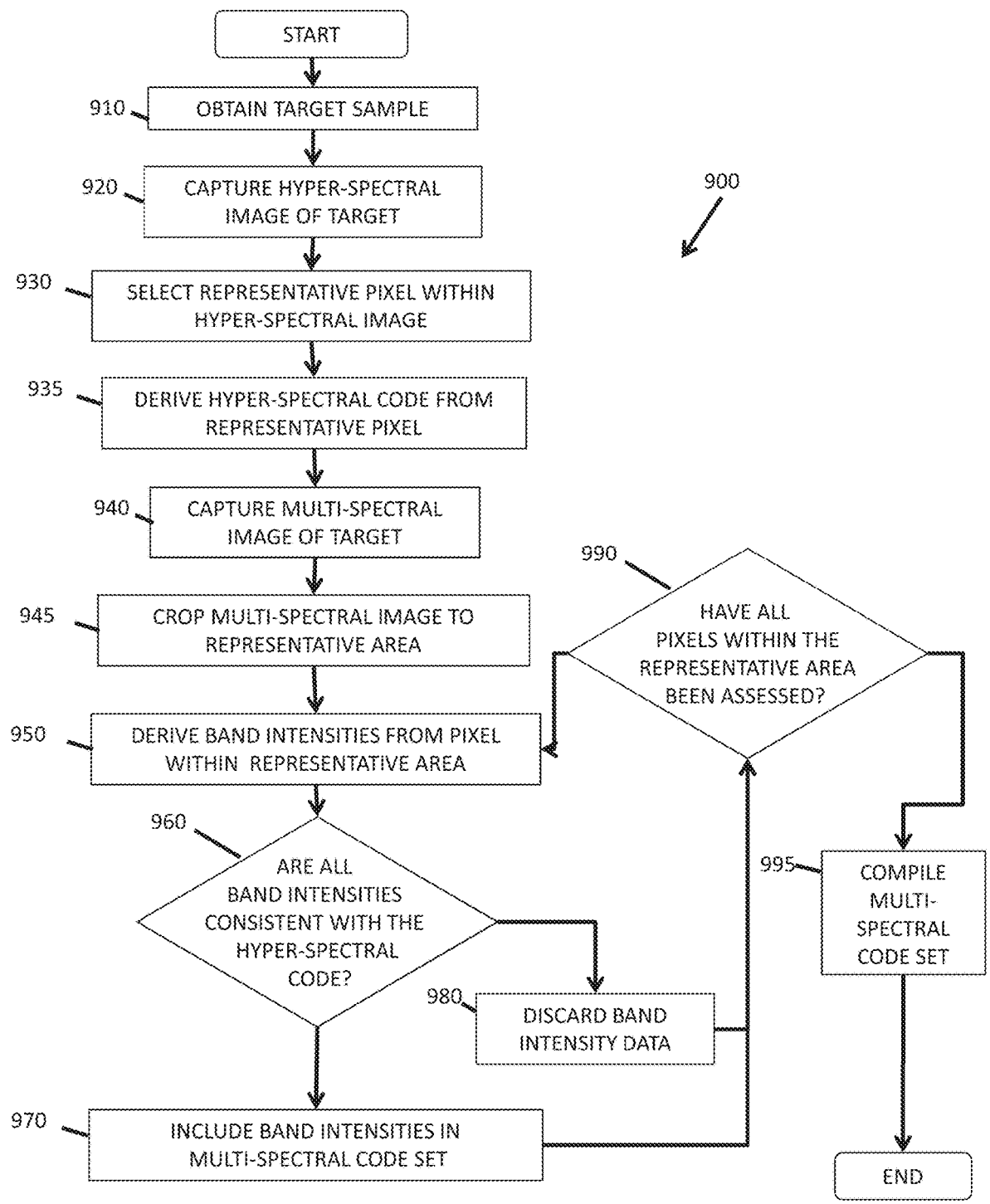
FIG. 9A is a flowchart illustrating a method for generating a reliable multi-spectral code set corresponding to a target material, in accordance with exemplary embodiments.

With reference to FIG. 9A, an embodiment of a method 900 for generating reliable multi-spectral code sets is provided.

As in step 110, a target sample of the target material sought to be spectrally coded may be obtained. For example, a seed, leaf, flower, or the like of, for example, specified cannabis strain; a segregated metal, nutrient, pesticide component, or other chemical in pure form; a pest, pest part, or pest byproduct; or a plant-based disease sample may be procured. In some embodiments, the plant-based disease sample may be particular to a particular strain (e.g., Blue Magoo) as well as a particular disease (e.g., powdery mildew). Furthermore, the target samples for plant material, pests, and disease may be particular to their respective growth stages. After the target sample is provided, the method may proceed to step 920.

As in step 920, a hyper-spectral image of the target sample may be captured by, for example, a hyper-spectral imager. For this step, a portable hyper-spectral imager may set up in a lab facility in a configuration similar to that of clone imaging apparatus depicted in FIGS. 11A-11C. The hyper-spectral imager may be placed over the target sample and zoomed to a pixel level. In some embodiments, the hyper-spectral image may be normalized to account for, for example, light conditions and the like. The method may proceed to step 930.

As in step 930, a representative pixel of the target sample may be selected from within the hyper-spectral image. In some embodiments, a user may utilize a crosshair reticle via software for working with hyper-spectral images and/or controlling a hyper-spectral imager to select the representative pixel. The method may proceed to step 935.

Figure 9C:
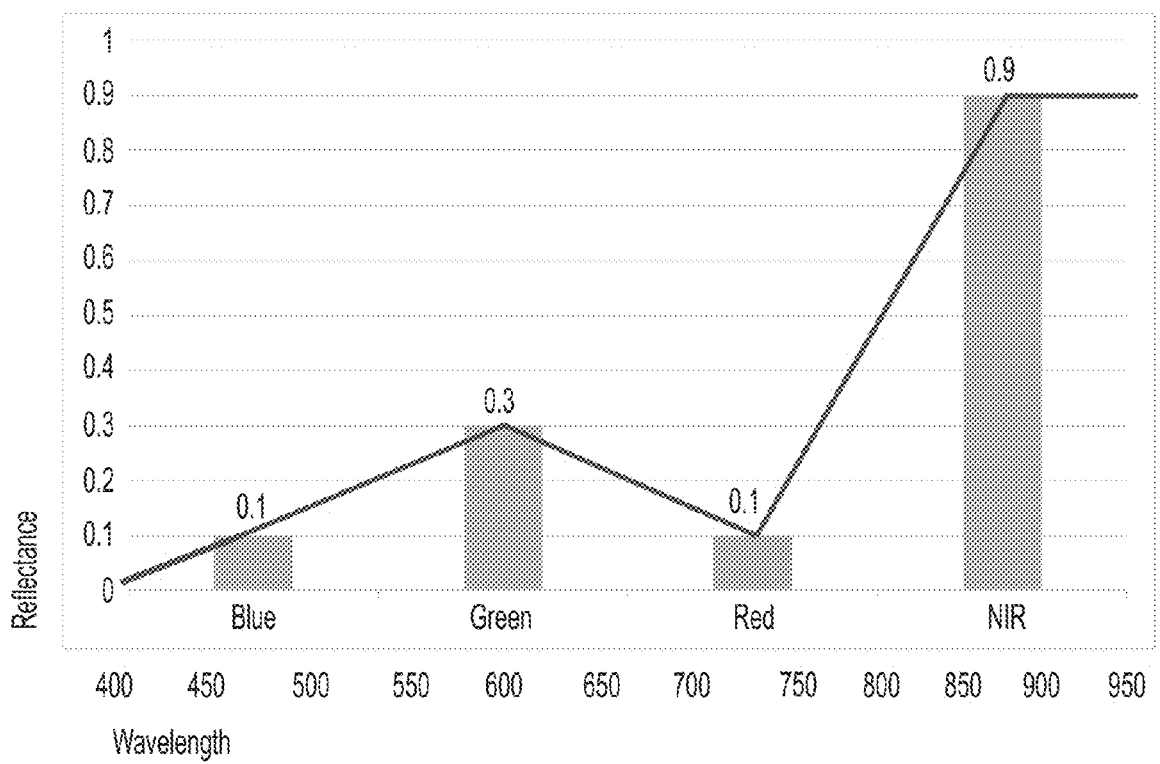
FIGS. 9B and 9C are graphs depicting sample multi-spectral and hyper-spectral bandwidth intensities that illustrate aspects of a method for generating reliable multi-spectral code sets, in accordance with exemplary embodiments.

As in step 935, hyper-spectral code may be derived as the hyper-spectral data of the representative pixel. Such derived data may be considered indicative of the material of the target sample. In some embodiments, some or all of steps 920, 930, and 940 may be repeated with multiple pixels and/or images to ensure accuracy of the derived hyper-spectral code. FIG. 9C is a graph providing an illustrative example of derived hyper-spectral code, with reflectance intensity depicted on the y-axis and measured wavelength bands along the x-axis. The method may proceed to step 940.

As in step 940, a multi-spectral image of the target sample may be captured by, for example, a multi-spectral imager. For this step, a portable multi-spectral imager may set up in a lab facility in in a configuration similar to the clone imaging apparatus depicted in FIGS. 11A-11C. The multi-spectral imager may be placed over the target sample to capture multi-spectral imagery on, to the extent practicable, the same portion of the target sample captured in step 920. In some embodiments, the multi-spectral image may be normalized to account for, for example, light conditions and the like. The method may proceed to step 945.

As in step 945, the multi-spectral image may be cropped so that all portions that do not represent the target material being spectrally coded within target sample are excised. In other embodiments, portions of the multi-spectral image that do represent the target material being spectrally coded may be selected. The process may proceed to step 950.

Figure 9B:
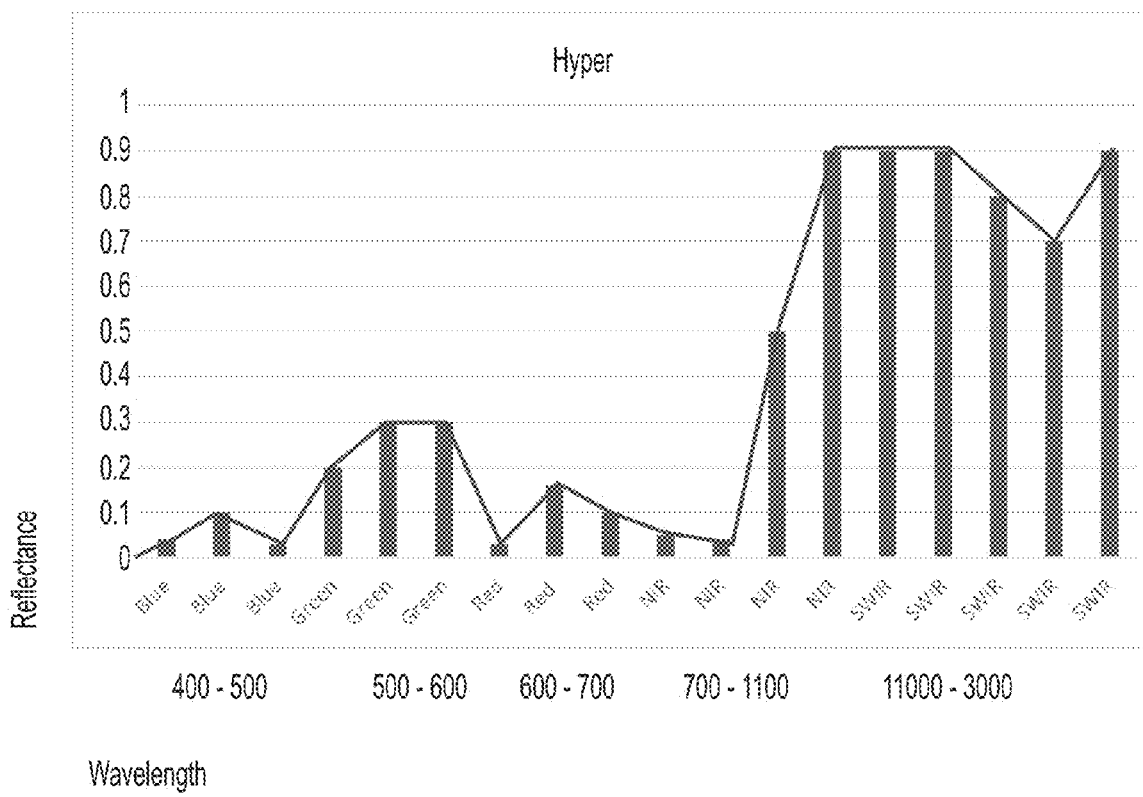

As in step 950, a pixel from within the cropped or selected portion of the multi-spectral image may be designated. Then band intensities from the designated multi-spectral pixel may be derived. In one example, the derived band intensities may include an intensity level from each of the Red, Green, Blue, and NIR bands. For example, FIG. 9B is a graph providing an illustrative example of band intensities from a designated multi-spectral pixel, with reflectance intensity depicted on the y-axis and measured wavelength bands along the x-axis. The method may proceed to step 960.

As in step 960, the band intensities derived from the designated multi-spectral pixel are assessed for consistency with the derived hyper-spectral code (e.g., from step 930). In one embodiment, the consistency assessment may include assuring that the intensity of each multi-spectral band is within the range of intensities derived from the hyper spectral code for wavelengths within that band. If all multi-spectral band intensities of the designated pixel are consistent with the hyper-spectral code, the process may proceed to step 970. If at least one multi-spectral band intensity is not consistent with the hyper-spectral code, the method may proceed to step 980.

By way of example, with reference to FIG. 9C, intensities of reflected within the hyper-spectral code encompassing the Red band range from 0.05 to 0.15. Accordingly, consistency for the Red band may be found if the Red band intensity of the designated multi-spectral pixel falls within that range. With reference to the example of FIG. 9B, the Red band intensity of the designated multi-spectral pixel is 0.1, and therefore falls within the range and may be considered consistent. Accordingly, provided that multi-spectral band intensities of the designated pixel are consistent with the hyper-spectral code for the remaining bands (e.g., Blue Green, and NIR with reference to FIG. 9B), the method may proceed to step 970. If the band intensities were inconsistent for any band, the method may proceed to step 980.

As in step 970, the multi-spectral data of the designated multi-spectral pixel may be retained for inclusion in the multi-spectral code set. The method may then proceed to step 990.

As in step 980, the multi-spectral data of the designated multi-spectral pixel may be discarded. The method may then proceed to step 990.

As in step 990, it may be determined whether all pixels within the cropped or selected portion of the multi-spectral image have been assessed for consistency. If all multi-spectral pixels have been assessed, the method may proceed to step 995. If more multi-spectral pixels remain to be assessed, another pixel from within the cropped or selected portion of the multi-spectral image may be designated and the method may loop back to step 950.

As in step 995, the multi-spectral code set may be compiled from the retained multi-spectral data of consistent pixels (e.g., from step 970). The compiled multi-spectral code set may include permissible ranges of intensities for each multi-spectral band that correspond to the target material. In some embodiments, the compiled multi-spectral code set may further categorize portions within each permissible intensity range as being indicative of, for example, a particular likelihood of target material correspondence. Such categorizations may be derived based on the distribution of intensity data within each band of the retained consistent pixels. Further, in some embodiments, a target material likelihood correspondence percentage may be derived for each categorized portion of each permissible range.

In some circumstances, for example, if an insufficient number of consistent pixels (e.g., from step 960) are retained, it may be determined that no multi-spectral code set should be derived because it would not be sufficiently reliable. In some embodiments, this may occur, if less than a certain number consistent pixels are retained, or if less than a particular fraction of the cropped or selected portion are deemed consistent. If likelihood correspondence percentages are to be derived, it may be preferred that a substantial number consistent pixels are retained, for example, at least 1,000 pixels. However, it is contemplated that, in some embodiments, consistent pixels may be retained from a plurality of multi-spectral images or portions thereof.

The process may be completed. The resulting multi-spectral code set may be utilized in, for example, embodiments of the cultivation monitoring system disclosed herein to, for example, identify, classify, provide measures of likelihood thereof, and/or the like for various cultivation anomalies and/or various cannabis strains. In some embodiments, each multi-spectral code set may be loaded into the appropriate database end member library 44.

Cultivation Monitoring System Setup and Calibration

With reference to FIG. 1C, an embodiment of a method 200 for setting up a local installation of a cultivation monitoring system is provided.

As in step 210, a local installation may be configured and its equipment installed. Preferably, such local installation may be customized for the needs of a particular cultivator. At least one multi-spectral imager directed to image the grow operation may be provided and installed. A local computer system may be installed. Environmental sensors may be installed, and/or already-existing environmental sensors may be configured to provide sensor data to the local computer system. Configuration may further include, for example, software and application installs, tablet configuration, and hotspot or Internet configuration. Customers may be provided with local or network-based access to a dashboard interface; such dashboard interface may be customized to provide feedback on one or more zones within the grow operation. Such customization may advantageously provide for, within certain dashboard displays, segregated areas to view the imagery corresponding to locations within the operation. The method may proceed to step 220.

As in step 220, exposure settings for the multi-spectral imager may be set or adjusted for the lighting conditions in the grow facility. Exposure time may be determined empirically by adjusting exposure time up and/or down until an RGB visual image provided by the spectral image is neither over nor under exposed. Manual exposure adjustments may be made through the use of a light meter and with reference to an exposure value nomograph. In some embodiments, automatic exposure adjustments may be implemented by, for example, algorithmically detecting over or underexposed pixels in the RGB image and adjusting the exposure accordingly. In one example, an exposure time of 5500 microseconds may be set for HPS lighting with Lux readings light in the range of 3400 Lux. In another example, an exposure time of 30000 microseconds may be set for T5 florescent lighting with a measured intensity of 5600 Lux. The method may proceed to step 230.

As in step 230, color processing values, which may be used in calibration step 250, may be selected and/or determined. FIGS. 13D, 13E, 13G, and 13I are tables of exemplary color processing values that may be used in various circumstances.

Figures 13A, 13B, 13C, 13D, 13E:
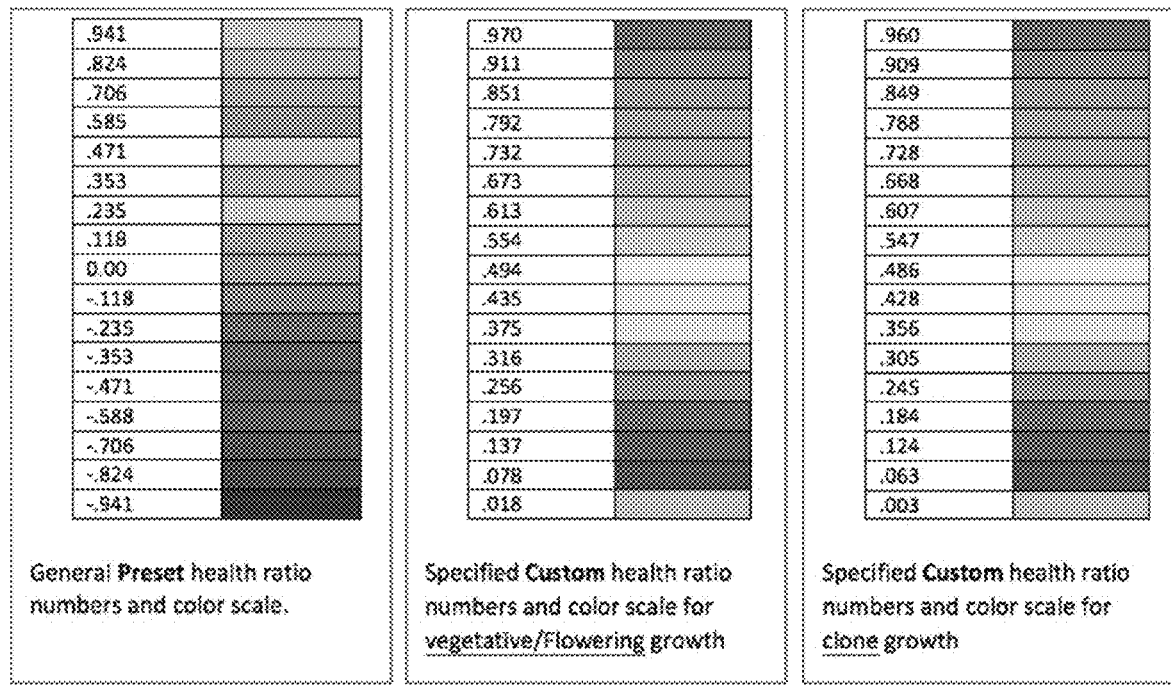
FIG. 13A illustrates a prior art palette file for generating plant health images.
FIGS. 13B and 13C illustrate palettes files for generating displayable false color health images, in accordance with exemplary embodiments.
FIGS. 13D and 13E are tables of color processing values for use in calibrating a multi-spectral imager in cultivation monitoring system, in accordance with exemplary embodiments.

In one embodiment, FIG. 13D is a table of default color processing values that may be used when cannabis in the vegetative or flowering stages is to be spectrally imaged. However, in certain embodiments, optimal color processing values for cannabis in such stages may be strain specific. In one example, optimal color processing values for a strain referred to as Superdave may be provided in FIG. 13G. In another example, optimal color processing values for a strain referred to as Blue Magoo may be provided in FIG. 13I.

Optimal color processing values for other strains may be derived experimentally. As would be appreciated by a person of skill in the art, processes of deriving such optimal values may include substantial trial and error. In one example, to derive a set of optimal color processing values for a strain, a multi-spectral image of a known good sample (e.g., healthy) of the strain, a known bad sample (e.g., unhealthy) of the strain, and a calibration target may be captured. The calibration target may be included to provide a normalization factor to account for the type and intensity of light where the multi-spectral image is captured. The raw image may be converted into a "Bayer" image. That image may then be reconstructed with software that determines the RGB, NIR and intensity of each pixel to create a more refined image. The more refined image may be may be repeatedly subject to demosaicing processing using color processing values that are candidates for the optimal color processing values for the strain. In some embodiments, default color processing values for cannabis, for example, as shown in FIG. 13B may be used as a starting point. In other embodiments, optimal color processing values for other cannabis strains that may be considered similar may be used as a starting point.

Each demosaiced image may be processed to generate a processed health image or the like (for example, as discussed below with reference to step 330), for example using NDVI. The resulting processed images may be assessed, manually and/or via pattern recognition software, to select a superior image that reflects a large difference in processed values between the known good sample and the known bad sample, and further reflects very low processed values (e.g., at or around 0) for inert material. In some embodiments, resulting processed images may also be used to generate displayable false color images, (for example, as discussed below with reference to step 350), using one or more candidate palette files, to assess the underlying images (and candidate palette files) by selecting a superior displayable image. Once an optimal processed image for a strain is selected, its corresponding color processing values may be selected as optimal color processing values for that strain.

FIG. 13E is a table of optimal color processing values that may be used when cannabis clones or sprouts in the nursery stage are to be spectrally imaged.

The method may proceed to step 250.

As in step 250, the multi-spectral imager may be calibrated. In preferred embodiments, a calibration file that accounts for the kind and intensity of light, as well as providing color matrix and lens vignetting corrections, may be created. Accordingly, applying such a calibration file to a raw multi-spectral image may normalize such image. In some embodiments, calibration may proceed as follows: An image of a calibration target, such as a known Teflon target, may be taken. The image may be cropped to the Teflon target in order to obtain reflectance and calibration values against the known material at, for example, 22.6% at 420-1050 nm. A calibration file, such as a .CPF file, may be created based on the obtained reflectance and the selected set of color processing values. Methods for creating baseline calibration files from such data are known in the art. The calibration file may be provided to the local computer system and/or an appropriate database in the server-side operation.

In some embodiments, multiple calibrations may be required or preferred. For example, in grow locations that may experience significant changes in light, such as greenhouses and outdoor farms, multiple calibration files may be created and appropriately saved. For example, in such circumstances, a different calibration file may be created and used for each light condition that the spectral imager may operate under, including, for example, morning, noon, evening, cloudy, hazy, and/or the like.

The method may proceed to step 260.

As in step 260, a palette file for generating displayable false color health images may be selected and set. A palette file may be understood as a file, such as an .ICF file, that maps health reflectance values and/or other derived spectral values to visible RGB color. With reference to FIGS. 13A-13C, 13F, and 13H, a palette file may be represented as a chart. FIG. 13A represents a conventionally-used palette for plant health values; values below and slightly above around 0.2 are depicted as various shades of red; values at or around 0.3 to 0.5 are depicted as shades of orange; and values at or above around 0.5 are depicted as various shades of green.

FIGS. 13B, 13C, 13F, and 13H depict exemplary non-prior art palette embodiments. As may be observed, values below, at, and, in some cases, slightly above 0 may be depicted as grey; values at or around 0.05 to around 0.3 are depicted as shades of red; values at or around 0.3 to around 0.5 are depicted as shades of yellow; and values at or above around 0.5 are depicted as various shades of green. As shown in FIG. 13BC, a palette may assign pixels with processed spectral values at or below 0.018 to be displayed as grey. In some palette embodiments, at least pixels with processed spectral values at or below 0.001 to be displayed as grey.

In one embodiment, FIG. 13B may be considered default color palette to be used when cannabis in the vegetative of flowering stages is to be spectrally imaged. However, in preferred embodiments, optimal palette files for cannabis in such stages may be strain specific. In one example, an exemplary palette for Superdave may be provided in FIG. 13F. In another example, an exemplary palette for Blue Magoo may be provided in FIG. 13H.

Exemplary palettes for other strains may be derived experimentally. For example, threshold health values may be derived by spectrally imaging multiple plant material samples of a strain at various known degrees of health. For example, values indicative of a particular strain being extremely unhealthy, somewhat unhealthy, slightly unhealthy, midline healthy, very healthy, and extremely unhealthy may be derived. Then such value may be mapped onto a selected color rubric to create the palette. In one embodiment, shades of red may be distributed among the unhealthy values, yellow may reflect midline healthy values, and shades of green may be distributed among values indicative of even higher health.

Health reflectance values and/or other derived spectral values may inherently reflect color processing values utilized in calibration. Accordingly, a palette file may be keyed to particular set of color processing values utilized when the palette file was generated.

Additionally, it may be noted that differences among cannabis strains in assessing health and various aspects thereof may be accounted for in color processing values and/or in palette files. Accordingly, this disclosure contemplates that, in various embodiments or circumstances, a customized set of color processing values and a corresponding customized palette file may be used for each strain (e.g., FIGS. 13F and 13G for Superdave; FIGS. 13H and 13I for Blue Magoo); a default set of color processing values (e.g., FIG. 13D) may be used with a customized palette file for each strain; a default palette file (e.g., FIG. 13B) may be used with a customized set of color processing values for each strain; or a default set of color processing values (e.g., FIG. 13D) may be used with a default palette file (e.g., FIG. 13B).

FIG. 13C is an exemplary palette that may be used when cannabis clones or sprouts in the nursery stage are to be spectrally imaged, regardless of strain. It may be used with FIG. 13E in some embodiments.

Where cannabis flowers, for example during the curing process, are to be spectrally imaged, alternative color palette files may be selected to display indications of curing completeness in an intuitive manner.

The selected palette file may be provided to the local computer system and/or an appropriate database in the server-side operation. Steps 220-260 may be repeated for other installed multi-spectral imagers within the grow facility. However, calibration files may be shared if the strain being grown and the lighting conditions are the same. Similarly, palette files may be shared where the strains being grown are the same. Method 200 may be concluded.

Plant Health Monitoring and Assessment

With reference to FIG. 10B, electromagnetic radiation reflectance readings between approximately 400 nm and 970 nm reveal information relating to plant health. A healthy plant reflects a relatively large amount of visible green light (as compared to red and blue) as well as a very large amount of invisible NIR radiation, which is invisible to the naked eye. Accordingly, humans naturally associate green leaves with healthy plants. However, with reference to FIG. 10D, stressed or dying plants (e.g., sick or damaged) reflect less NIR, but continue to reflect green until damage has substantially progressed. As such, it is difficult or impossible to discern that a plant has compromised health with the naked eye—at least in early stages of plant stress and death.

As depicted in FIGS. 10B-10D, when plants are stressed, the level of the NIR reflectance substantially drops. Accordingly, multi-spectral false color images based on NIR intensity, such as that of FIG. 4C, may provide good early warning signs of crop problems. They can be, however, absent or otherwise difficult to spot in a false color NIR images. Accounting for minute variations in other bands, such as those of red, green, and blue visible light, can add reliability to detecting the onset of crop maladies.

A Normalized Difference Vegetation Index (NDVI) provides a graphical (and mathematical) way to quantify small changes in multi-spectral image color relationships. NDVI images consist of pixels with values determined by the formula, NDVI=(NIR−Red)/(NIR+Red). This formula compares the amount of reflected NIR radiation with the amount of reflected red radiation. Where healthy vegetation dominates the scene, the NDVI formula approaches (NIR/NIR) or +1 in value. However, where there is an absence of NIR-reflecting vegetation, the NDVI value approaches (−Red/+Red) or −1 in value. Preferred multi-spectral imagers may provide intensity values for the NIR, Red, and other index-utilized bands referenced herein, however this disclosure is not so limited: In alternative embodiments, multiple data readings within each utilized spectral band may be mathematically combined to arrive at appropriate spectral band intensity values.

As a generic non-cannabis example, with reference to FIG. 10C, a plant that reflects 50% of NIR and 8% Red may be considered healthy, and a plant with a lowered NIR and increased red reflectance (e.g., 40% and 30%), respectively, may be considered unhealthy. In this example, calculated NDVI values mathematically emphasized the distinction beyond the relatively small 10% difference in NIR reflectance. And such emphasized distinction may be visualized by preparing processed false color health images based on NDVI values.

Figure 10E:
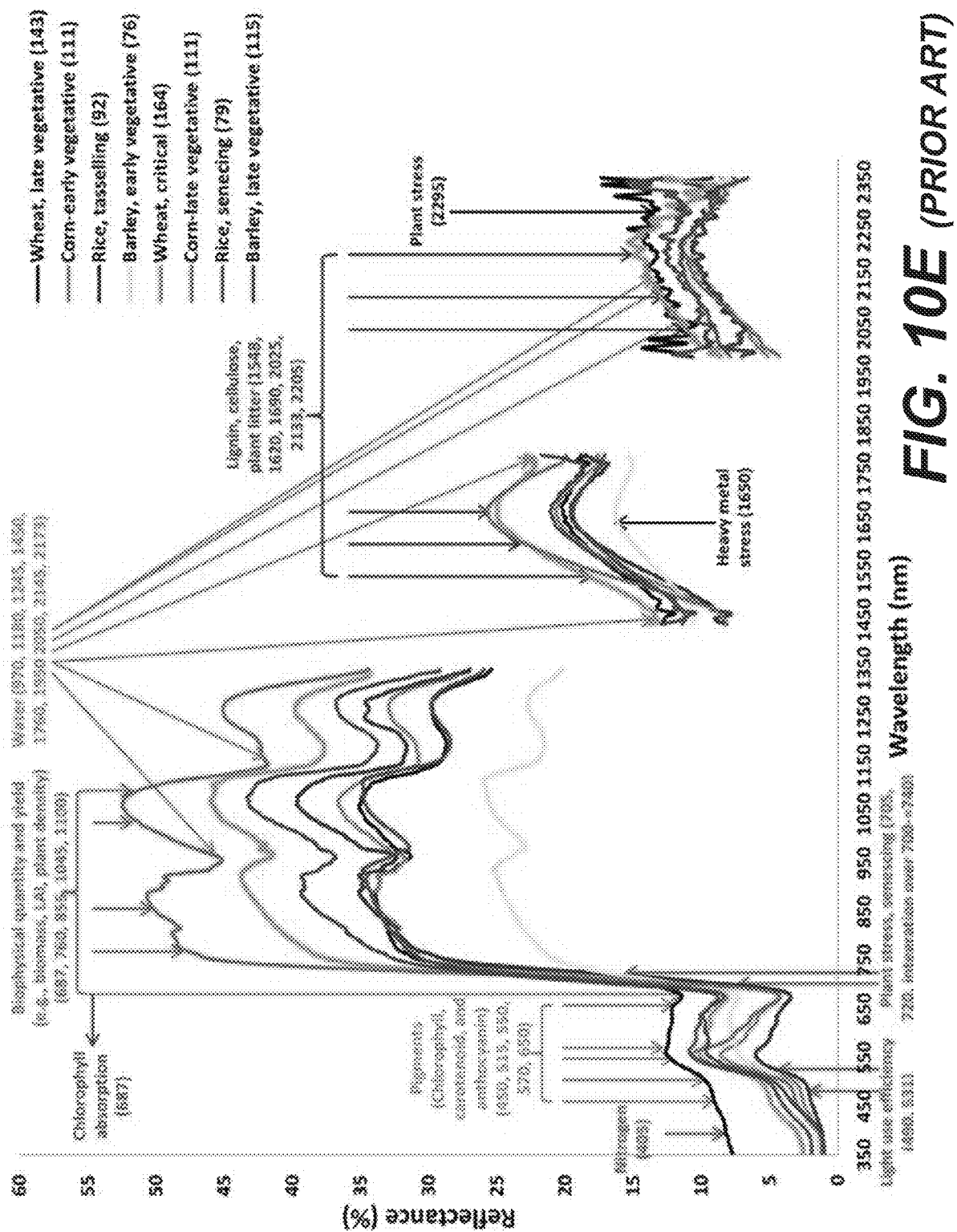

With reference to FIG. 10E, spectral values indicative of various states of staple agricultural crops have been established. However, when it comes to many other plants including cannabis—the prior art does reveal analogous spectral values or indicate that they have been derived. Moreover, the inventors have determined that measurably different spectral values are indicative of various health and crop cycles states; and further, that such state-specific spectral values further measuredly differ among the myriad of strains of cannabis. It is believed that such intra-species distinctions in spectral response stems from the fact that the various cannabis strains have been bred (and naturally evolved) to thrive in different geographic and climatic environments. The inventors identified this by reviewing multiple strains of cannabis under various light conditions and in various stages of growth. Accordingly, among the myriad of strains of cannabis, distinct NDVI (and other index) ranges may be indicative of plant health and lack thereof. Using a hyper-spectral imager, spectral values may be established for various strains cannabis plants and their components (e.g., leaves, stalks, flowers) and at various stages of cultivation (e.g., sprout, clone, nursery, vegetative, flowering, harvest, curing).

To assess plant health and detect anomalies, cultivation monitoring system embodiments may utilize multi-spectral data to generate one or more processed images. These processed images may comprise one or more of a visible light (RGB) image, an NIR image, a NDVI image (discussed above), a Soil Adjusted Vegetative Index (SAVI) image, a Green Normalized Difference Vegetation Index (GNDVI) image, and Normalized Difference Water Index (NDWI) image.

In some embodiments, processed images derived from each (or most) of the above indexes may be automatically generated via process 52. However, it should be noted that, even in such embodiments, many of the aforementioned index images might not be further processed, assessed, or provided to the user unless the situation warrants it.

In areas where vegetative cover is low (e.g., <40%) and/or the soil surface is exposed, the reflectance of radiation in the Red and NIR bands from the soil can unduly influence vegetation index values. This may be especially problematic when comparisons are being made across different soil types that may reflect different amounts of light in the Red and NIR wavelengths (e.g., soils with different brightness values). Accordingly, the Soil-Adjusted Vegetation Index was developed to correct for the influence of soil brightness when vegetative cover is low. SAVI is structured similarly to NDVI but with the addition of a "soil brightness correction factor." It may be calculated for each pixel according to the following formula: SAVI=((NIR−Red)*(1+L))/(NIR+Red+L), where L is the soil brightness correction factor. The value of L may vary by the amount or cover of green vegetation: in very high vegetation regions, L=0; and in areas with no green vegetation, L=1. Generally, an L=0.5 works well in most situations and may be used as a default value used. At L=0, then SAVI=NDVI.

The Green Normalized Vegetation Index is similar to NDVI, discussed above, but operates off Green spectrum (540-570 nm) and is, thus, more sensitive to chlorophyll concentration. It may be calculated for each pixel according to the following formula: GNDVI=(NIR−Green)/(NIR+Green).

The Normalized Difference Water Index is a plant water stress index monitoring water content of leaves in Short Wave InfraRed (SWIR) wavelengths. It may be calculated for each pixel according to the following formula: NDWI=(NIR−SWIR)/(NIR+SWIR).

With reference to FIG. 2A, an embodiment of a method 300 for assessing plant health is provided. As in step 310, a multi-spectral image of a plant, crop, or portion thereof is captured. As discussed above with reference to FIG. 1B, such spectral image capture may proceed automatically via a schedule. Additionally or alternatively, such spectral image capture may be triggered manually, for example by a user via the dashboard interface or by an individual associated with the server-side operation. The process may proceed to step 320.

As in step 320, the cultivation monitoring system may normalize the raw captured spectral image to account for, for example, lighting conditions, plant strain and/or life cycle stage, and/or other calibration considerations. In certain embodiments, the raw captured image may be processed with a corresponding .CPF file to derive a normalized multi-spectral image. The process may proceed to step 330.

As in step 330, the cultivation monitoring system may prepare a processed health image from the normalized spectral image and one or more index calculations and/or band intensities. In preferred embodiments, NDVI may be the primary health indicator. In such embodiments, the processed health image may comprise an image matrix with NDVI calculated for each pixel from the normalized spectral image.

In other embodiments and/or in specific circumstances, the primary health indicator may be similar indices and/or or band intensities. For example, SAVI may be used as the primary health indicator where high levels of reflectance from soil may be expected to reduce the effective of NDVI as the primary health indicator. In another example, GNDVI may be used as the primary health indicator where the health of clones (or sprouts) is being assessed; this may be effective because unhealthy clones or sprouts typically have reduced amounts of active chlorophyll. In alternative embodiments, NIR may be used as a primary health indicator.

In yet other alternative embodiments, the primary health indicator may reflect a combination of multiple indices and/or band intensities—for example, via an average or weighted average of such components, with adjustments made to account for the permissible numerical range of each index or band. For example, where the health of clones (or sprouts) are being assessed, GNDVI may be combined with NDVI (and/or SAVI). In another example, if de-hydration or over-hydration is suspected to be an issue, NDWI may be combined with NDVI (and/or SAVI). The process may proceed to step 350.

As in step 350, a pre-selected palette file may be applied to the processed health image to prepare a displayable false color health image to display on, for example, the dashboard interface, in a report, or the like. As discussed above, such palette file may be selected during method 200, and may be based on, for example, the particular strain being imaged, life cycle stage, and/or other considerations. The processed health image may be processed with the palette file to generate a displayable false color health image. In some embodiments, the palette file may be an .ICP file.

Figure 2C:
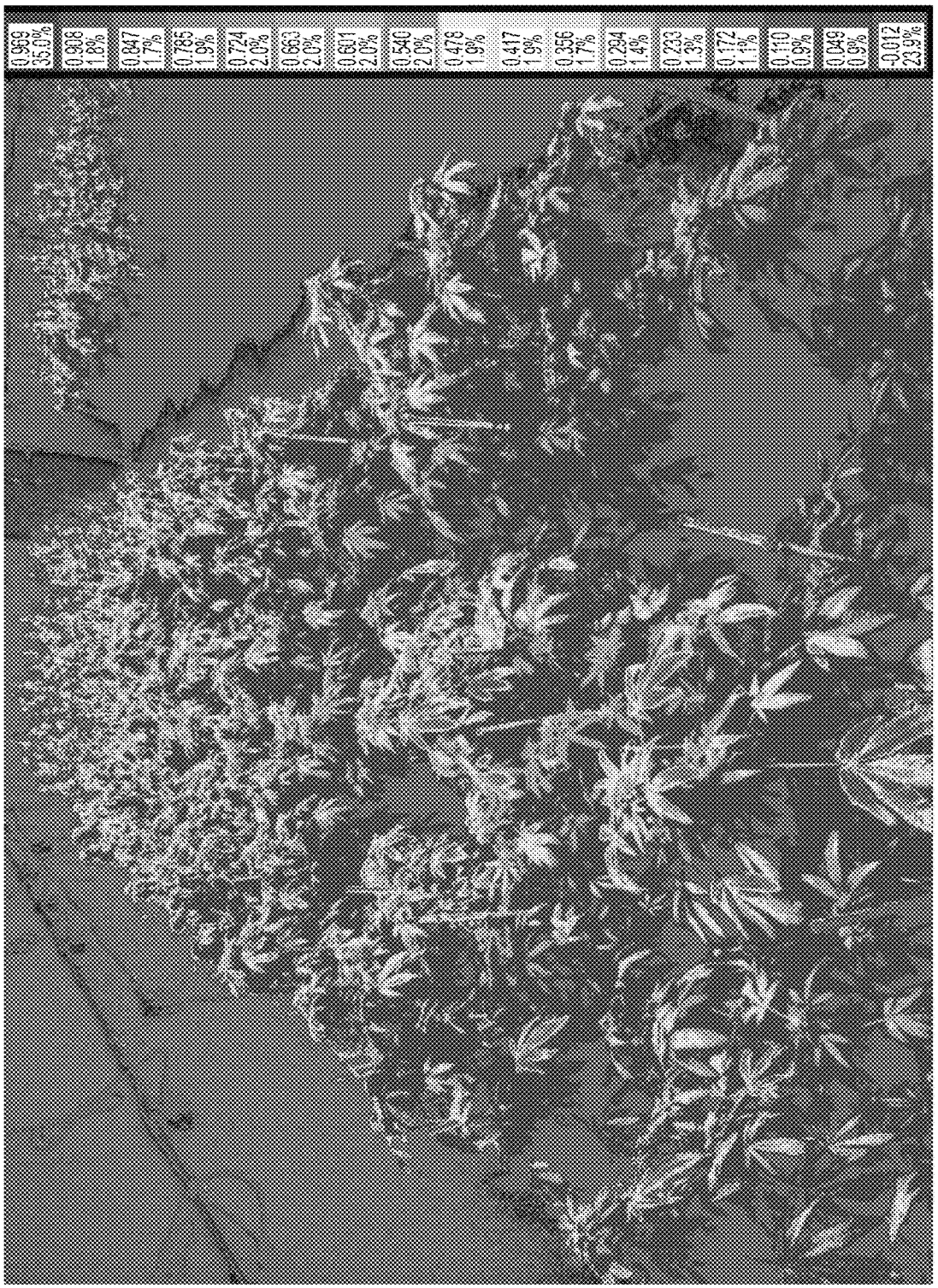
FIGS. 2C and 2D are processed images of cannabis plants that illustrate measures of plant health, in accordance with exemplary embodiments.
Figure 2E:
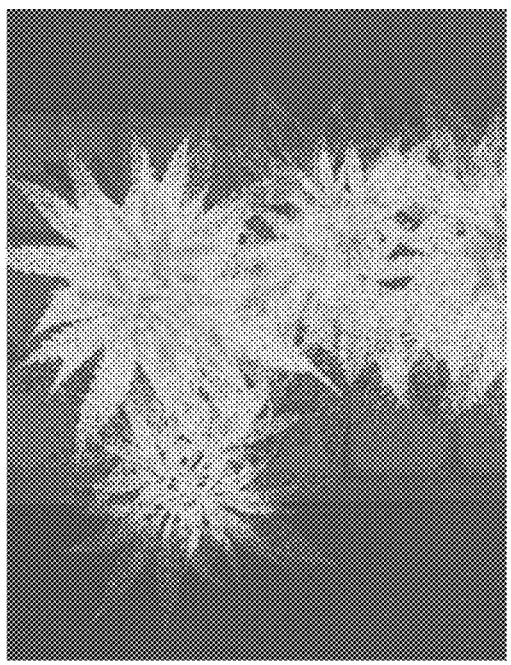
FIG. 2E is a processed false color image of cannabis sprouts that illustrates measures of sprout health, in accordance with exemplary embodiments.
Figure 2G:
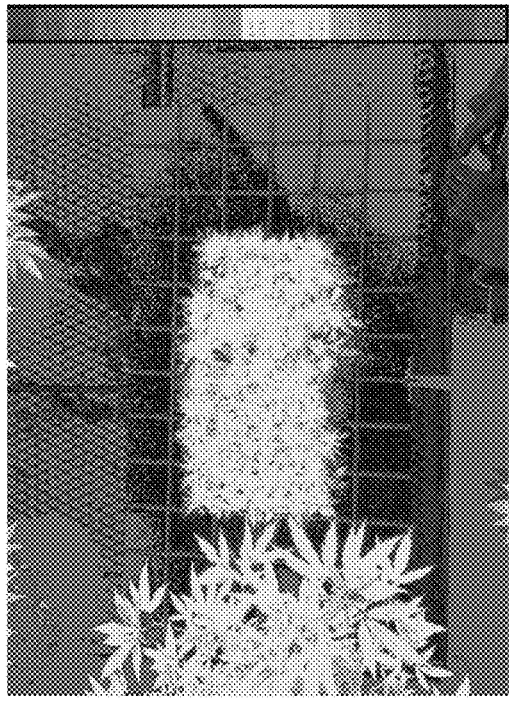
FIGS. 2F-2G are processed false color images of cannabis clones that illustrate measures of clone health, in accordance with exemplary embodiments.

FIG. 2C depicts a displayable false color health image of multiple cannabis crops in the vegetative stage. In preferred embodiments, and consistent with the palette embodiments discussed above, grey color may represent inert material, dark green may represent extremely healthy plant material, light green may represent very healthy plant material, yellow may represent midline healthy plant material, light red may represent below-threshold unhealthy plant material, and deep red may represent very unhealthy plant material. Any color conversion palette may be used, but the inventors have determined that using a grey-red-yellow-green palette rubric is superior for intuitive viewing by cultivators and/or for subsequent image processing of the false color health image.

The plants in the foreground of FIG. 2C may be observed to be generally healthy, with a few unhealthy leaves. The plants in the background of the image appear heavily red, and would be considered unhealthy. Under the circumstances of FIG. 2C, the plants did not indicate a difference in "health" to the naked eye at the time the underlying spectral image was captured. As the growing cycle progressed further, the background plants manifested significant changes indicative of unhealthiness that were visible to the naked eye.

In the example of FIG. 2C, the background plants are of a different strain, namely Orange Crush, but still appeared unhealthy under normalization and the palette settings established for the foreground plants, where were of the Superdave strain. Both sets of plants were grown under substantially identical growing conditions. Accordingly, this example additionally illustrates how the same cultivation inputs may affect different cannabis strains in substantially different manners.

Figure 2D:
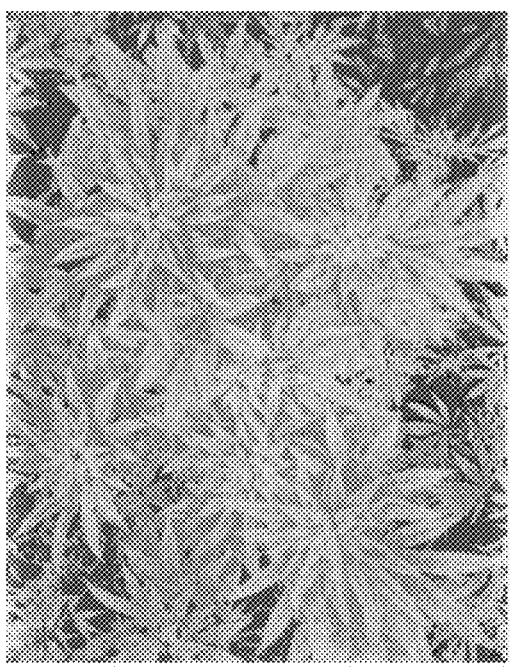
Figure 2F:
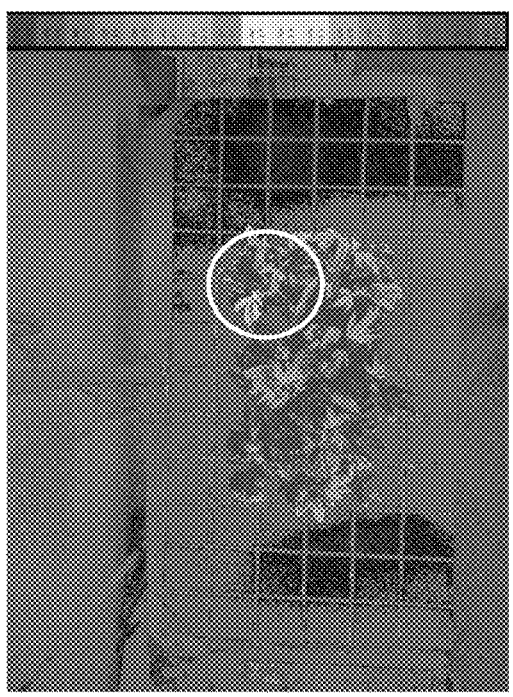
Figure 2I:
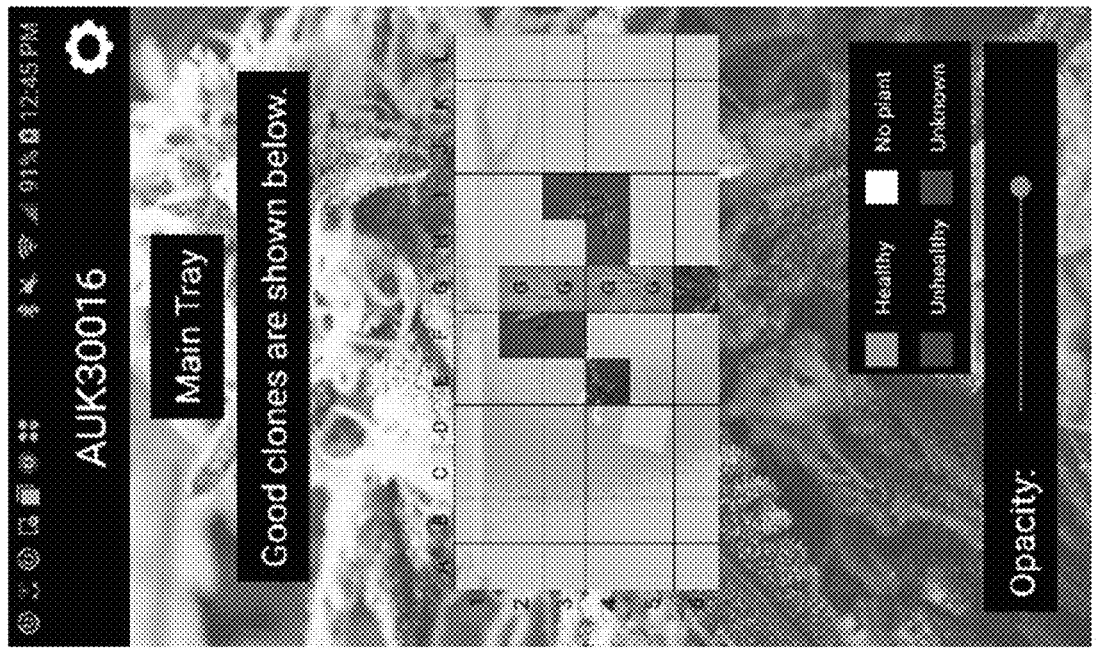
FIGS. 2H and 2I are screen shots of a dashboard interface illustrating measures of clone health, in accordance with exemplary embodiments.
Figure 2H:
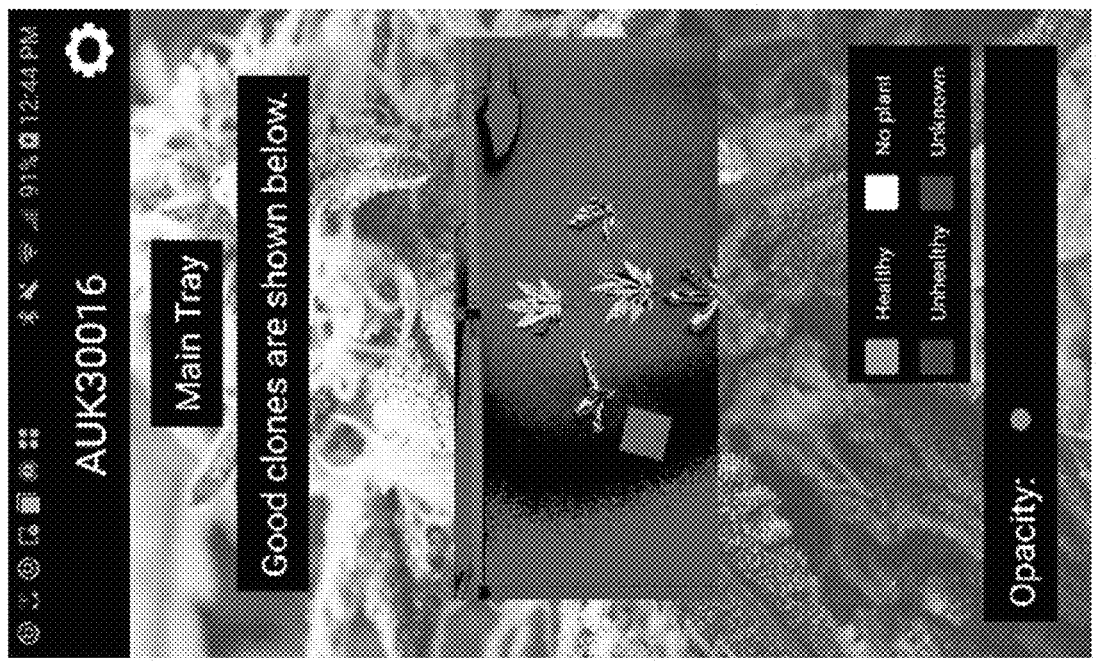
Figure 2L:
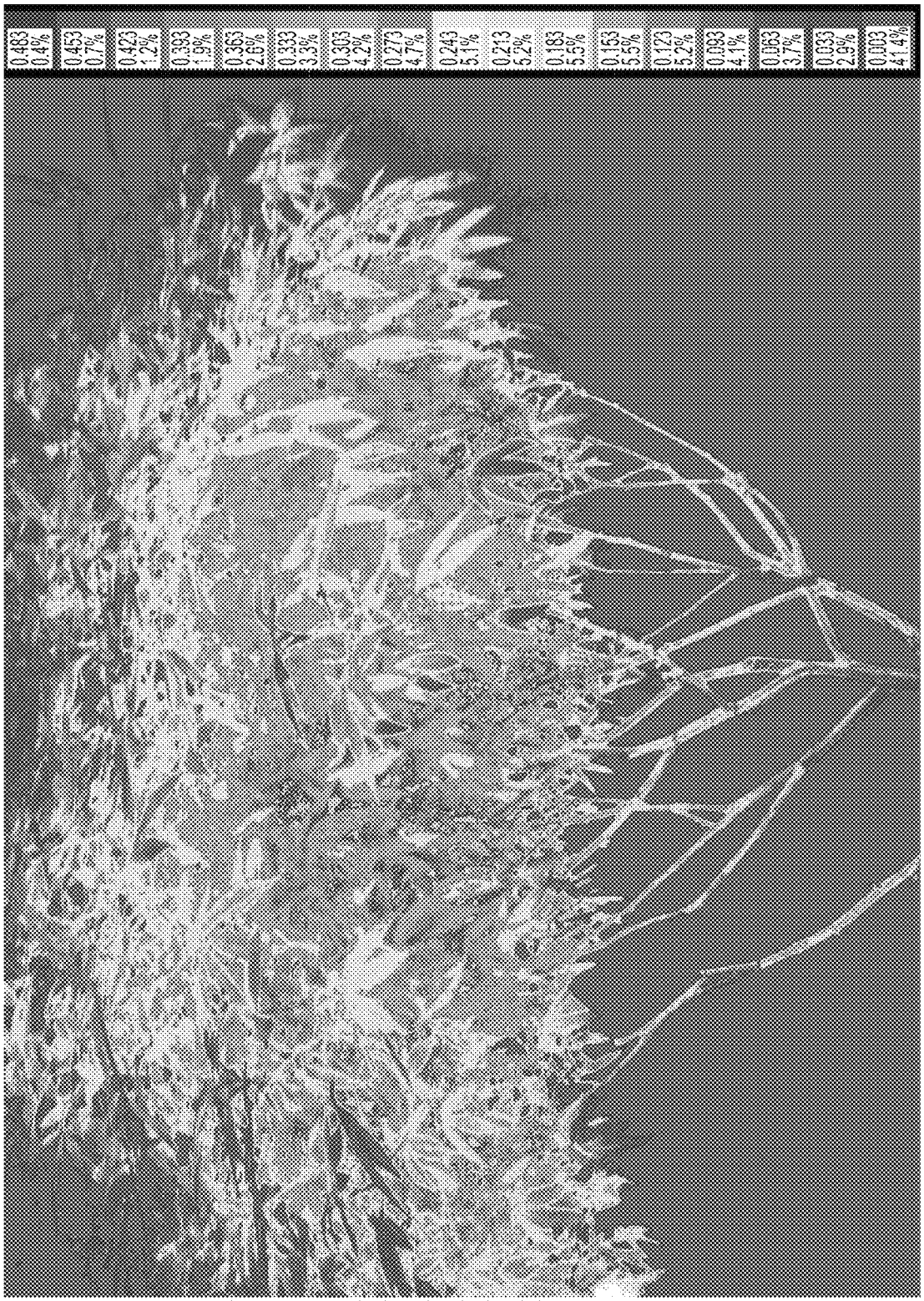
FIG. 2L is processed false color image of a mother cannabis plant that illustrates measures of plant health for cutting clones, in accordance with exemplary embodiments.

FIG. 2D depicts a displayable false color health image of cannabis plants and reflects a substantially identical palette to that of FIG. 2C. FIG. 2D is a detailed false color health image from an overhead perspective and depicts substantially healthy plants.

The process may proceed to step 360.

As in step 360, assessment squares may be overlaid upon the displayable false color health image. In some embodiments, especially where the raw spectral image is captured from an overhead view, the assessment squares may be plotted to correspond to specific locations, and therefore plants, within the growing area. Such plotting may make it easier for cultivators to find unhealthy plants and portions thereof. The process may proceed to step 370.

Then, as in step 370, the overall health of each assessment square may be assessed based on the underlying displayable false color health image. In preferred embodiments, a healthy value for a square may be calculated based upon the Red color intensity within each pixel (0-255) contained therein and the Green color intensity in each pixel (0-255) contained therein. Pixels that appear Yellow in color have a measure of Red color intensity and a measure of Green color intensity, and intensity percentages are calculated for each. In one example, health percentage for each square may be calculated according to the following formula: Green/(Green+Red). Squares that predominantly comprise inert material, which may be indicated in grey, are segregated from the health image. A predominantly inert square may be characterized having Red Green and Red Blue based on the sum of all pixels within the assessment square.

Each assessment square's health percentage may be compared against a health threshold percentage to judge its contents as predominantly healthy or predominantly unhealthy. If the calculated percentage of healthy material exceeds the threshold, the square may be overlaid in Green to indicate that it is predominantly healthy. If the calculated percentage of healthy material falls below the threshold for a particular square, the square may be overlaid in red to indicate it is predominantly unhealthy. Squares determined to be inert may be overlaid in grey. In other embodiments, other colors may be overlaid in each circumstance.

FIG. 2K depicts a displayable false color image of cannabis crops with overlaid assessment squares. In it, the vast majority of non-inert assessment squares have been assessed as predominately healthy. The spectral image underlying FIG. 2K was captured from substantially the same angle as FIG. 2C. The method may proceed to step 380.

As in step 380, the displayable false color health image—with or without overlaid assessment squares—may be provided to the user via, for example, the dashboard interface or email. In some embodiments, the health threshold percentage may be set by the user, for example, via a digital slider bar on the dashboard interface or the like. In some embodiments, for example as shown in FIGS. 2H and 2I, the dashboard interface may also provide an opacity option (for example, in a slider bar) that may permit a user to select the degree to which an assessment square overlay obscures the underlying false color health image. The process may proceed to step 390.

As in step 390, the raw multi-spectral image, the normalized multi-spectral image, the processed health image, the displayable false-color health image, and/or the displayable false-color health image with assessment squares may be saved in the appropriate database(s). Additionally, any additionally derived index images and/or RGB images derived from the normalized multi-spectral image may be saved. As would be appreciated by a person of skill in the art, the method contemplates that some or all images may be saved in the appropriate databases upon their creation or soon thereafter.

Method 300 may be concluded. In preferred embodiments, method 300 may occur real time, allowing a cultivator to remove the unhealthy plant material, attempt corrective action, and/or replace it with healthy material rapidly, and thereby ensuring only the best products move forward to the growth process. The process may proceed to step 390.

Subsequent to method 300, for example, with reference to FIG. 3A and corresponding discussion, the saved image file set may later be subject to spectral code searches and/or pattern recognition algorithms to derive additional, more detailed data on the subject crop, plant, or portion thereof. Similarly, for example, with reference to FIG. 6 and corresponding discussion, the saved image file set may be used to refine strain-specific precision agriculture models.

Additional, AI may provide for pattern recognition over multiple crop cycles via image comparison. For example, AI may detect if the same location within a particular grow facility appears to have a tendency to produce unhealthy crops or if crops tend to be unhealthy during particular months. Further, AI instrumentalities may iteratively improve and expand relevant pattern-recognition over many crop cycles from many different grow facilities.

Clone (and Sprout) Health Monitoring and Assessment

Embodiments of assessing clone (and seedling) health—which is inextricably tied to clone viability and eventual crop success—may be, in many aspects, substantially identical to disclosed embodiments for monitoring and assessing health in more mature cannabis plants. Accordingly, clone health may be monitored in accordance with the steps of method 300 described above, with additional comments noted below.

With reference to step 350, FIGS. 2F and 2G depict displayable false color health images of two sets of clones. As may be observed, the clones in FIG. 2F are very or extremely healthy, with the exception of the circled clone in the top right, which has some mid-line heath characteristics. By contrast, the clones in FIG. 2G largely show mid-line health with intermittent indications of unhealthiness. Because clones represent an early stage of the cannabis life cycle, many cultivators and/or clone growers may prefer to cull all but the healthiest clones as a precautionary measure, and thereby avoid expending substantial resources on a cannabis plant that is less likely to achieve high-yield, high-quality flower production without future corrective actions.

FIG. 2E depicts a displayable false color image of four sprouts grown from seed, with health indicator values calculated from NDVI. All sprouts within FIG. 2E appeared equally good to the naked eye, but the sprout on the left indicates reduced health, as can be seen from the leaves on its top. Under the default palette files for more mature plants, which was applied in FIG. 2E, all plants appear substantially unhealthy. However, it has been observed that early-stage seedlings typically appear less healthy than their mature counterparts. Thus, here, health may be best assessed based on the top leaves of each seedling. Additionally, it may be preferred that a different palette file is used. Alternatively, using GNVDI and/or SAVI may be preferable to NDVI as the primary health indicator for sprouts in order to achieve displayable false color images that are more consistent with those of mature plants.

As in step 360, the assessment squares are preferably plotted to correspond with sprouts or clones in a one-to-one ratio, thereby making it easier for a clone cultivator to find and cull unhealthy clones. In other embodiments, for example as shown in FIG. 2I, a clone's health assessment can be indicated as healthy/good by overlaying a symbol (such as "G").

With reference to step 380, FIG. 2H depicts, within a dashboard interface of an application running on a smart phone, a displayable false color health image of a set of clones without assessment squares. FIG. 2I depicts, within the same dashboard interface, the displayable false color health image with assessment squares overlaid. As shown in FIG. 2I, the assessment squares color overlay indicating unhealthiness need not be red.

FIGS. 11A-11C depict an embodiment of clone imaging apparatus 11. Clone imaging apparatus 11 may comprise spectral imager 10, imager mount 12, arm 13, level 13a, arm mount 14, grid mat 15, supplemental light source 17, and tabletop 18. Clone imaging apparatus 11 may be used to image target(s) 19 positioned upon grid mat 15. Target 19 may be, for example, a cannabis clone, cannabis sprout, or other small plant illuminated by environmental light 16 and/or electromagnetic radiation provided by supplemental light source 17. In other embodiments, target 19 may be a target material for which a spectral code is sought. Spectral imager may receive reflected light from within its field of view (FOV) 10a.

Arm 13 preferably has a low-reflectance finish and may comprise, for example, brushed stainless steel or aluminum. It may support imager mount 12, supplemental light source 17, and level 13a. Arm 13 may be secured to tabletop 18 via arm mount 14. Grid mat 15 may comprise a non-reflective or low-reflective material selected to contrast the biological targets 19 placed on it for evaluation. For example, the surface of grid mat 15 may be formed of matte plastic. Grid mat 15 may include a grid outline on its surface, and may be placed upon, secured upon, and/or integrally formed with tabletop 18. Arm 13 may, via imager mount 12, centrally suspend spectral imager 10 above grid mat 15 at an optimal spatial distance above targets 19. In some embodiments, arm 13 may be adjustable, permitting variable positioning of spectral imager 10.

In exemplary operation, a clone plant producer may place a target 19 clone in each (or some) rectangular or square zone(s) formed by the grid of grid mat 15, thereby separating each target 19 for evaluation. Each zone may be matched to a digital grid in software configured to run on the local computer system associated with clone imaging apparatus 11. Embodiments of method 300 may be performed using clone imaging apparatus 11. For example, step 310 may be performed by spectral imager 10. Additionally, with reference to step 360, the assessment squares may be overlaid upon a displayable false color health image in a manner than aligns with the grid of grid mat 15. Such alignment may permit a clone grower to more easily identify unhealthy clone targets 19 which should be discarded, and healthy clone targets 19 that should be retained and/or replanted for vegetative growth.

In some embodiments of clone imaging apparatus 11, an entire cultivation monitoring system may reside in a local installation. A tablet or the like may be provided to serve as a designated dashboard interface.

Because, as discussed above, embodiments of assessing clone (and seedling) health may be substantially identical to disclosed embodiments for monitoring and assessing health in more mature cannabis plants, installation of clone imaging apparatus 11 may proceed in accordance with embodiments of method 200 described above, with additional comments noted.

With respect to step 220, in some embodiments, the exposure length may be set as a default in view of supplemental light 17; this step may be omitted.

With respect to step 250, calibration may proceed by utilizing color processing values appropriate for clones, sprouts, or other target plant serving as target 19. In some embodiments, default color processing values for clones (such as those depicted in FIG. 13E) or the like may be pre-programmed into clone imaging apparatus 11 and need not be determined. Accordingly, step 230 may be omitted in some embodiments.

With respect to step 260, in some embodiments, an appropriate palette file (such as that depicted in FIG. 13C) may be set as a default and this step may be omitted.

Seed Germination Monitoring and Assessment

For cannabis and other crops, it has been discovered that viable seeds provide indications of energy use, chlorophyll, and water—even when considered dormant. Such indications may be observed via spectral imaging and processing, in a manner somewhat similar to assessing plant health, as described above. Commencing the germination process by soaking seeds with water may enhance further indications of energy use and active chlorophyll, but may reduce the effectiveness of observing water content indications as a measure of seed viability.

With reference to FIG. 2B, an embodiment of a method 400 for assessing seed viability is provided. As in step 410, a multi-spectral image of a seeds may be captured. In some embodiments, in the example resulting in FIG. 2J was derived, the seeds may be soaked prior to jump start germination processes before image capture. The process may proceed to step 420.

As in step 420, the cultivation monitoring system may normalize the raw captured spectral image to account for, for example, lighting conditions and/or other calibration considerations. In certain embodiments, the raw captured image may be processed with a corresponding .CPF file to derive a normalized multi-spectral image.

In the example from which FIG. 2J was derived, the color processing values of FIG. 13D were utilized to create a .CPF file during a calibration process. It is believed that although the basic cell structure for cannabis seeds are the same, the seed cask may vary in in thickness by strain—likely as a result of the climatic environment each strain was bred to exist in. Accordingly, for some strains, the above-referenced color processing values may not be ideal. Optimal color processing values for seed assessment may be derived in a manner analogous to that described above with respect to different cannabis strains. The process may proceed to step 430.

As in step 430, the cultivation monitoring system may prepare a processed seed viability image from the normalized image and one or more index calculations and/or band intensities. In preferred embodiments, NDVI, GNDVI, NDWI, and/or NIR may be used to derive a seed viability value for each pixel of the normalized spectral image, as such measures are indicative of general health, active chlorophyll, water presence, and energy use, respectively. In some embodiments, the seed viability value for each pixel may be derived via an average or weighted average of such components, with adjustments made to account for the permissible numerical range of each index. In the example from which FIG. 2J was derived, NDVI was utilized to determine the seed viability value for each pixel. The process may proceed to step 450.

As in step 450, a color palette may be applied to the processed seed viability image to prepare a displayable false-color seed viability image to display on, for example, the dashboard interface, in a report, or the like. Such palette may be selected or prepared during a calibration process, and may be based on, for example, the particular strain being imaged and/or other considerations. In certain embodiments, the processed seed viability image may be processed with an .ICP file to prepare a displayable false color image.

In the example of FIG. 2J, the palette utilized was the grey-green-yellow-red rubric used for in false-color health imaging and reflects that of FIG. 13C. In this example, the presence of green, and to a lesser extent yellow, reflects higher energy use than red areas (e.g., via the NIR component of NDVI) and therefore suggests that seeds with more green and yellow false coloring are more likely to be viable. The process may proceed to step 460.

As in step 460, the pixels from each seed, or in some embodiments the center of each seed, may be assessed to calculate a viability value. Each viability value may be compared to a threshold viability value to separate the viable seeds from unviable seeds. The false color seed viability image may be marked to indicate which seeds are likely viable and/or which seeds are likely not. In FIG. 2J, viable seeds, including those magnified, are circled in white.

Potential threshold viability values may be experimentally determined by planting seeds after viability values have been determined. Thresholds may then be selected by weighing the resource allocation impacts of erring by destroying too many viable seeds versus erring by planting too many unviable or weak seeds. For context, in one example, a group of 10 cannabis seeds may typically result in only 2-3 healthy plants, with only a single plant demonstrating robustness. The process may proceed to step 480.

As in step 480, the displayable false color seed viability image—with or without overlaid viability indicators—may be provided to the user via, for example, the dashboard interface, email, or the like. In preferred embodiments, method 400 may occur real time, allowing a cultivator to promptly cull unviable seeds. In some embodiments, however, an indication as to which seeds are viable or not may be provided to the user without a displayable false color seed viability image, for example, by relaying zone numbers indicative of the positioning of seeds to be kept and/or discarded, or the like. In yet other embodiments, the seed culling process may be completed automatically, for example, via an electromechanical apparatus that physically sorts seeds into different containers based on seed viability assessments. The process may proceed to step 490.

As in step 490, the raw multi-spectral image, the normalized multi-spectral image, the processed seed viability image, the displayable false-color seed viability image, and/or the displayable false-color seed viability image with viability indicators may be saved in the appropriate databases. Additionally, any additionally derived index images and/or RGB images derived from the normalized multi-spectral image may be saved. As would be appreciated by a person of skill in the art, the method contemplates that some or all images may be saved in the appropriate databases upon their creation or soon thereafter. Additionally or alternatively, the viability value for each seed deemed viable may be saved.

Method 400 may then be concluded. Subsequently, the saved image file set may later be subject to spectral code searches and/or AI-based pattern recognition algorithm to derive additional, more detailed data on the seed contents. Similarly, the saved image file set and/or viability values may used by AI to refine strain-specific precision agriculture models and/or seed viability thresholds.

Anomaly Monitoring and Assessment

Figure 3A:
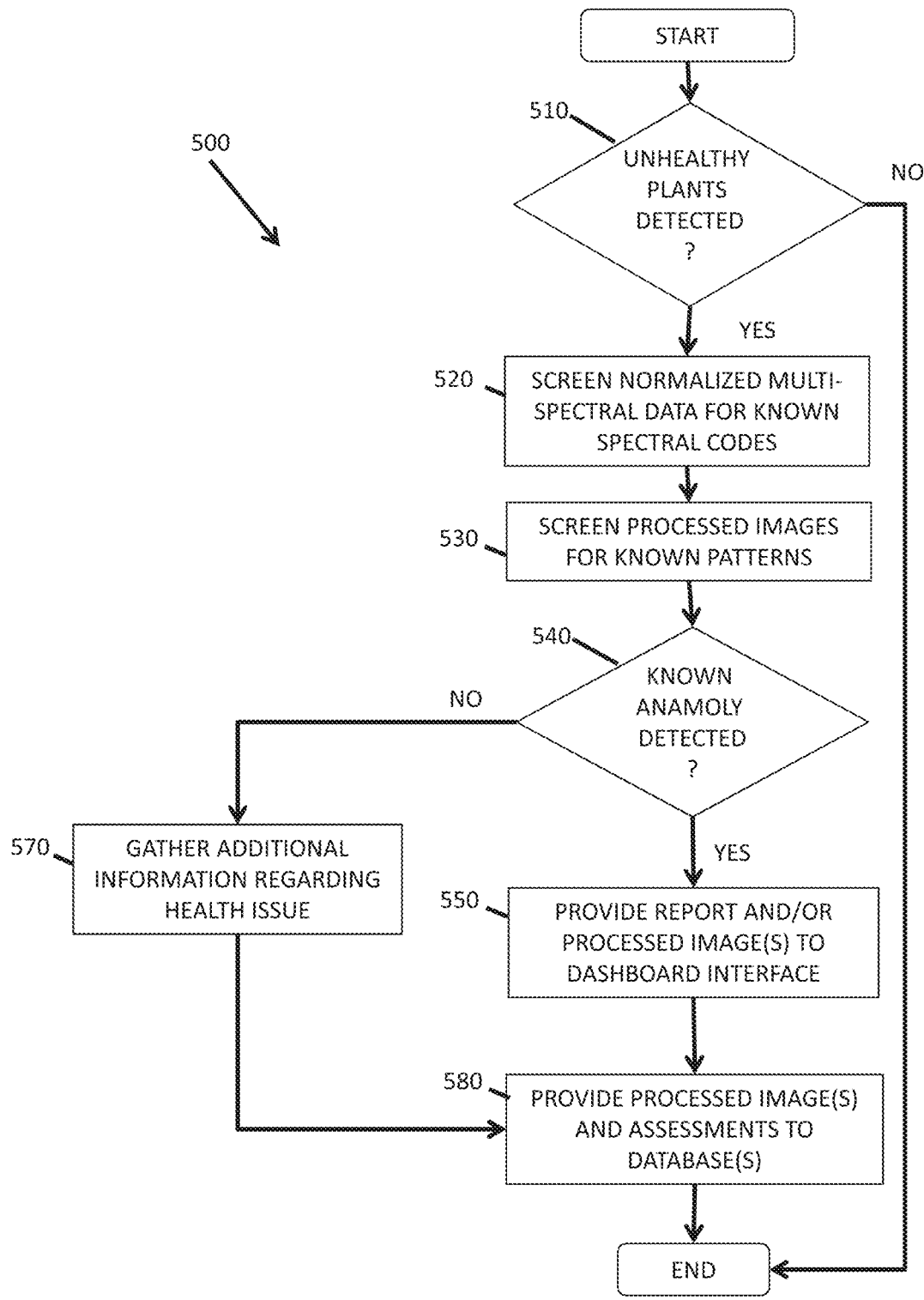
FIG. 3A is a flowchart illustrating a method for detecting and assessing health-related anomalies, in accordance with exemplary embodiments.

With reference to FIG. 3A, an embodiment of a method 500 for detecting and assessing health-related anomalies is provided.

As in step 510, the method may determine whether any (or a non-negligible amount) of unhealthy plant material was discovered, for example, via embodiments of method 300. If a health issue was detected, the process may proceed to step 520. If not, method 500 may conclude.

As in step 510, the saved normalized multi-spectral image may be screened for spectral codes corresponding to various anomalies. Such spectral codes may be supplied from database end member libraries 44 pertaining to, for example, diseases, pests, chemical contaminants, and/or specific nutrients. The process may proceed to step 530.

As in step 530, the normalized multi-spectral image and various processed spectral images may be evaluated for known patterns corresponding to various anomalies via AI. Such patterns may pertain to, for example, diseases, pests, hydration issues, and/or nutrient issues. In some embodiments, processed images derived from various indices may be "stacked," and thereby assessed together for pattern recognition purposes. Such pattern recognition may be achieved via manual comparison of side-by-side images or by AI via, for example, process 53. The method may proceed to step 540.

As in step 540, the method may determine whether an anomalous spectral code or pattern was detected. If so, the method may proceed to step 550. If not, the method may proceed to step 570.

As in step 550, a report on the detected anomaly and/or processed spectral images may be provided to the user via the dashboard, report, or the like. An alert may also be issued if appropriate. Such processed spectral images may include imagery, for example similar to that of FIG. 14, that isolates a detected pattern and/or spectral code hits on an RGB or substantially plain image to more clearly illustrate the anomaly to the cultivator. The report may include information on the detected anomaly and may further suggest potential corrective actions. The method may proceed to step 580.

As in step 570, additional information regarding the health deficiency may be retrieved as a result of, for example, additional investigation by a cultivator and/or system operator. In some examples, an operator of the cultivation processing system may visit the grow facility and further investigate the health issue. This may include, for example, subjecting a sample of the unhealthy plant material to laboratory testing, taking high-resolution RGB images of the unhealthy plant material, and/or taking a hyper-spectral image of the unhealthy plant material. The method may proceed to step 580.

As in step 580, raw, normalized, and/or processed images and/or assessments may be saved in the appropriate databases. As would be appreciated by a person of skill in the art, the method contemplates that some or all images may be saved in the appropriate databases upon their creation or soon thereafter.

Method 500 may then be concluded. Subsequently, the saved image file set and assessments may be processed by AI to enable or refine recognition of anomalies during future pattern and/or spectral code screenings. Similarly, with reference to FIG. 6 and corresponding discussion, the saved image file set and assessment may used by to refine strain-specific precision agriculture models.

Pest Detection

Pest-related anomalies in spectral images may be detected and/or identified via spectral codes of the pests themselves, via spectral codes of pest byproducts, and/or via recognition of patterns of pest damage pest location. Common pests affecting cannabis cultivation include spider mites, russet mites, aphids, fungus gnats, thrips, and white flies. Detection of such pests and others may be effectuated through disclosures herein.

Spectral codes for specific pests may be obtained by using a hyper-spectral imager in a controlled environment and/or via embodiments of method 900. Each selected pest may be grown in a controlled environment and imaged to determine the spectral code. Pests may be imaged throughout their lifecycle to determine any spectral differences.

Additionally, pest byproducts may be spectrally imaged to determine their spectral code. For example, it may be difficult or impossible to directly detect Aphids via spectral imaging from a fixed position near cannabis plants due to their small size and the fact that they typically reside on plant stalks. Aphids, however, produce honeydew as a byproduct. Accordingly, the presence of the spectral code for honeydew within normalized multi-spectral images may be indicative of aphid presence.

Figure 5B:
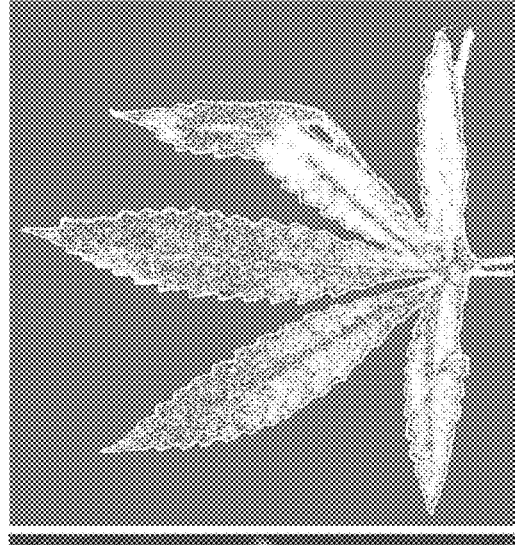
FIGS. 5A and 5B are a set of processed false color images, each illustrating a cannabis leaf with spider mite damage, in accordance with exemplary embodiments.
Figure 5A:

Pests may be detected and/or identified by the patterns and progression of the damage they cause. For example, it is difficult directly detect spider mites via spectral code screening because such pests typically reside on the underside of cannabis leaves—and it is impractical to regularly image crops from such a position. Spider mites, however, consume the underside of cannabis leaves in a stippling pattern. With reference to FIG. 5A, such pattern is detectable via, for example, a displayable false-color health image of the topside of a cannabis leaf, wherein the areas of poorest health may indicate where mites might have fed and may embody a stippling pattern. With reference to FIG. 5B, such image may be further processed such that the stippling patent may be isolated from other image data and is more readily visible. Furthermore, by taking and processing a series of images, the direction of movement of such pests may be determined. For an AI with a machine learning algorithm to reliably identify such patterns, approximately 10,000 images may be preferably provided for processing.

Chemical Contaminant Detection

Contaminant-related anomalies in spectral images may be detected and identified via spectral code screening for, in preferred embodiments, hyper-spectral codes and/or multi-spectral code sets. Because minute amounts of contaminants be dangerous and may be detected via spectral code screening, techniques for detecting chemicals may be less reliant on pattern recognition algorithms. The presence of pesticide components, metals, and other potentially dangerous chemicals in cannabis is of great concern to cannabis consumers and responsible members of the industry. For example, there have been reported cases of unscrupulous vendors using dangerous chemicals to stabilize their nutrient formulations. While cannabis may be tested for contaminants during the vegetation and flowering stages, it may be particularly advantageous to screen for chemical contaminants at harvest, during or after curing, and/or via spot testing by regulatory authorities or downstream businesses.

Spectral codes for specific pesticide components may be obtained by using a hyper-spectral imager in a controlled environment and/or via embodiments of method 900. A selected pesticide component (e.g., Arsenic, Ammonium, Pyrethrin, etc.) may be provided in segregated pure form in a controlled environment and imaged to determine the spectral code. Pesticide component based hyper-spectral code is common and many samples exist today. However, multi-spectral code sets may be derived using, for example, methods explained herein. In preferred embodiments spectral images may be screened for spectral codes of components of common insecticides (e.g., Imidacloprid, Abamectin, Etoxazole, Spiromesifen, and Pyrethrin); common fungicides (e.g., Myclobutanil); common miticides (e.g., Azadirachtin); common weed killers (e.g., Glyphosate), vertebrate repellants (e.g., ammonium); and/or arsenic. Such spectral codes may be maintained in a specific database end member library 44.

In one example, with reference to FIG. 14, a normalized multi-spectral image was screened for a multi-spectral code set indicative of Glyphosate. In the false color image of FIG. 14, areas where Glyphosate is likely to be present are reflected in shades of red, yellow, and green, with green indicative the highest likelihood. Areas where Glyphosate is not likely to be present are depicted in grey and black, with such portions of the image being derived from other aspects of multi-spectral imagery to illustrate the plant structure and relative positioning of the multi-spectral code set "hits."

Spectral codes for specific metals may be obtained by using a hyper-spectral imager in a controlled environment and/or via embodiments of method 900. A selected metal (Cadmium, Mercury, Lead, etc.) may be provided in segregated pure form in a controlled environment and imaged to determine the spectral code. Metal-based hyper-spectral code is common and many samples exist today. In preferred embodiments spectral images may be screened for spectral code of Cadmium, Chromium, Cobalt, Copper, Lead, Nickel, and/or Mercury. Such spectral codes may be maintained in a specific database end member library 44.

Disease Detection

Disease-related anomalies may be detected and/or identified via spectral code screening and/or recognition of patterns of disease location or progression. Common diseases affecting cannabis cultivation include Root Rot, Botrytis, Gray Mold, White Mold, Black Mold, Powdery Mildew, Black Mildew, Downey Mildew, and Brown Fungus. Detection of such diseases and other may be effectuated through disclosures herein.

Spectral codes for disease may be obtained by using a hyper-spectral imager in a controlled environment and/or via embodiments of method 900. The selected disease may be cultivated in a controlled environment and imaged over its lifecycle to determine the spectral code of the disease and any changes with respect to life cycle. Additionally, field samples may be taken and imaged in order to validate the code match. In some embodiments, target samples evaluated in deriving spectral codes may be specific to disease life-cycle stage, plant life-cycle stage, plant component, and/or strain—in addition to disease type.

Disease may also be identified by the patterns and progression of the damage they cause. Such may be detected and observed from processed spectral images, including index images.

Figure 3D:
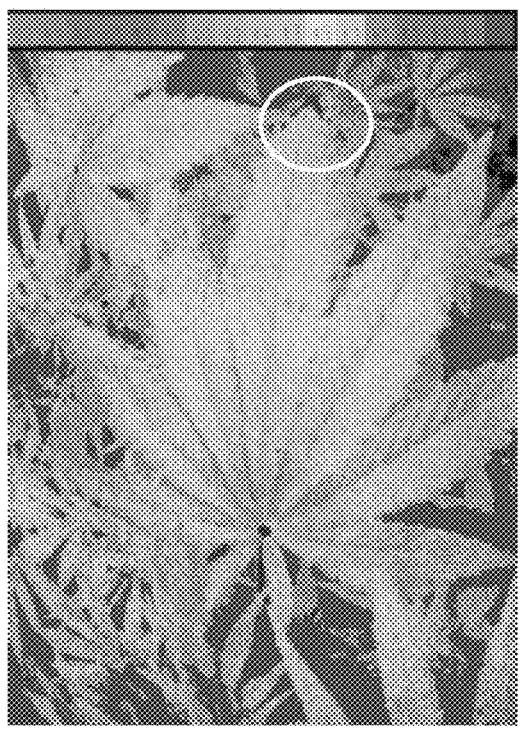
FIGS. 3D and 3E are a set of processed false color and near infrared (NIR) images, respectively, of a cannabis leaf infected with powdery mildew, in accordance with exemplary embodiments.
Figure 3E:
Figure 3B:
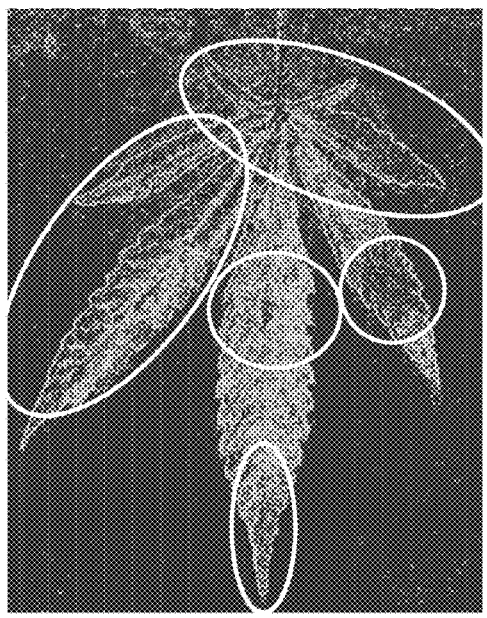
FIGS. 3B and 3C are a set of processed false color and visible light images, respectively, of a cannabis leaf infected with powdery mildew, in accordance with exemplary embodiments.
Figure 3C:
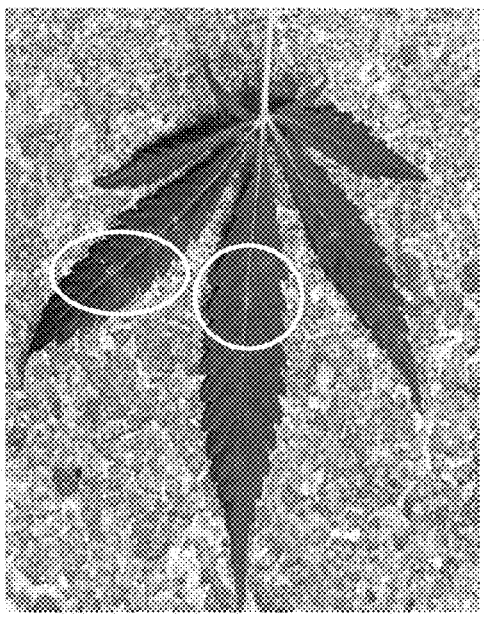
Figures 3F, 3I:
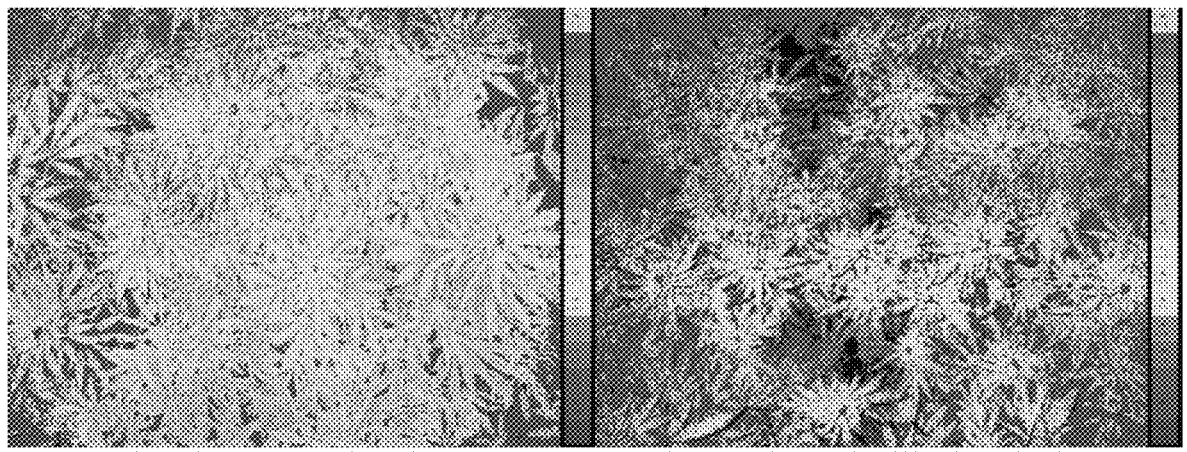
FIGS. 3F-3K are processed false color images of a cannabis grow that illustrates a spread of powdery mildew infection over time, in accordance with exemplary embodiments.
Figures 3G, 3J:
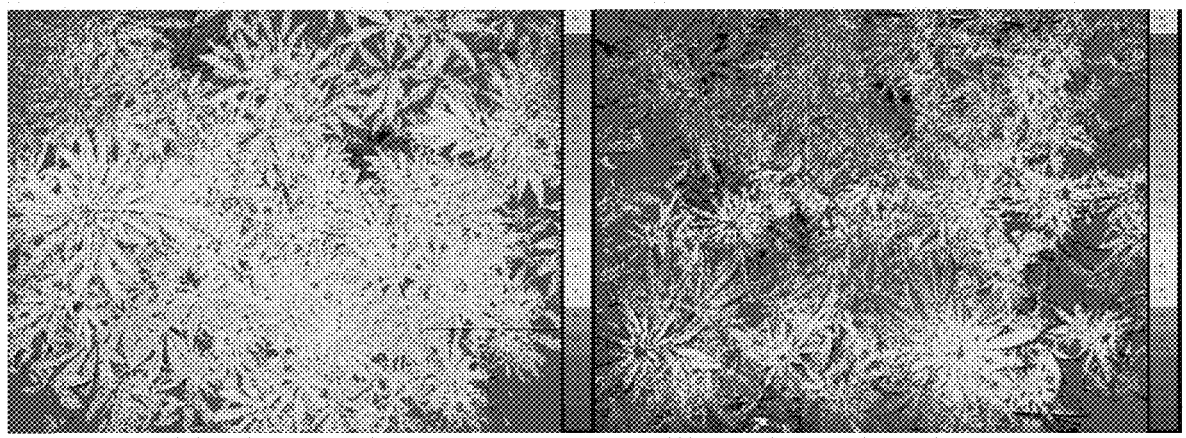
Figures 3H, 3K:
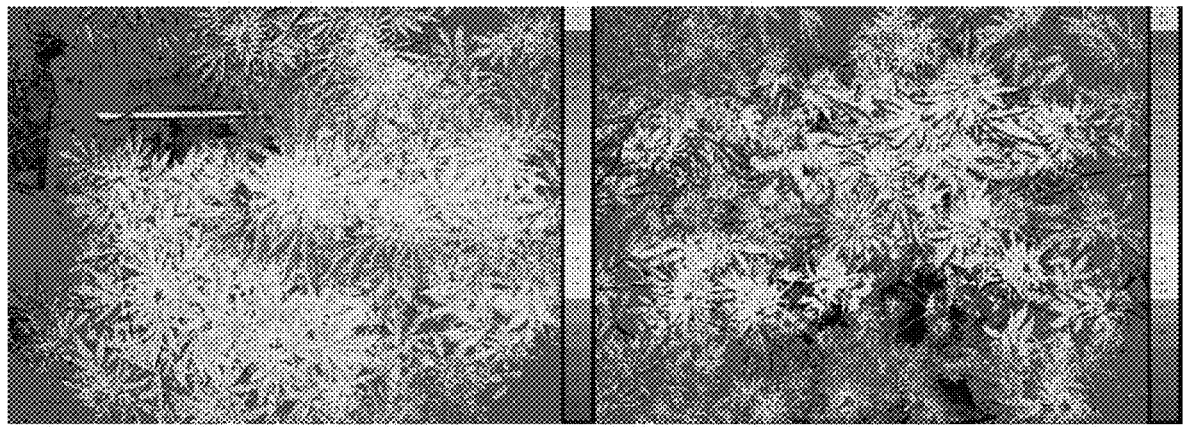

In one example, for example, as depicted in FIG. 3B, a known pattern of powdery mildew distribution is depicted as red in a false-color health image of a leaf. As may be observed, the leaf edges still appear to be relatively healthy despite widespread infection on the leaf. FIG. 3C is a corresponding RGB image provided for comparison; there, powdery mildew infection is not visible to naked eye, except in locations circled in white.

In another example, for example, as depicted in FIG. 3D, a false-color health image based on NDVI reveals a pattern indicative of a powdery mildew infection on a cannabis leaf within the circled area. In this example, the physical pattern of infecting the tip of the leaf by coming in contact with another infected plant showed the mobility of the disease in an operation where there was no airflow. FIG. 3E depicts the same leaf and infection in a processed NIR image.

In another example, for example, as depicted in FIGS. 3F-3K, false-color health images based on NDVI indicate a progression of powdery mildew infection on a cannabis crop over a period of 10-14 days. The pattern of movement, including in particular, the secondary patterns of striations best observed in FIGS. 3H and 3I may further indicate that the observed mildew progression is influenced by the mode of specific air circulation within the cultivation facility. It was also observed in this example that areas of infection were correlated to areas where heat and light were most prevalent.

Nutrient and Nutrient Concentration Detection

The presence and/or concentration of specific nutrients may be detected via spectral code screening. Further, the concentration of nutrients in cannabis plants or portions thereof may be may be assessed via pattern recognition of, for example, NDVI and other health indices. Common nutrients that should be present in various portions of cannabis plants include Calcium, Magnesium, Phosphorus, Potassium, Sulfur, Iron, Manganese, Molybdenum, Zinc, Sodium, Chlorine, Silicon, Cobalt, Selenium, Copper, and/or Boron. Detection of specific nutrients and their concentrations, as well and more generalized assessments of nutrient concentrations may be effectuated through disclosures herein.

Spectral codes for specific nutrients may be obtained by using a hyper-spectral imager in a controlled environment and/or via embodiments of method 900. A specific nutrient (Nitrogen, Iron, Calcium, etc.) may be provided in segregated, pure form in a controlled environment and imaged to determine the spectral code. Nutrient-based hyper-spectral codes are common and many samples exist today.

More generalized nutrient issues may also be identified by the patterns that may be detected and observed from processed spectral images, including index images.

Figure 4C:
FIG. 4C is an NIR image of a cannabis crop experiencing a nutrient flush, in accordance with exemplary embodiments.
Figure 4B:
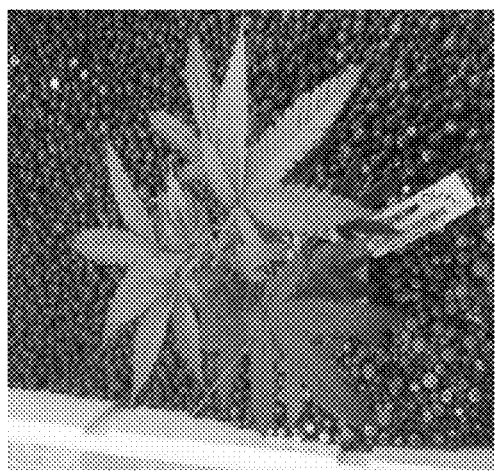
FIGS. 4A and 4B are a set of processed powdery and RGB images, respectively, of a cannabis plant suffering from nutrient leaching, in accordance with exemplary embodiments.
Figure 4A:
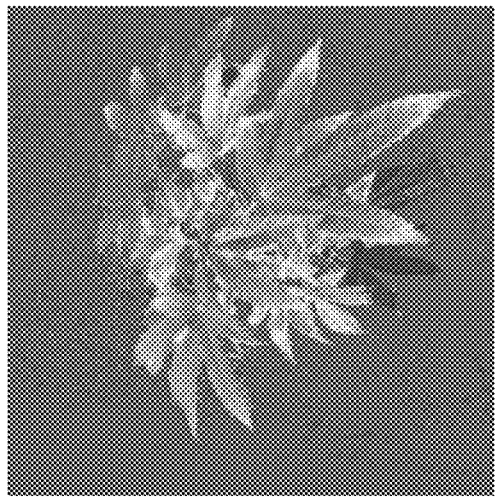
Figure 4D:
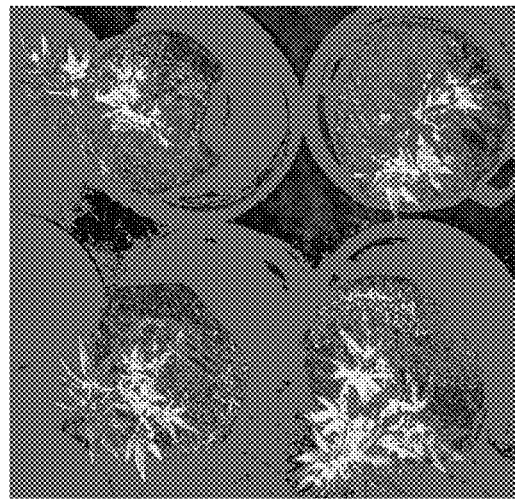
FIG. 4D is a processed false color image of a cannabis plants suffering from nutrient burn, in accordance with exemplary embodiments.

In one example, a false-color health image of a cannabis plant based on NDVI, as depicted in FIG. 4A, reveals health issues that are substantially obscured in the visible RGB bands, as illustrated in FIG. 4B. As may be observed in FIG. 4A, the top fan leaves (which may be understood to correspond to older growth) appear substantially unhealthy, but are healthier at the tips of the leaves; further the bottom fan leaves (which may be understood correspond to newer growth) appear substantially healthy. Such a health pattern—where old growth is unhealthy except at tips and new growth is healthy—is consistent with nutrient leaching. The healthy tips of the old growth may be understood to correspond to residual nutrients that are yet to be leached. Such nutrient leaching pattern may be detected by AI, for example, after processing approximately 10,000 images to develop a corresponding pattern recognition algorithm. FIG. 4D is an exemplary false color health image that depicts four cannabis plants suffering from nutrient burn. It illustrates a circumstance where excessive nutrients were provided; the plant is being destroyed as a result.

Once a pattern, such as nutrient leaching, is observed, user input data 30 and environmental sensor data 20 may be processed for potential correlations with the onset and/or exacerbation of the issue. In the example of FIGS. 4A and 4B, such data processing revealed a temporal correlation between the nutrient leaching and a change in irrigation supply. Based on this correlation, it was ultimately determined that the cause of nutrient leaching was PH imbalance and an iron deficiency in the new water supply. In this example, the cultivation monitoring system advantageously enabled identification and correction of the water supply issue even before the problem was observable to the naked eye.

In another example, as depicted the NIR image of FIG. 4C, the effects of a "nutrient flush" may be observed three hours after its commencement. As may be observed, the leaf in the bottom left of the image may be observed to indicate low energy use, which may be associated with a low nutrient concentration. Cannabis cultivators typically flush nutrients from a plant before changes in life cycle stages and prior to harvest. A nutrient flush may be effectuated by irrigating plants with water that contains little or no added nutrients. By assessing patterns in processed images during a nutrient flush, a cultivator may be able to assess the progress and/or completion of a flush earlier than would be observable by the naked eye. For example, the underlying image of FIG. 4C was captured three hours after a nutrient flush began. Although the plant appeared normal to the naked eye, FIG. 4C reveals a pattern of consolidation of nutrients in the plant cola and the leaching of nutrients from fan leaves. By contrast, through manual inspection, even highly trained cultivators are typically unable to observe any effects of a nutrient flush until 24-48 hours after its commencement.

Strain Detection

The strain of a particular cannabis plant may be identified via spectral code screening and/or recognition of plant growth patterns.

Spectral codes for a particular cannabis strain may be obtained by using a hyper-spectral imager in a controlled environment and/or via embodiments of method 900. The selected strain may be cultivated in a controlled environment and imaged over its lifecycle to determine the spectral code of its various components at various stages of its life cycle. Additionally, field samples may be taken and imaged in order to validate the code match. This disclosure contemplates identifying cannabis plants, or parts thereof, by strain via screening multi-spectral images for multi-spectral code sets and via screening hyper-spectral images for hyper-spectral codes.

The growth pattern and structures of a cannabis plant may also be indicative of its strain. For example, some strains are known to have wider or skinnier leaf structures. By providing an AI with a machine learning algorithm a substantial data set comprising processed images of growing cannabis plants of a particular strain, a growth pattern recognition algorithm may be developed. Such pattern recognition algorithm may require approximately a data set comprising 10,000 or more images for each strain investigated.

Moisture Monitoring and Assessment

With reference to step 530 of method 500, a pattern indicative a hydration problem may be detected by an AI via correlation of stacked processed images. For example, the same plants, or portions thereof, that may be observed to be unhealthy in a false-color health image or the like may also be observed to have low water content in a corresponding NDWI image. Such correlation may be detected as a known pattern. Such pattern detection and reporting thereof may advantageously result in a cultivator taking further action to further diagnose and solve the problem, for example, by checking the water supply line corresponding to the affected plants.

Figure 8B:
FIGS. 8B-8D are a set of one visible light and two sequential processed false color images, respectively, of cannabis flowers being cured that illustrates moisture content monitoring, in accordance with exemplary embodiments.
Figure 8C:
Figure 8E:
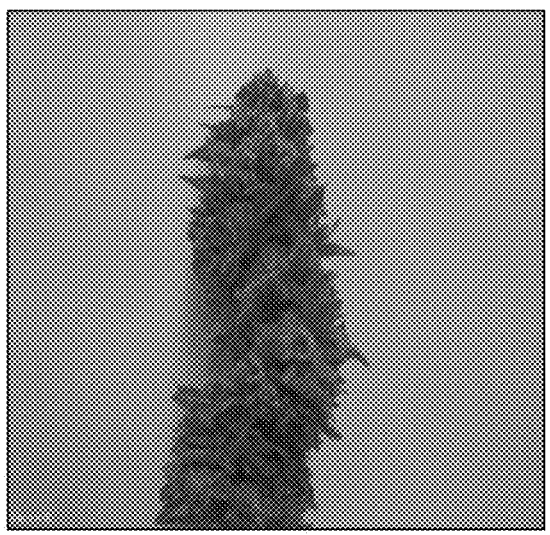
FIGS. 8E-8F are a set of visible light and processed false color images, respectively, of a cannabis bud that illustrates moisture content monitoring, in accordance with exemplary embodiments.
Figure 8D:
Figure 8F:
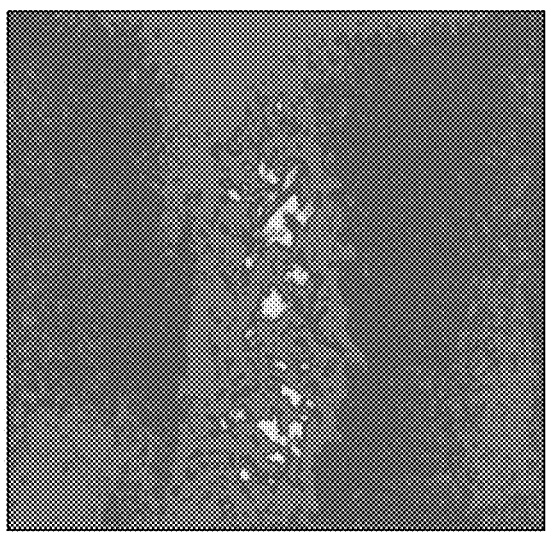
Figure 8A:
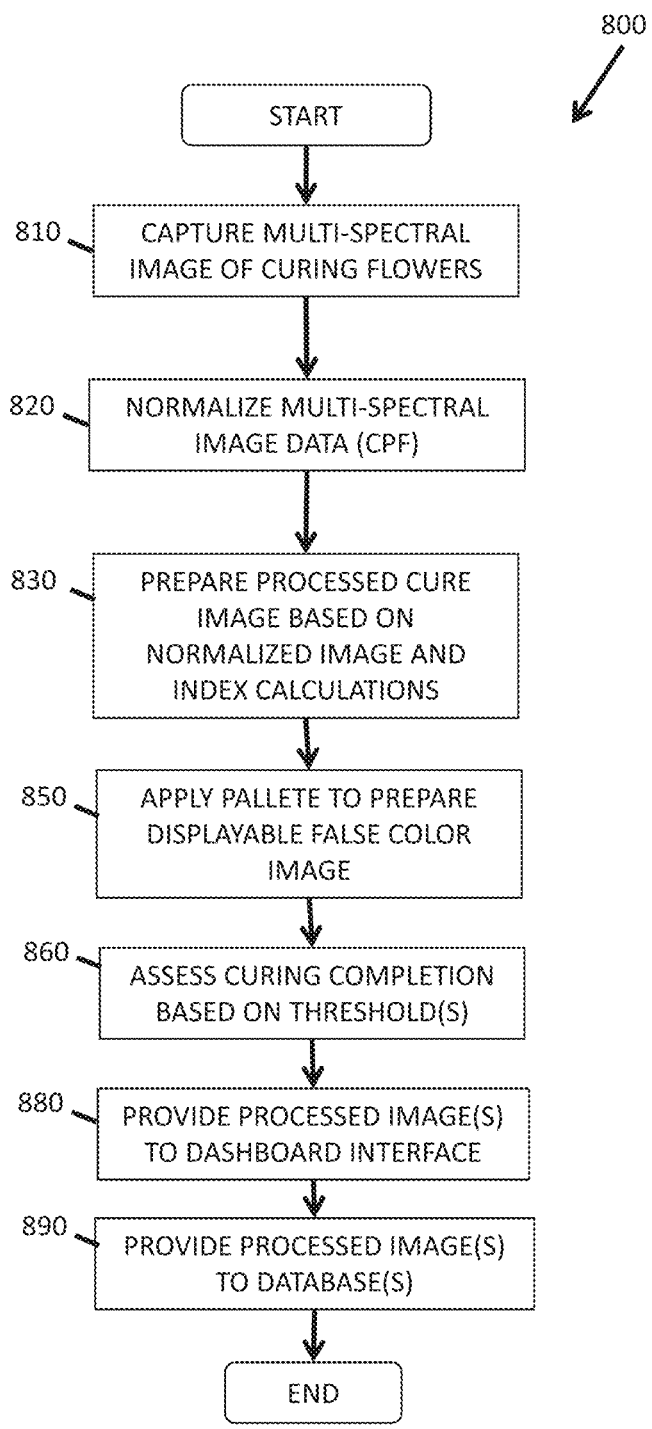
FIG. 8A is a flowchart illustrating a method for assessing cure completion, in accordance with exemplary embodiments.

With reference to FIG. 8A, an embodiment of a method 800 for assessing cure completion is provided. In some embodiments, such method may proceed recurrently, for example, daily, during a curing process.

As in step 810, a multi-spectral image of curing (or potentially cured) flowers may be captured. By way of illustration, FIG. 8B provides an RGB image of flowers curing on a rack. The process may proceed to step 820.

As in step 820, the cultivation monitoring system may normalize the raw spectral image to account for, for example, lighting conditions, plant characteristics, and/or other calibration considerations in a process substantially identical to that of step 320 discussed above. In the examples, from which FIGS. 8C, 8D, and 8F was derived, the color processing values of FIG. 13D were utilized to create a .CPF file during a calibration process. In some embodiments, the optimal color processing values corresponding the strain of flowers being cured may be utilized. The process may proceed to step 830.

As in step 830, the cultivation monitoring system may prepare a processed cure image from the normalized image and one or more index calculations and/or band intensities. In preferred embodiments, GNDVI and/or NDWI may be used to derive a cure values for each pixel of the normalized spectral image, as such measures are indicative of active chlorophyll and water presence, respectively. In some embodiments, the cure value for each pixel may be derived via an average or weighted average of such components, with adjustments made to account for the permissible numerical range of each index. In the example from which FIGS. 8C, 8D, and 8F were derived, NDWI was utilized to determine the cure value for each pixel. The process may proceed to step 850.

As in step 850, a color palette may be applied to the processed cure image to prepare a displayable false-color cure image to display on, for example, the dashboard interface, in a report, or the like. Such palette may be selected or prepared during an embodiment of calibration method 300, and may be based on, for example, the particular strain being imaged and/or other considerations. In certain embodiments, the processed seed viability image may be processed with an .ICP file to advantageously prepare a displayable false color image.

In the exemplary images of FIGS. 8C, 8D, and 8F, the presence of green, and to a lesser extent yellow, reflects high moisture presence and therefore suggests that flowers with such false coloring may require further curing. The process may proceed to step 860.

As in step 860, the pixels from each flower, rack of flowers, or the like, may be collectively or individually assessed. Such assessments may be compared to cure threshold values to indicate whether and/or how much more curing is advised, and for which flowers, racks, or the like. In some embodiments (not shown), the processed cure image may be marked to indicate which flowers, racks, and/or buds should be removed from the curing process and/or how much additional curing time is recommended.

Potential threshold cure values and curing time estimates may be experimentally determined by, for example, creating and assessing displayable false color cure images of flowers, racks, and/or the like at known points of curing process. It has been observed that different cure thresholds may more or less appropriate for different strains of cannabis. The process may proceed to step 880.

As in step 880, the displayable false color cure image—with or without overlaid indications of cure completeness or recommended remaining cure times—may be provided to the user via, for example, the dashboard interface, email, or the like. In some embodiments, however, an indication as to which racks or flowers are sufficiently cured may be provided to the user without a displayable false color clone image, for example, by relaying zone numbers indicative of sufficiently cured flowers or racks. In yet other embodiments, the curing process may be completed automatically or semi-automatically, for example, via an electromechanical apparatus that physically removes flowers and/or racks that have been determined to be sufficiently cured. The process may proceed to step 890.

As in step 890, the raw multi-spectral image, the normalized multi-spectral image, the processed cure image, the displayable false-color cure image, and/or the displayable false-color cure image with indications may be saved in the appropriate databases. Additionally, any additionally derived index images and/or RGB images derived from the normalized multi-spectral image may be saved. As would be appreciated by a person of skill in the art, the method contemplates that some or all images may be saved in the appropriate database(s) upon their creation or soon thereafter. Additionally or alternatively, cure values for each rack or flower set may be saved.

Method 800 may then be concluded. In preferred embodiments, method 800 may occur in real time, allowing the customer to promptly assess a curing state, and thereby reduce the risk of over-curing flowers.

Subsequently, resulting false color cure images, assessments, and the like may be utilized in final cultivation reports, and/or maintained in the database as a curing record just in case the cured flowers or downstream products later show indications of mold growth, rot, or other maladies. Additionally, the saved image file set may later be subject to spectral code screening and/or pattern recognition by AI instrumentalities to derive additional, more detailed data on the cured flowers. Similarly, the saved image file set and/or viability values may used by to refine strain-specific precision agriculture models and/or refine cure thresholds.

Even experienced cannabis producers may be unlikely to track the order which drying racks are populated with flowers at the beginning of a cure cycle. Accordingly, under current techniques, it can be difficult to reliably assess a curing completeness, especially in larger grows with a large labor force. As an example of this problem—and its solution—FIGS. 8C and 8D are displayable false color cure images of populated curing racks that were sequentially taken approximately one hour apart. As may be best observed in FIG. 8D, the second to highest rack is the closest to a complete cure; it may be surmised that this second to highest rack was populated with harvested cannabis first, and accordingly is likely to be finished curing first. Without displayable false color cure images, a cultivator unaware of the non-sequential hanging of flowers may tend to remove the top rack from the curing process first, thereby increasing the likelihood that cannabis flowers on the top rack are insufficiently cured when packaged. However, through embodiments of method 800, a cultivator may be alerted to the fact that flowers on the top rack may require additional curing. Such alert may inform the cultivator that an employee has populated curing racks in a non-sequential manner and address the issue so that the employee does not repeat the practice.

Method 500 may also be used by a cultivator to verify that individual and/or groups of cannabis buds are sufficiently cured prior to packaging and/or for spot testing by regulatory authorities or downstream businesses. In one example, FIG. 8E is an RGB image of a cannabis bud that appears to be fully cured to the naked eye. FIG. 8F is a displayable false color cure image of that same bud and reveals an insufficient cure due to internal presence of moisture. The cure values depicted in FIG. 8F were derived from NDWI.

Cannabis Plant Sexing

Figure 7A:
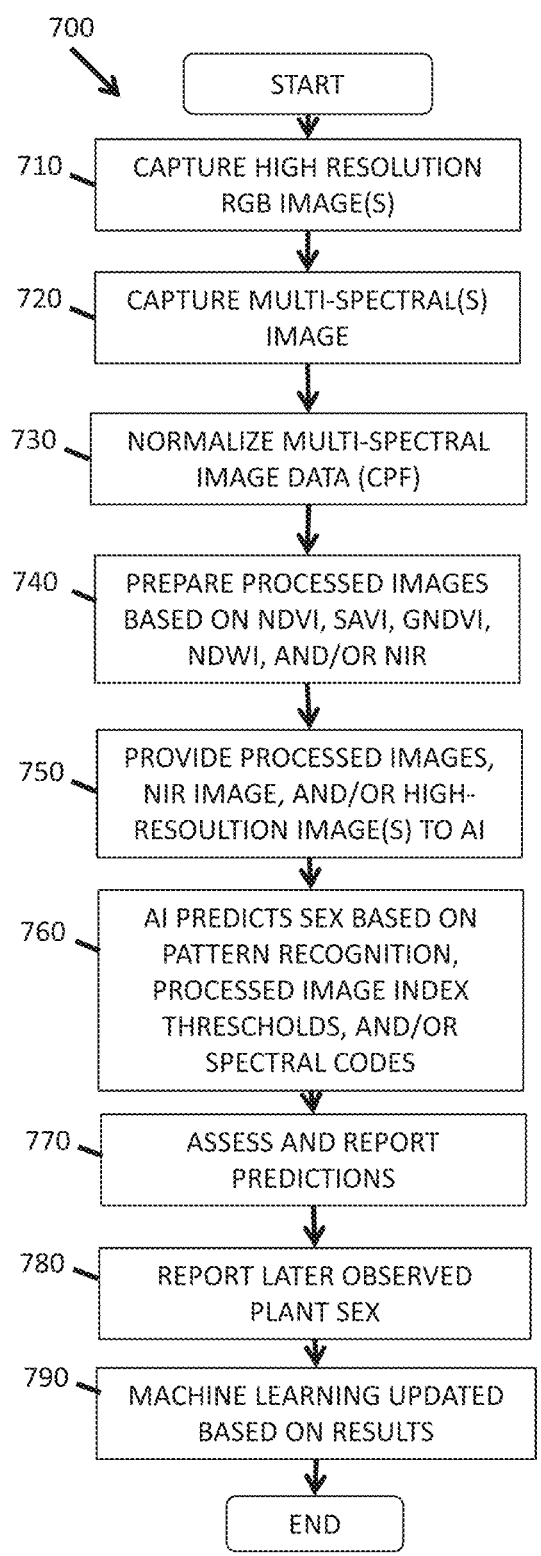
FIG. 7A is a flowchart illustrating a method for assessing cannabis plant sex, in accordance with exemplary embodiments.

With reference to FIG. 7A, an embodiment of a method 700 for assessing cannabis plant sex is provided. In preferred embodiments, method 700 may reliably predict the sex of cannabis plants at or shortly before the conclusion of the nursery stage, for example, approximately 11 to 14 days after the nursery stage commences. Advantageously, this may permit cannabis cultivators to cull male plants prior to replanting for the vegetation stage and may permit clone growers to avoid (or reduce) the sale of undesirable male clones, thereby gaining a competitive advantage.

As in step 710, a high-resolution image of the nodes of the cannabis plant (e.g., where the plant stem branches off) may be captured. In preferred embodiments, such imagery may be captured by a high resolution RGB digital camera. The process may proceed to step 720.

As in step 720, one or more multi-spectral image(s) of the subject cannabis plant, and/or its nodes may be captured. The process may proceed to step 730.

As in step 730, the cultivation monitoring system may normalize the raw captured image data to account for, for example, lighting conditions, plant strain, and/or other calibration considerations. In certain embodiments, the raw captured image may be processed with a corresponding .CPF file to derive a normalized multi-spectral image. In some embodiments, the .CPF file may be derived from a calibration process that uses color processing values for clones, for example, as in FIG. 13E. The process may proceed to step 740.

As in step 740, the cultivation monitoring system may prepare index images from the normalized spectral image(s) of the plants and/or its nodes. In preferred embodiments, processed images based on NDVI, SAVI, GNDVI, NDWI, and/or NIR maybe derived. The process may proceed to step 750.

As in step 750, the processed index images, the high-resolution RGB node images, and/or the normalized spectral image may be provided to an AI for processing. In some embodiments, the node areas may be identified by a user. The process may proceed to step 760.

As in step 760, the AI may predict the subject plant's sex based upon pattern recognition, processed image index thresholds, and/or detected spectral codes.

Figure 7B:
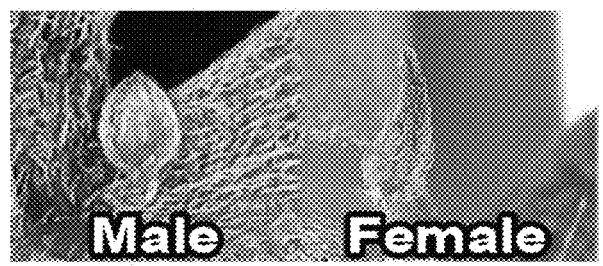
FIG. 7B is a set of prior art images illustrating the respective structures of male and female cannabis sex organs.

With reference to FIG. 7B, as is known in the art, "bracts" are observable female cannabis sex organs with hair-like stigma; observable male cannabis sex organs appear as small round balls. Currently, such organs are typically identified by specially trained experts that inspect plant nodes with magnifying instruments early in the vegetative stage.

By providing an AI with a machine learning algorithm a substantial data set comprising high-resolution images of nursery-stage cannabis nodes and corresponding indications of conclusively determined plant sex, a suitable pattern recognition algorithm may be developed to predict plant sex based on the early sex organ structure. Such pattern recognition algorithm may require approximately a data set comprising 10,000 or more images.

It is also believed that nursery-stage male and female cannabis plants as a whole and/or their fledgling sex organs subtly differ with respect to health indications, heat emission, energy use patterns and chlorophyll levels, and/or water content. Accordingly, processed images derived from NDVI/SAVI, NIR, GNDVI, and/or NDWI, respectively, may be further processed to determine observed values for each subject plant and/or its fledgling sex organ(s). Such observed values may be compared to threshold values to provide additional predictive data regarding the sex of the subject plant.

By providing an AI with a machine learning algorithm a substantial data set comprising processed images of nursery-stage cannabis plants and/or their nodes along with corresponding indications of conclusively determined plant sex, potential suitable thresholds for predicting plant sex for some or all indices may be derived. Such pattern recognition algorithm may require approximately a data set comprising 10,000 or more images for each index value investigated.

Additionally, it is believed that fledgling male and female sex organs may reflect different spectral codes and/or vary with respect to hormone content. In some embodiments, spectral codes for such sex organs may be derived, for example, via method 900. In other embodiments, key hormones may be isolated and the spectral coding of such hormones may be derived. Where such spectral codes or code sets are established, normalized spectral images of plants and/or their nodes may be screened for such spectral coding, and may thereby provide additional predictive data regarding the sex of the subject plant.

In some embodiments, one of the above-described sources of sex-predictive data may be sufficient. However, it is contemplated that multiple types of sex-predictive data may be combined to arrive at a predicted sex and/or level of confidence in the prediction. In some embodiments, data sources may be weighted based on, for example, the overall predictive value of each data source and/or the perceived reliability of a particular source in a specific instance. For example, if the pattern recognition algorithm predicts male with a high degree of certainty, such predictive data may be weighed strongly and/or counsel for a high degree of confidence in the final prediction. In another example, if a water content level is close to an established male/female predictive threshold, such predictive data may be given little weight and/or counsel for a low degree of confidence in the final prediction.

It is expected accurate sex-prediction models may vary by cannabis strain with respect to some or all thresholds, pattern recognition algorithms, and spectral coding. Accordingly, in some embodiments, image data set inputs for machine learning algorithms may be segregated by strain.

The process may proceed to step 770.

As in step 770, the predicted sex and/or level of confidence may be provided to the cultivator via, for example, a dashboard interface, a report, or the like. Plants may be segregated, replanted, retained, and/or culled accordingly. In some embodiments plants may only be treated as female (or male) if such prediction is given with at least a threshold confidence level. An optimal threshold confidence level may be derived by weighing the resource allocation impacts of, for example, erring by destroying too many female plants versus erring by replanting (or distributing) too many male plants. In certain embodiments, a threshold confidence level may be preset in software, for example as a default. Such threshold confidence level may additionally or alternatively be selected by a user via, for example, a slider bar on a dashboard interface. The process may proceed to step 780.

As in step 780, the later, conclusively observed sex of cannabis plants may be reported back. In some embodiments, for example, where male plants are culled and females replanted, a reporting paradigm may assume that all plants were female unless an errant male plant is reported. The process may proceed to step 790.

As in step 790, the AI may further refine its sex predicting algorithms based on reporting in step 780. In preferred embodiments, the target plant embodying the "wrong" sex may be mapped back to the initially captured and processed images, values, and assessments. Accordingly, various thresholds, pattern recognition algorithms, weightings, and confidence level calculations may be updated as a result of erroneous predictions.

It is known, however, that cannabis plants may become hermaphroditic in adverse circumstances caused by, for example, external environmental stress, nutrient stress, hydration stress, and/or disease or pest pressure. Thus, an assessed plant's eventual expression of the "wrong" sex might, in such cases, not reflect an error in the sex-prediction model. Accordingly, in some embodiments, displayable false color health images, other images, and/or assessments indicative of stresses of the maturing plant may be considered before refining a sex-prediction model in view of an apparent error. Method 700 may be concluded.

Strain-Specific Precision Agriculture Model

Figure 6:
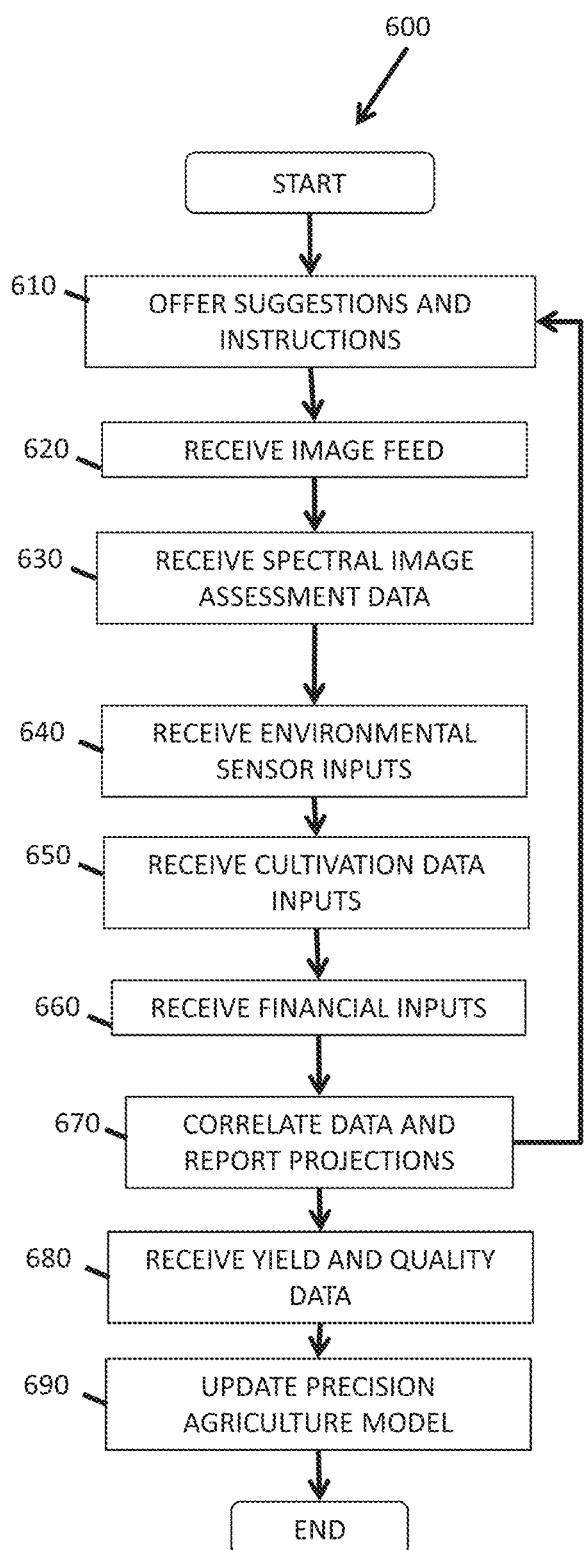
FIG. 6 is a flowchart illustrating a method of operation for using, creating, and iteratively updating a precision agriculture model, in accordance with exemplary embodiments.

With reference to FIG. 6, an embodiment of a method 600 for using, creating, and iteratively refining a precision agriculture model for cannabis cultivation is provided. In preferred embodiments, method 600 may be employed separately for each strain of cannabis and/or for each cannabis cultivator. Accordingly, through many iterations of method 600, a cannabis cultivator may automatically create a precision agriculture model that is his own. Moreover, in some embodiments, each such model may be considered the intellectual property of the cultivator who developed it. In turn, the cultivator may sell or license his model, and thereby receive compensation for allowing others to grow a particular strain of cannabis via precise methodologies that may be expected to reliably result in a cannabis crop that closely hews to the original.

As in step 610, suggestions or instructions pertinent to the current condition of the cannabis crop may be offered. Such instructions or suggestions may involve the provision of nutrients or water, treatment of disease or pests, adjustment of lights, replanting plants to begin the next stage of life cycle, harvesting, curing processes, culling plants, financial matters, labor matters, ordering of supplies, expiration of supplies, and/or the like. In some circumstances, the model may suggest that a grow cycle be aborted or that crop insurance be purchased, increased, or cancelled. If a new model is being developed, step 610 may be omitted or default instructions may be given. The process may proceed to step 620.

As in step 620, the AI may receive an image feed of the cultivation operation. Such image feed may include raw and normalized spectral images, various processed spectral images discussed herein, RGB images, and the like. Such images may be provided on a set schedule over the course of the grow cycle to identify how the plant responded to registered changes. The process may proceed to step 630.

As in step 630, the AI may receive assessment data derived by the cultivation monitoring system from processed spectral images and the like. Examples of such assessment data are referenced throughout this disclosure. The process may proceed to step 640.

As in step 640, the AI may receive environmental sensor data. Such data may include temperature, light coverage measurements, $CO_2$ levels, humidity level, water tables and level, and/or other known environmental sensor outputs. Such data may be provided on a set schedule through the course of each grow. The process may proceed to step 650.

As in step 650, the AI may receive cultivation data inputs. Some cultivation data inputs may be automatically provided via programmed control systems; other data may be manually entered. Pre-set growing information may be provided on a projected timeline and updated through the course of the grow cycle. Cultivation inputs may include data on some or all of the following: nutrient type; grow type; light make/type; nutrient schedule; grow medium; plant phase movement; transplanting; water schedules; nutrient schedules; $CO_2$ ppm; timelines; drying/curing cycles; plant spacing; supplemental nutrient schedules; pesticide/insecticide schedules; humidity settings; temperature settings; light schedules; and/or the like. Much of such data may be provided or automatically uploaded at the start of each grow, but may be updated throughout the course of the grow. The process may proceed to step 660.

As in step 660, the AI may receive financial inputs. Financial inputs may include data on some or all of the following: water cost, facility cost, fixed labor cost, licensing/professional fees, insurance, nutrient cost, equipment cost, plants/clones/seeds, pesticide cost, energy cost, overhead cost, miscellaneous services, remediation cost, market value of product, and/or the like. Much of such data may be provided or automatically uploaded at the start of each grow, but may be updated throughout the course of the grow. The process may proceed to step 670.

As in step 670, the AI may correlate the received data in view of the already existing model to arrive at assessments of the current agricultural and financial status of the grow. The agricultural status may be provided via a report, a dashboard interface, or the like—and may be consistent with embodiments for user feedback disclosed herein. The financial status may include information pertaining to some or all of the following: projected sales price, average yield per plant, projected seed/clone/plant, projected total yield, gross ROI projected, projected professional service fees, insurance compensation, net ROI projected, projected transportation cost, timeline, regional wholesale price, projected labor cost, average cost per plant, projected security cost, projected tax liability, and/or the like.

If the grow has been completed, the method may proceed to step 680. However, if the grow has not yet been completed, the method may cycle back to step 610.

As in step 680, the AI may receive final data pertaining to the grow. This may include measures of product yield and quality including, but not limited to: strain yield, average yield per plant, THC percentage, CBD percentage, terpene profile, lab testing results, subjective measures of quality, and/or the like. Additionally, final data received may include certain final financial figures, such as sales price, actual costs, and/or the like. The process may proceed to step 690.

As in step 680, the AI may correlate the final data with other received and processed data. Life cycles of the just completed and prior grow cycles may be compared and trended to determine increases or decreases in yield, potency, health anomalies found, profit margin, and the like. Consistent with such assessment, the existing model may be refined via a machine learning algorithm and/or with input from the cultivator with the objective of improving product and financial outcomes in the subsequent grow cycle. Accordingly, over the course of multiple grow cycles, a model may be iteratively refined, with accuracy of projections and reliability of suggestions and instructions improving in every iteration.

Cultivation Calculator

A software-based cultivation calculator may also be provided. Such calculator may operate in a manner similar to that of method 600, but may be substantially limited to financial inputs, outputs, calculations, and projections. Accordingly, embodiments of a cultivation calculator method may omit steps, or portions thereof, pertaining to image feeds, sensor data, and/or spectral data assessment.

Preferred embodiments of a cultivation calculator may provide a visual tool to input, track, and monitor all related expenses against projections in real time to identify the financial status of a grow operation stands at any given time. Inputs may be entered on a continual basis and updated projections provided therefrom. Accordingly, a cultivation calculator may permit grow operation to continuously maintain visibility on its financial status, make changes as needed. The cultivation calculator may be configured to illustrate where the profitability point rests as various numbers fluctuate. Should the profitability point drop below an acceptable level, the expenses may be adjusted to improve the likelihood of financial success. In preferred embodiments, the cultivation calculator may be provided in a dashboard interface.

Although the foregoing embodiments have been described in detail by way of illustration and example for purposes of clarity of understanding, it will be readily apparent to those of ordinary skill in the art in light of the description herein that certain changes and modifications may be made thereto without departing from the spirit or scope of the appended claims. It is also to be understood that the terminology used herein is for the purpose of describing particular aspects only, and is not intended to be limiting, since the scope of the present invention will be limited only by the appended claims.

It is noted that, as used herein and in any appended claims, the singular forms "a", "an", and "the" include plural referents unless the context clearly dictates otherwise. It is further noted that any claims may be drafted to exclude any optional element. As such, this statement is intended to serve as antecedent basis for use of such exclusive terminology as "solely," "only," and the like in connection with the recitation of claim elements, or use of a "negative" limitation. As will be apparent to those of ordinary skill in the art upon reading this disclosure, each of the individual aspects described and illustrated herein has discrete components and features which may be readily separated from or combined with the features of any of the other several aspects without departing from the scope or spirit of the disclosure. Any recited method can be carried out in the order of events recited or in any other order that is logically possible. Accordingly, the preceding merely provides illustrative examples. It will be appreciated that those of ordinary skill in the art will be able to devise various arrangements which, although not explicitly described or shown herein, embody the principles of the disclosure and are included within its spirit and scope.

Furthermore, all examples and conditional language recited herein are principally intended to aid the reader in understanding the principles of the invention and the concepts contributed by the inventors to furthering the art, and are to be construed without limitation to such specifically recited examples and conditions. Moreover, all statements herein reciting principles and aspects of the invention, as well as specific examples thereof, are intended to encompass both structural and functional equivalents thereof. Additionally, it is intended that such equivalents include both currently known equivalents and equivalents developed in the future, i.e., any elements developed that perform the same function, regardless of structure. The scope of the present invention, therefore, is not intended to be limited to the exemplary configurations shown and described herein.

In this specification, various preferred embodiments have been described with reference to the accompanying drawings. It will be apparent, however, that various other modifications and changes may be made thereto and additional embodiments may be implemented without departing from the broader scope of any claims that follow. The specification and drawings are accordingly to be regarded in an illustrative rather than restrictive sense.

We claim:

1. A method for assessing at least one condition of a plant material, comprising:
providing a spectral image;
normalizing the spectral image to generate a normalized spectral image;
processing the normalized spectral image to generate at least one processed spectral image;
providing a palette file;
generating a displayable false color image from the at least one processed spectral image and the palette file; and
providing a calibration file,
wherein:
the step of normalizing the spectral image comprises normalizing the spectral image with the calibration file; and
the step of providing the calibration file comprises:
using the multi-spectral imager to capture reflectance values of a calibration target under lighting conditions similar to that of the spectral image;
providing color processing values; and
generating the calibration file based on the captured reflectance values and the color processing values;
the plant material is a portion of a cannabis plant; and
the step of providing color processing values comprises selecting color processing values based on at least one of a strain of the cannabis plant and a life cycle stage of the cannabis plant.

2. The method of claim 1, wherein the step of processing the normalized spectral image to generate at least one processed spectral image comprises:
generating a first processed spectral image based on at least one of NDVI, SAVI, GNDVI, NDVI, and NIR.

3. The method of claim 2, wherein the step of processing the normalized spectral image to generate at least one processed spectral image further comprises:
generating a second processed spectral image based on RGB.

4. The method of claim 1, wherein the step of providing the palette file comprises:
providing the palette file with a grey-red-yellow-green palette rubric.

5. The method of claim 2, wherein the step of providing the palette file further comprises:
providing the palette file that assigns a grey color to pixels of the first processed spectral image with a value at or below 0.000.

6. The method of claim 2, wherein:
the at least one condition of plant material includes a health measurement as a first condition;
the first processed spectral image reflects the health measurement; and
the step of providing a palette file further comprises providing a palette file that:
assigns a green color to very healthy plant material;
assigns a yellow color to midline healthy plant material;
assigns a red color to unhealthy plant material; and
assigns a grey color to inert material.

7. The method of claim 1, further comprising:
screening the normalized spectral image for a first multi-spectral code set.

8. The method of claim 1, further comprising:
evaluating at least one of the at least one processed spectral image and the normalized spectral image to recognize patterns indicative of plant health related anomalies.

9. A method for assessing at least one condition of a plant material, comprising:
providing a spectral image;
normalizing the spectral image to generate a normalized spectral image;
processing the normalized spectral image to generate at least one processed spectral image;
providing a palette file;
generating a displayable false color image from the at least one processed spectral image and the palette file;
overlaying a plurality of assessment squares on the displayable false color image;
calculating an assessment value for each of the plurality of assessment squares; and
coloring each of the plurality of assessment squares based at least in part on its assessment value,
wherein the step of providing a spectral image comprises capturing a multi-spectral image of the plant material with a multi-spectral imager.

10. The method of claim 9, further comprising:
providing a health threshold percentage, wherein:
the at least one condition of plant material includes a health measurement as a first condition;
the first processed spectral image reflects the health measurement; and
the step of coloring each of the plurality of assessment squares based at least in part on its assessment value comprises:
overlaying a first color on each assessment square that is not predominately inert and has an assessment value greater than the health threshold percentage; and
overlaying a second color on each assessment square that is not predominately inert and has an assessment value below than the health threshold percentage.

11. The method of claim 10, wherein the step of coloring each of the plurality of assessment square based at least in part on its assessment value further comprises:
overlaying a third color on each assessment square that is predominately inert.

12. The method of claim 10, wherein the step of providing a health threshold percentage comprises:
receiving user input to determine the health threshold.

13. The method of claim 9, further comprising:
providing a background surface with a grid,
wherein:
the step of capturing the spectral image comprises capturing at least a portion of the grid in the multi-spectral image; and
the step of overlaying the plurality of assessment squares on the displayable false color image comprises overlaying the plurality of assessment squares in alignment with the grid.

14. The method of claim 9, wherein:
the plant material is seeds;
the at least one condition is seed viability; and
the step of processing the normalized spectral image to generate at least one processed spectral image further comprises generating a first processed spectral image based on at least one of NDVI, SAVI, GNDVI, NDWI, and NIR.

15. The method of claim 9, wherein the step of processing the normalized spectral image to generate at least one processed spectral image comprises:
generating a first processed spectral image based on at least one of NDVI, SAVI, GNDVI, NDVI, and NIR.

16. The method of claim 9, further comprising:
screening the normalized spectral image for a first multi-spectral code set.

17. The method of claim 9, further comprising:
evaluating at least one of the at least one processed spectral image and the normalized spectral image to recognize patterns indicative of plant health related anomalies.

18. A method for assessing at least one condition of a plant material, comprising:
providing a spectral image;
normalizing the spectral image to generate a normalized spectral image;
processing the normalized spectral image to generate at least one processed spectral image;
providing a palette file; and
generating a displayable false color image from the at least one processed spectral image and the palette file,
wherein:
the step of providing a spectral image comprises capturing a multi-spectral image of the plant material with a multi-spectral image;
the plant material is cannabis flowers;
the at least one condition is curing completeness; and
the step of processing the normalized spectral image to generate at least one processed spectral image comprises generating a first processed spectral image based on at least one of NDWI and GNDVI.

19. The method of claim 18, further comprising:
screening the normalized spectral image for a first multi-spectral code set.

20. The method of claim 18, further comprising:
evaluating at least one of the at least one processed spectral image and the normalized spectral image to recognize patterns indicative of plant health related anomalies.

* * * * *